United States Patent [19]

Takada et al.

[11] Patent Number: 5,596,353

[45] Date of Patent: Jan. 21, 1997

[54] IMAGE READING APPARATUS WITH A FUNCTION FOR CORRECTING NONUNIFORMITY IN RECORDING DENSITY

[75] Inventors: Yoshihiro Takada, Kawasaki; Akio Suzuki, Yokohama; Toshimitsu Danzuka, Tokyo; Haruhiko Moriguchi, Yokohama; Hisashi Fukushima, Yokohama; Masami Izumizaki, Yokohama; Yasushi Miura, Kawasaki, all of Japan

[73] Assignee: Canon Kabushiki Kaisha, Tokyo, Japan

[21] Appl. No.: 371,492

[22] Filed: Jan. 11, 1995

Related U.S. Application Data

[63] Continuation of Ser. No. 104,591, Aug. 10, 1993, abandoned, which is a continuation of Ser. No. 684,339, Apr. 12, 1991, abandoned.

[30] Foreign Application Priority Data

| Apr. 13, 1990 | [JP] | Japan | 2-096574 |
| May 30, 1990 | [JP] | Japan | 2-142897 |
| May 11, 1990 | [JP] | Japan | 2-119952 |
| May 11, 1990 | [JP] | Japan | 2-119953 |
| May 11, 1990 | [JP] | Japan | 2-119958 |
| May 31, 1990 | [JP] | Japan | 2-143727 |

[51] Int. Cl.⁶ ............................................. B41J 2/01
[52] U.S. Cl. ........................ 347/19; 347/14; 347/23
[58] Field of Search ........................... 347/19, 14, 23

[56] References Cited

U.S. PATENT DOCUMENTS

| 4,095,233 | 6/1978 | Goffe | 347/98 |
| 4,313,124 | 1/1982 | Hara . | |
| 4,328,504 | 5/1982 | Weber et al. | 347/14 |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,723,129 | 2/1988 | Endo et al. . | |
| 4,740,796 | 4/1988 | Endo et al. . | |
| 4,827,279 | 5/1989 | Lubinsky | 347/188 |
| 4,977,459 | 12/1990 | Ebinoma | 347/3 X |
| 5,038,208 | 8/1991 | Ichikawa | 347/19 X |

FOREIGN PATENT DOCUMENTS

| 0202427 | 11/1986 | European Pat. Off. . | |
| 0346647 | 12/1989 | European Pat. Off. . | |
| 50-147241 | 11/1975 | Japan . | |
| 54-27728 | 2/1979 | Japan . | |
| 54-56847 | 5/1979 | Japan . | |
| 57-41967 | 3/1982 | Japan . | |
| 155960 | 9/1983 | Japan | B41J 3/04 |
| 59-123670 | 7/1984 | Japan . | |
| 59-138461 | 8/1984 | Japan . | |
| 60-71260 | 4/1985 | Japan . | |
| 60-206660 | 10/1985 | Japan . | |
| 61-197256 | 9/1986 | Japan . | |
| 61-229576 | 10/1986 | Japan . | |

*Primary Examiner*—Joseph W. Hartary
*Attorney, Agent, or Firm*—Fitzpatrick, Cella, Harper & Scinto

[57] ABSTRACT

An image recording apparatus includes a recording head in which a plurality of recording elements are arranged so as to form an image on a recording medium, a device for causing the recording head to print a predetermined test pattern, an image density reading device for reading the density of the test pattern formed by the recording head, an uneven image density correction device for correcting conditions for driving the plurality of recording elements in accordance with the result of reading, so as to make even the density of the image formed in accordance with the result of reading, a recording stabilizing device for stabilizing a recording operation performed by the recording head, and a control device for operating the recording stabilizing device before the test pattern is printed and operating the test pattern printing device after the recording head has been stabilized by the recording stabilizing device.

56 Claims, 54 Drawing Sheets

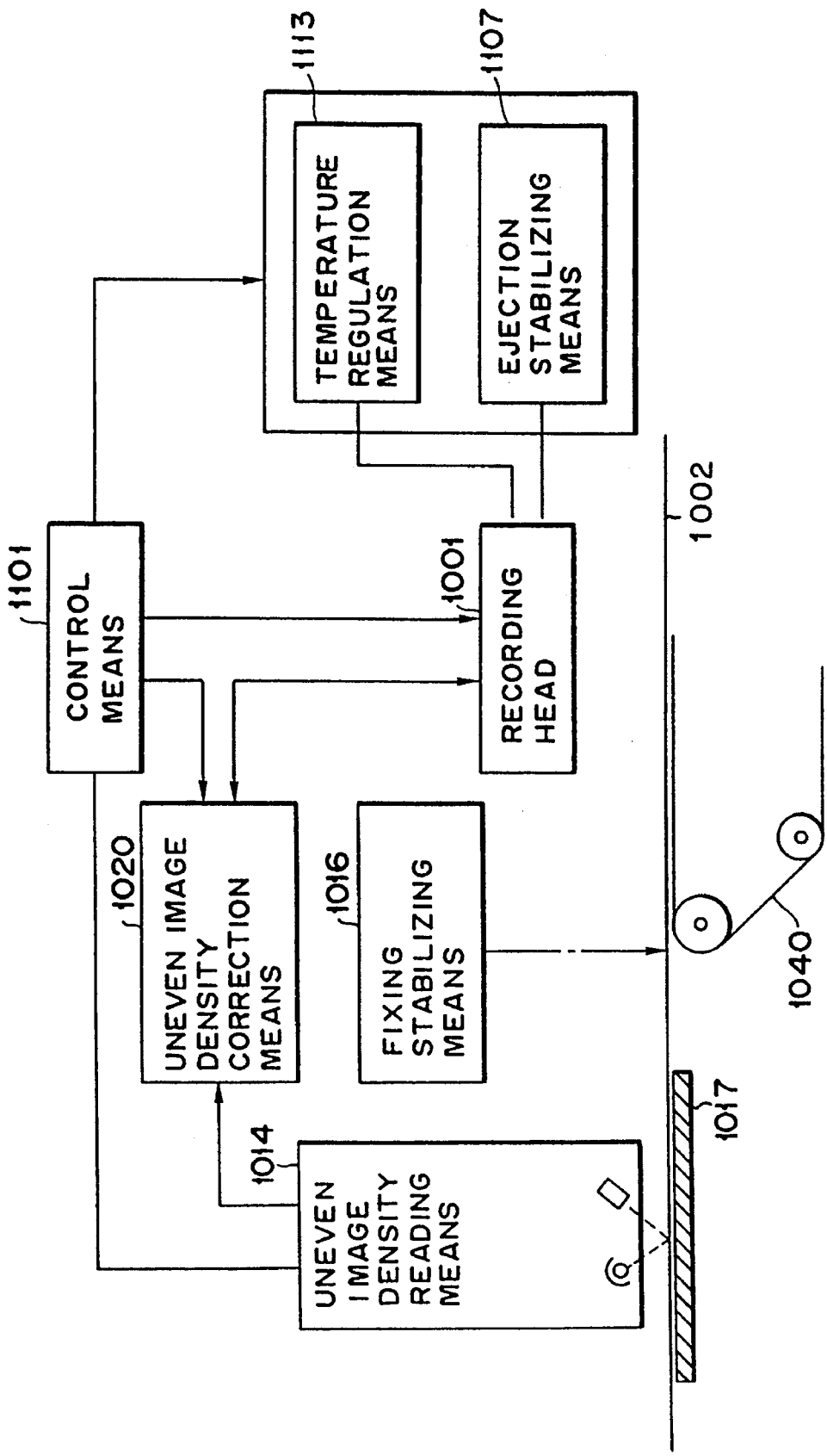

F I G. 7A
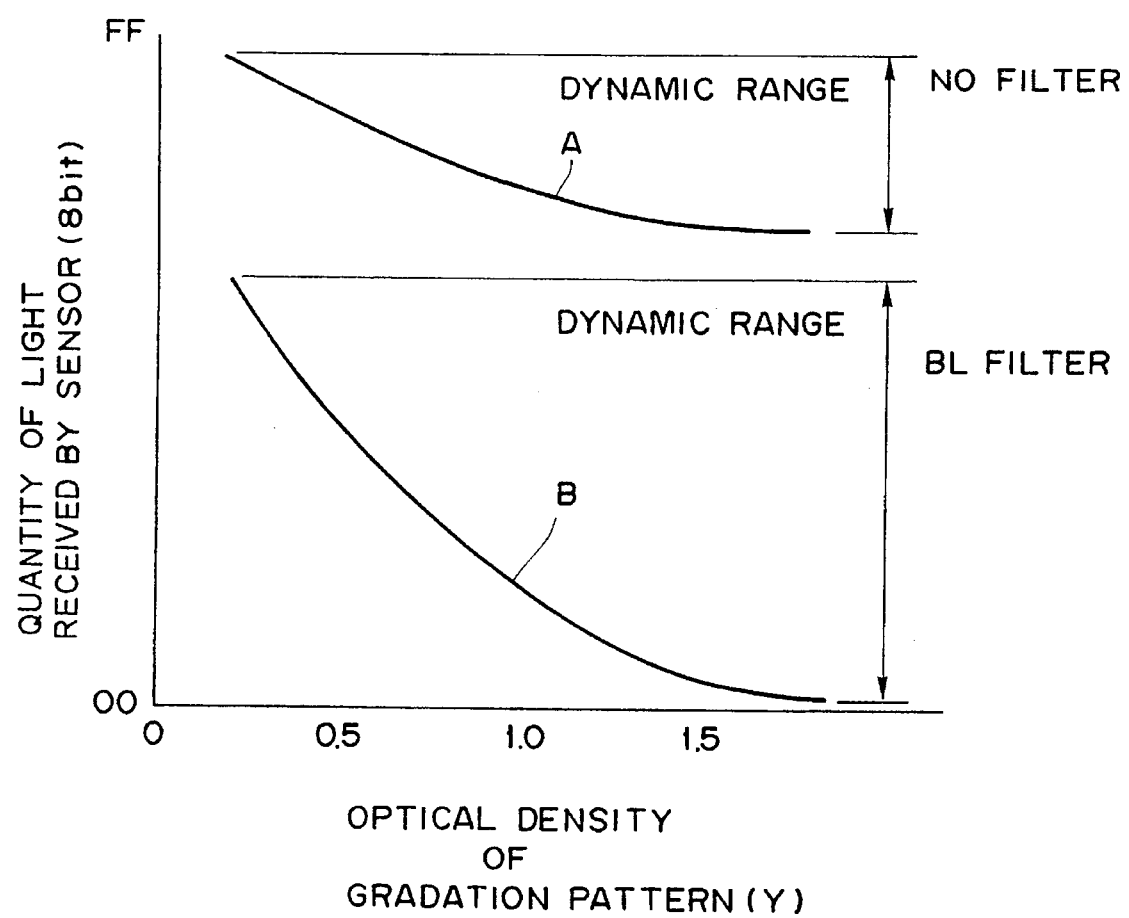

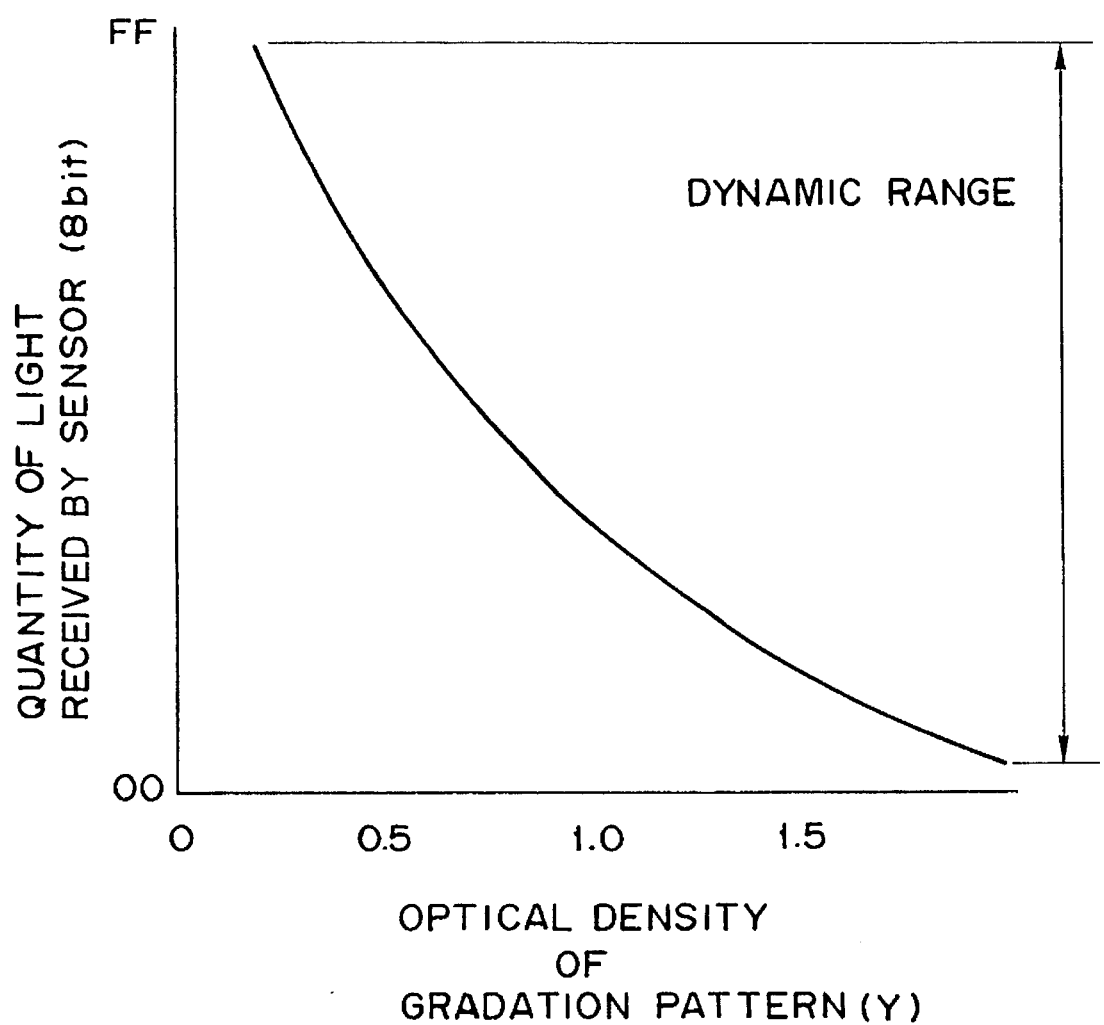

DRIVING FREQUENCY
OF
STEPPING MOTOR

F I G. 12C
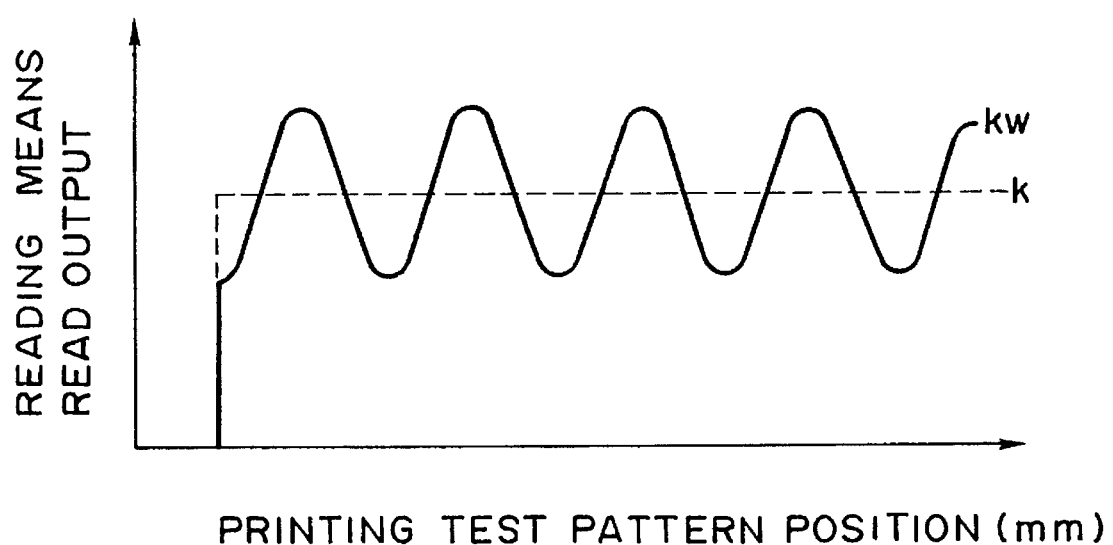

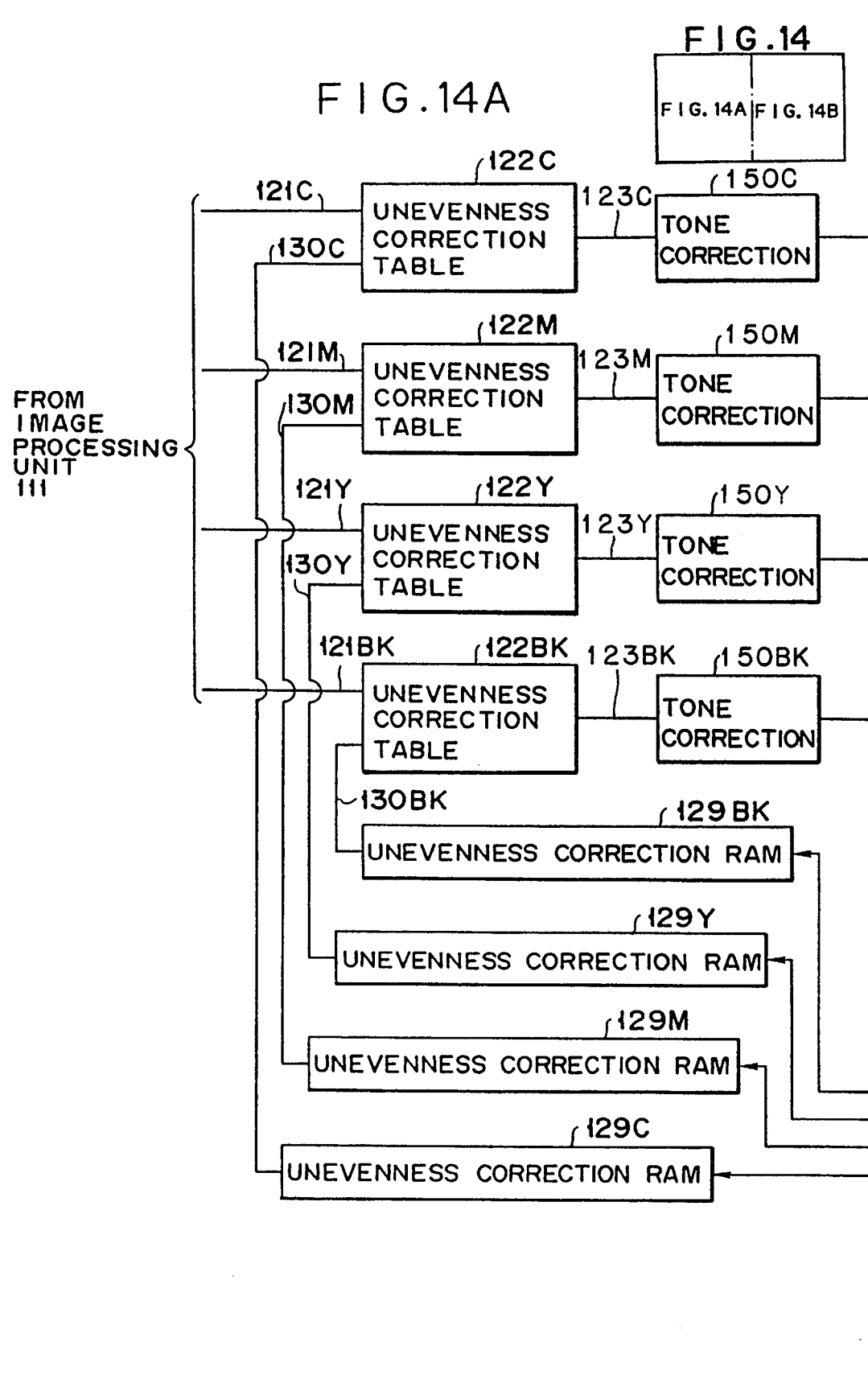

F I G . 18
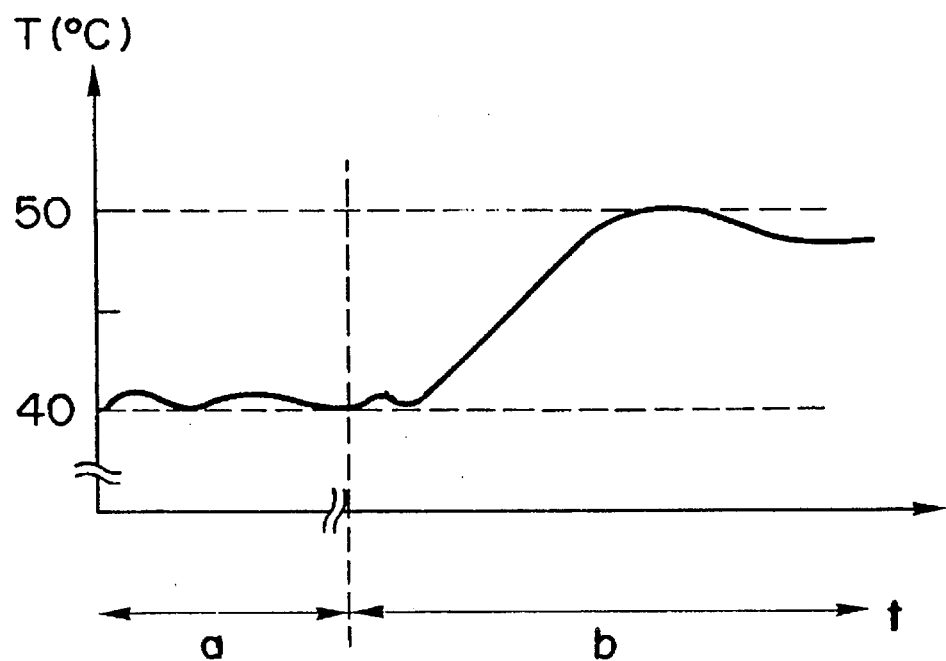

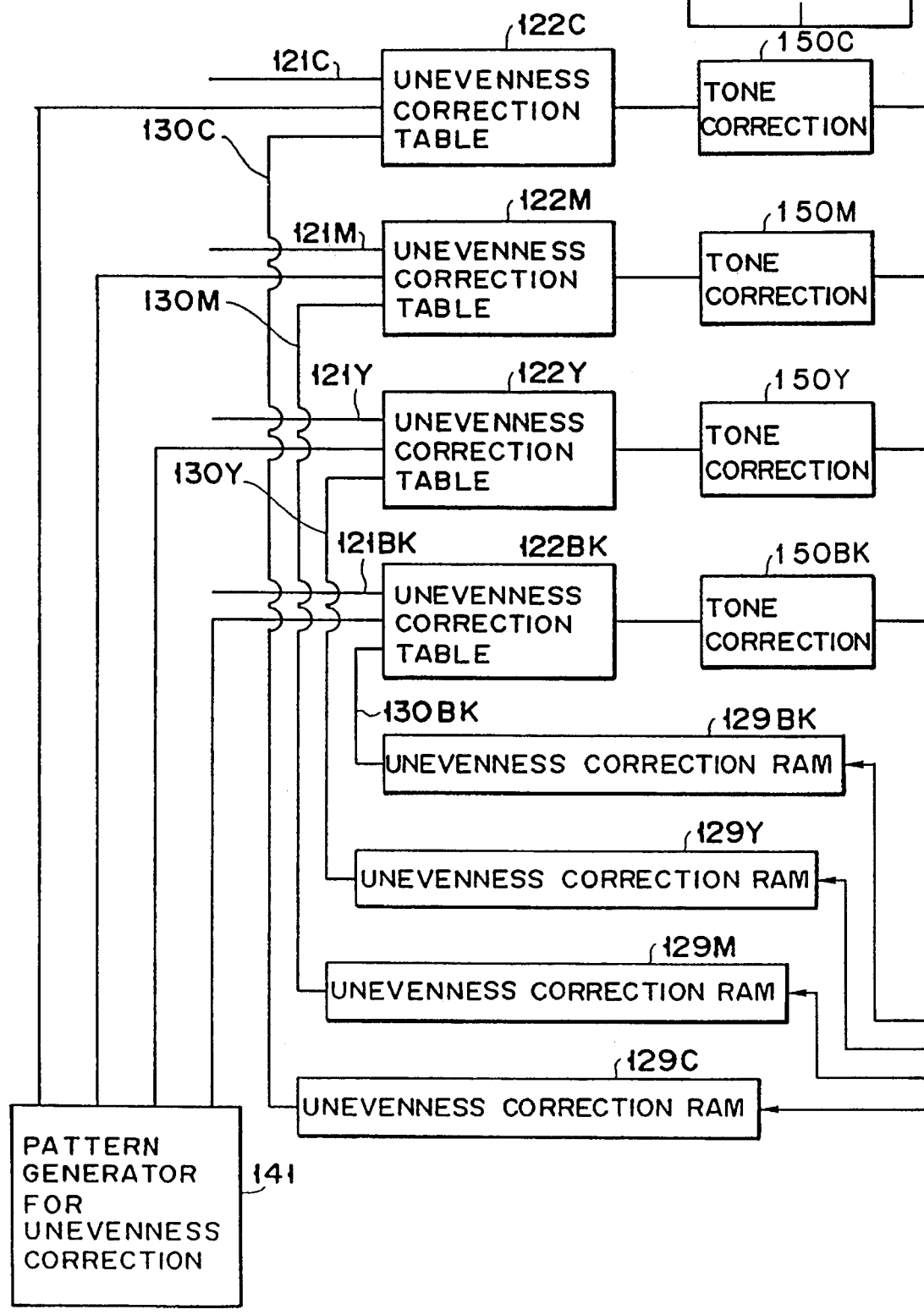

F I G. 45
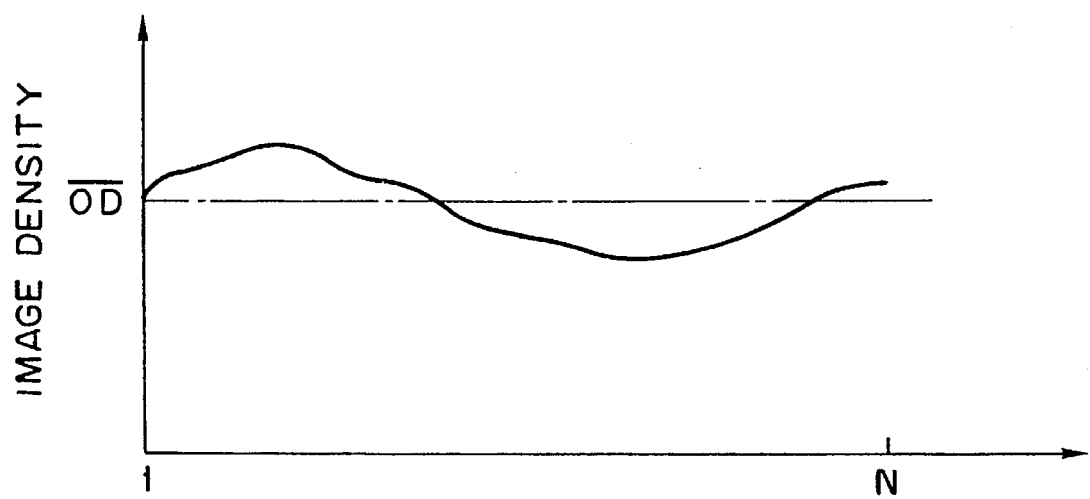

IMAGE READING APPARATUS WITH A FUNCTION FOR CORRECTING NONUNIFORMITY IN RECORDING DENSITY

This application is a continuation of application Ser. No. 08/104,591 filed Aug. 10, 1993, which is a continuation of Ser. No. 07/684,339, filed Apr. 12, 1991, both now abandoned.

BACKGROUND OF THE INVENTION

1. Field of the Invention

The present invention relates to an image recording apparatus for recording an image by using a recording head in which a plurality of recording devices are arranged.

2. Related Background Art

With wide use of information processing equipment such as copying machines, word processors, computers and the like and communicating equipment, digital image recording apparatuses for recording images by an ink jet recording method or a thermal transferring method have been rapidly widely used as an image forming (recording) apparatuses for the above-described equipment. The recording apparatus of the type described above usually employs a recording head (hereinafter called a "multi-head") in which a plurality of recording elements are integrally disposed in order to raise the recording speed.

For example, an ink jet recording head usually comprises a so-called "multi-nozzle head" in which a plurality of ink orifices and liquid passages are integrally provided. A thermal head arranged to act in accordance with a thermal transfer method or a heat sensitive method usually comprises a plurality of heaters integrally provided therein.

However, it is difficult to uniformly manufacture the recording elements of the multi-head due to non-uniform characteristics generated in the manufacturing process or non-uniform characteristics of the material of the head. Therefore, the recording elements involve non-uniform characteristics to a certain degree. For example, the above-described multi-nozzle head encounters a non-uniform shape of its orifice or liquid passage. On the other hand, the thermal head encounters a problem of non-uniform shape or resistance of its heater. The non-uniformity of the characteristics between the recording elements will cause uneven size or image density of dots to be recorded by each of the recording elements. Consequently, uneven image density is generated in the recorded image.

In order to overcome the above-described problem, a variety of methods have been disclosed each of which is arranged in such a manner that the uneven image density is visually detected or the adjust image is visually inspected and a signal to be supplied to each of the recording elements is manually corrected whereby an even image is obtained.

An ordinary manual correction operation is performed as follows: When an uneven image density as shown in FIG. 44C is visually detected when the same signal is supplied to each of recording elements 331 arranged, as shown in FIG. 44A in a multi-head 330, the input signal is, as shown in FIG. 44D, corrected so as to supply a large input signal to the recording elements in a portion the density of which is low, while a small input signal is supplied to the recording elements in a portion the density of which is high.

In a recording method in which the dot diameter or the dot density can be varied, the diameter of dot to be recorded by each of the recording elements is modified in accordance with the input. As a result, a gradation of recording can be achieved. For example, in an ink jet recording head arranged to act in accordance with a piezoelectric method or a bubble jet method, driving voltage or the width of pulses to be applied to an ejecting energy generating element such as the piezoelectric element or an eletrothermal conversion element is modulated in accordance with the input signal. In the thermal head, the driving voltage or the pulse width to be applied to each of the heaters is modulated in accordance with the same. As a result, it can be considered that the dot diameter or the dot density realized by each of the recording elements can be made uniform. Therefore, the image distribution can be made uniform as shown in FIG. 44E. In a case where it is difficult to modulate the driving voltage or the pulse width or in a case where it is difficult to adjust the image density in a wide range even if the above-described factors are modified, for example in a case where one pixel is constituted by a plurality of dots, the number of dots to be recorded is modified in response to the input signal. As a result, a multiplicity of dots can be recorded in the portion the density of which is low, while a reduced number of dots can be recorded in the portion the density of which is high. In a case where one pixel is constituted by one dot, the dot diameter can be changed by modulating the number of ink ejections (number of ink jetting) with respect to one pixel in an ink jet recording apparatus. As a result, the image density can be made uniform as shown in FIG. 44.

According to a disclosure made by the applicant of the present invention in Japanese Patent Appln. Laid-Open No. 57-41965, a color image is automatically read out by an optical sensor, a correction signal is supplied to ink jet recording heads of the corresponding colors whereby a desired color image is formed. According to this disclosure, a basic automatic adjustment has been disclosed and an important technology has been disclosed. However, a variety of problems arise when the above-described technology is adapted to a various apparatuses. In the above-described disclosure, there is no description about the technological problem which can first be overcome by the present invention.

On the other hand, as disclosed in Japanese Patent Appln. Laid-Open No. 60-206660, U.S. Pat. No. 4,328,504, Japanese Patent Appln. Laid-Open Nos. 50-147241 and 54-27728, a structure has been known which is arranged in such a manner that the position which the droplet has reached is automatically read and it is corrected so as to adjust the position which the droplet reaches. According to any one of the above-described structures, there is no description about the technological problem which can first be overcome by the present invention although a common technology of automatically adjusting the operation has been disclosed.

In order to overcome the above-described problems, it is effective to arrange the image forming apparatus in such a manner that an image density reading portion is provided therein and the uneven image density distribution in a range of the configuration of the recording elements is periodically read so as to remake the uneven image density data. In the structure constituted as described above, the correction data can be properly processed again if the uneven image density distribution of the head is changed. Therefore, a uniform image without unevenness can always be formed.

FIG. 48 illustrates an example of an uneven image density reading unit for use in the above-described method. Referring to FIG. 48, reference numeral 501 represents a recording medium on which a test pattern for measuring the unevenness is formed. Reference numeral 502 represents a light source for irradiating the surface of the recording medium 501. Reference numeral 503 represents a sensor for reading reflected light from the surface of the recording medium 501. Reference numerals 504 and 505 represent lenses and 506 represents a reading unit on which the above-described elements are mounted. The thus constituted reading unit 506 is caused to perform the scanning operation to read the unevenness distribution whereby the unevenness correction data can be remade.

FIG. 49 illustrates another example of the uneven image density reading unit. Referring to FIG. 49, reference numeral 520 represents a line sensor comprising a CCD or the like, 521 represents a reading pixel of the line sensor 520 and 524 represents a correction test pattern in which recording elements are formed in a width d in direction y. Since line sensor 520 and the recording medium relatively move in direction x, the density of the test pattern formed by the recording head is read out. Therefore, data read by each of the pixels 521 of the line sensor 520 corresponds to the density of data formed by each of the recording elements of the recording head.

When the image density is accurately measured or the correction degree is accurately determined, there has been unevenness depending upon the status of the apparatus. There has been a known structure in which an initial adjustment is performed when the recording operation of the apparatus is started for the purpose of obtaining a desired result of the recording operation. However, since the above-described accurate adjustment is performed when it is considered necessary, a satisfactory effect cannot be obtained heretofore.

In particular, the temperature of the recording head is controlled in a predetermined range in order to stabilize its recording characteristics (the ink ejecting characteristics of the ink jet recording head). However, the uneven image density correction suitable for a certain temperature range is not always suitable for another temperature range. Furthermore, if recording of the test pattern at the correction is performed in a state where the recording head cannot act normally, there is a fear that uneven image density in a case where the operation is performed with normal recording characteristics cannot be correctly recognized.

For example, in a case where the unevenness correction data is remade by using a half tone image of a duty of 50%, a satisfactory unevenness correction effect at the 50% half tone can be obtained. However, a satisfactory effect cannot always be obtained at a 30% half tone or 75% half tone. The reason for this lies in that the gradation characteristics of the multi-head are not always linear characteristics as shown in FIG. 46. Therefore, the similar effect cannot be always obtained in the overall area of the input signal by the correcting operation performed as shown FIG. 47.

Therefore, in a case where there is a high image density portion in the original document and unevenness included in this portion is particularly precisely corrected, a sufficient unevenness correction effect cannot be obtained even if unevenness correction data processed with a 50% half tone test pattern is used.

In an ink jet recording operation, ink expands (runs) laterally when ink is absorbed by paper. Therefore, the sub-scanning quantity of paper is made slightly larger than the recording width for one line so as to cover the joints of the lines. However, the quantity of the expansion of the recording width is different depending upon the quantity of recording ink. If a large quantity of recording ink is used, it becomes large, while the same becomes small when a reduced quantity of the recording ink is used. Therefore, in a case where the printing duty is changed as the test pattern for making the unevenness correction data, for example, in a case where the paper sub-scanning quantity is arranged to be the most suitable quantity at the time of the printing duty of 50%, the width of the expansion becomes too large when a test pattern of a duty of 80% is printed. Therefore, the joints of the lines overlap and the density of the joints are raised excessively. If the unevenness correction data is processed by using the above-described pattern, data, which causes a γ-straight line having a small inclination with respect to the end nozzle to be selected, can be processed. When a copying operation is performed by using the above-described data is used, a problem arises in that the end portion of each line becomes too light and the joints generate white linear portions.

When a copying operation is performed by using unevenness correction data processed by a test pattern the printing duty of which is low, a problem arises in that the joints of the lines generate black linear portions. The above-described problems also arise depending upon the type of the recording material.

SUMMARY OF THE INVENTION

To this end, an object of the present invention is to provide an improved image recording apparatus.

Another object of the present invention is to provide an image recording apparatus capable of recording a high grade image.

Another object of the present invention is to provide an image recording apparatus in which uneven image density of the recorded image can be prevented.

Another object of the present invention is to provide an image recording apparatus arranged in such a manner that a test pattern is formed by using a recording head in which a plurality of recording elements are arranged, the density of the test pattern is read, and the driving conditions of the plurality of the recording elements are corrected, whereby the test pattern is accurately printed on the recording medium.

Another object of the present invention is to provide an image recording apparatus arranged in such a manner that the recording operation performed by the recording head is stabilized before the test pattern is formed.

Another object of the present invention is to provide an image recording apparatus arranged in such a manner that the test pattern is read after fixing of the printed test pattern has been stabilized.

Another object of the present invention is to provide an image recording apparatus capable of shortening the time necessary to complete a process of correcting the driving conditions of the plurality of the recording elements in accordance with the result of reading.

Another object of the present invention is to provide an image recording apparatus arranged in such a manner that a test pattern which is suitable for the image density of an original document is read, whereby the driving conditions of the plurality of the recording elements can be corrected in accordance with the result of reading.

Another object of the present invention is to provide an image recording apparatus capable of eliminating an influence of the uneven image density in the end portion of the test pattern.

Other and further objects, features and advantages of the invention will be appear more fully from the following description.

BRIEF DESCRIPTION OF THE DRAWINGS

FIGS. 7A, 7B and 7C illustrate the state of enlarging the dynamic range of the quantity of light received by a sensor in accordance with color;

FIGS. 12A, 12B and 12C illustrate the change in read values which corresponds to the change in the scanning speed of the reading unit;

FIG. 18 illustrates the change of the temperature of the recording head;

FIGS. 44A to 47 illustrate the uneven image density correction performed by a multi-nozzle head.

DETAILED DESCRIPTION OF PREFERRED EMBODIMENTS

Figure 2A:
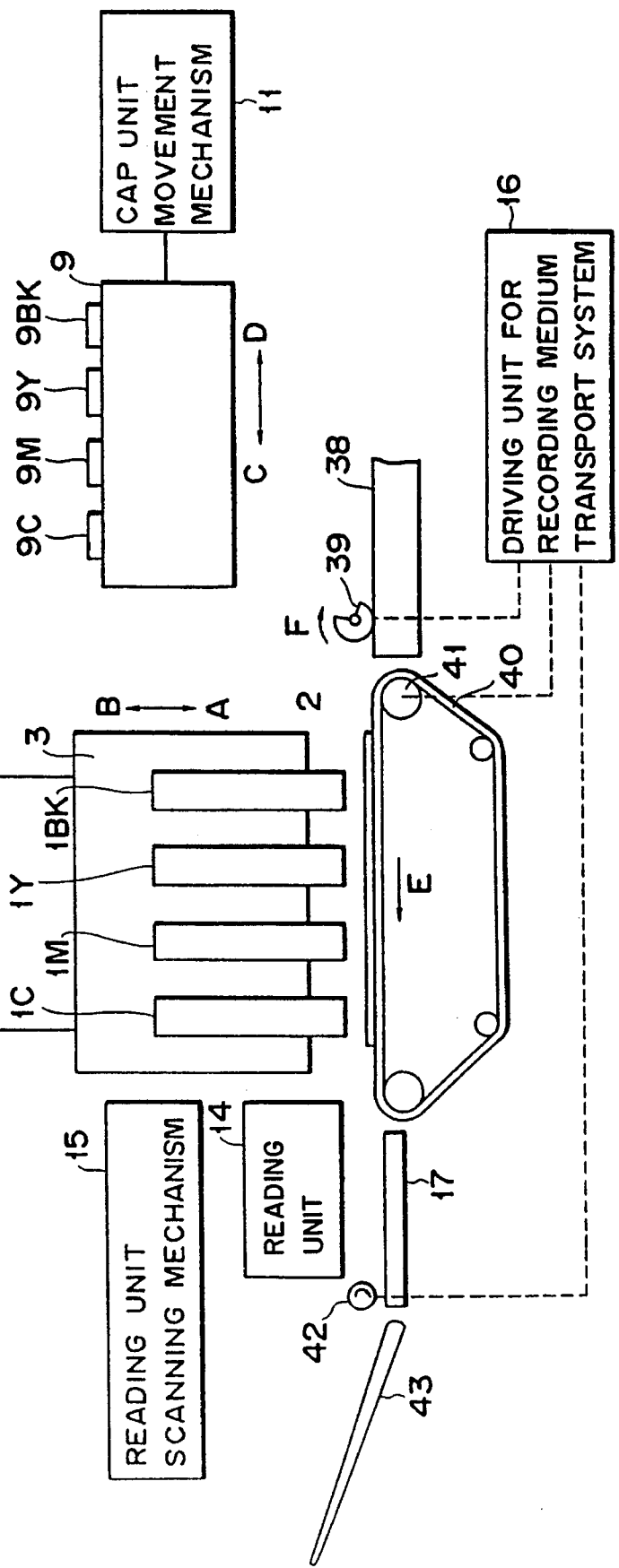
FIG. 2B is a schematic view which illustrates its ink system.

Preferred embodiments of the present invention will now be described with reference to the drawings in the following sequential order.

(1) Outline (FIG. 1)
(2) Mechanical structure of the Apparatus (FIG. 2)
(3) Reading system (FIGS. 3 to 12)
(4) Control system (FIGS. 13 to 15)
(5) Sequence for correcting unevenness (FIGS. 16 to 25)
(6) Second embodiment (FIGS. 26 to 28)
(7) Third embodiment (FIGS. 29 to 31)
(8) Fourth embodiment (FIGS. 32 to 33)
(9) Fifth embodiment (FIG. 34)
(10) Sixth embodiment (FIG. 35)
(11) Seventh embodiment (FIGS. 36 to 40 )
(12) Eighth Embodiment (FIGS. 41 to 43)
(13) Others (1) Outline FIG. 1 is a schematic view which illustrates an essential portion of this embodiment. Referring to FIG. 1, reference numeral 1001 represents one or a plurality of recording heads provided in accordance with the status of an image forming apparatus. According to the following embodiments, the recording head comprises a so-called full multi-type ink jet recording head in which a plurality of orifices are arranged in a region which corresponds to the width of a recording medium 1002. Reference numeral 1040 represents a means for conveying the recording medium 1002, the conveying means 1040 conveying the recording medium 1002 to a position at which an image is recorded by the recording head 1001.

Reference numeral 1014 represents a means for reading the uneven image density for reading a test pattern formed on the recording medium 1002 by the recording head 1001 so as to correct the uneven density of an image which has been recorded by the recording head 1001. The uneven image density reading means 1014 comprises a light source for applying light to the surface of the recording medium 1002, a sensor for receiving light reflected from the surface of the recording medium 1002 and other conversion circuits. Reference numeral 1020 represents an uneven image density correction means for correcting the conditions for operating the recording head 1001 in accordance with the uneven image density read from the test pattern. Reference numeral 1017 represents a platen for restricting the recording medium to flatten at a position at which the test pattern is read by the uneven image density reading means 1014.

Reference numeral 1016 represents a means for stabilized fixing of the test pattern recorded on the surface of the recording medium 1002. According to the embodiments which will be described hereinafter, the fixing stabilizing means 1016 stops the conveyance action of the recording medium performed by the conveying means 1040 or lowers the speed at which the recording medium is conveyed. As a result, the uneven image density can be accurately read.

In order to stabilize fixing, a structure may be employed in place of the structure according to the embodiments, the structure being arranged in such a manner that the length of the conveyance passage from the position at which the recording head 1001 performs the recording operation to the position at which the reading means 1014 performs the reading operation (or the conveyance passage may be bent). Another structure may be employed in which a fixing heater is used in such a manner that it is operated if necessary provided that a correction means is present or in such a manner that the total quantity of heat applied is relatively enlarged. However, it is effective to employ the structure according to the present invention in terms of reducing the overall size of the apparatus.

Although the structure according to this embodiment is arranged to read the image density, it is also effective when it is used to determine the want of a desired image due to the accuracy of the impact range of the droplet or accidental non-ejection.

In a case where an image is temporarily discharged from the apparatus and then it is read by an original document reading apparatus (a copying machine or a facsimile apparatus), it is preferable to employ a structure in which a time taken to discharge the image from the apparatus is elongated until the fixing operation is completed. In this case, the fixing can be further stabilized.

Reference numeral 1113 represents a temperature regulation means for stabilizing the recording operation by adjusting the temperature of the recording head 1001 to a proper temperature at the time of the uneven image density correction operation. As will be specifically described below in the embodiments, its structure may be arranged to comprise a heating means such as an external heater provided for the recording head 1001 and a cooling means such as a fan. The heating means may be arranged in such a manner that it generates heat of a quantity which does not cause recording (ink ejection) to be performed in a case where the recording head 1001 possesses a heating element (it is an electrothermal converting body in a case of an ink jet recording head). The structure may be arranged optionally. Similarly, the cooling means may be arranged optionally. It may therefore be arranged to have, for example, a Peltier element.

Reference numeral 1107 represents an ejection stabilizing means which may be a means for applying pressure to an ink supply system of the recording head 1001, a means for causing ink to be forcibly ejected through an orifice by performing sucking through the surface of the recording head 1001 in which the orifice is formed, means for cleaning the surface in which the orifice is formed, a means for causing ink to be ejected by operating an ejecting energy generating element of the recording head 1001 or their combination. Reference numeral 1101 represents a control means for controlling the elements of the apparatus.

The test pattern is recorded in a state where the temperature of the recording head 1001 is properly adjusted by the temperature regulating means 1113. Furthermore, the uneven image density is corrected in accordance with the thus recorded test pattern. As a result, if a range is present in the temperatures necessary to perform the recording operation, the uneven image density is corrected to be adapted to the overall range. Therefore, a substantially uniform image can be obtained. Furthermore, when the ejection is stabilized prior to the recording of the test pattern at the time of the correcting operation, normal operation characteristics of the recording head 1001 can be obtained. Therefore, the uneven image density can correctly be recognized. That is, accurate information about the uneven image density can be obtained by the above-described means so that the uneven image density can always be corrected.

According to this embodiment, the recording stabilizing means is constituted by combining the temperature regulation means and the other stabilizing means. However, a structure in which either of the above-described means is employed is included in the scope of the present invention.

(2) The outline of the mechanical structure of the apparatus

FIG. 2A illustrates the schematic structure of an ink jet recording apparatus according to an embodiment of the present invention.

Symbols 1C, 1M, 1Y and 1BK respectively represent cyan, magenta, yellow and black recording heads constituting a full line head 1 in which orifices are arranged at a density of 400 dpi (dot/inch) in a range which corresponds to the width of the recording medium when viewed in the direction in which it is conveyed, that is, the shorter length (297 mm) of the recording medium of A3 size according to this embodiment. Reference numeral 3 represents a head holder for integrally holding the above-described recording heads 1C to 1BK, the head holder 3 being capable of moving by a head holder movement mechanism 5 in direction A toward the illustrated recording position and in direction B away from the recording position. The head holder movement mechanism 5 comprises, for example, a driving power source such as a motor, a transmitting mechanism for transmitting the driving force to the head holder 3 and a guide member or the like for guiding the movement of the head holder 3. The head holder movement mechanism 5 optionally translates the head holder 3 in the direction A or B so that the head holder 3 is positioned at the recording position at which the orifices of the recording heads 1C to 1BK confront the recording medium at predetermined intervals, a retracted position at which the introduction of a capping unit to be described later is received and a position at which each of the heads is capped.

Reference numeral 7 represents an ink supply/circulation system unit comprising a supply passage for supplying ink of various colors to each of the recording heads, a circulation passage for refreshing ink and optional pump and the like. The ink supply/circulation system 7 operates a pump provided to act in an ejection recovery process to be described later so as to apply pressure to the ink supply passage. As a result, ink can be forcibly ejected from each of the recording heads.

Reference numeral 9 represents the capping unit comprising caps 9C, 9M, 9Y and 9BK capable of confronting or connecting to the corresponding recording heads 1C, 1M, 1Y and 1BK and made of an elastic material such as rubber for the purpose of satisfactorily coming in hermetical contact with the above-described elements. The capping unit 9 further comprises an absorbing body for absorbing ink (waste ink) received by the recording head in the ejection recovery process and a waste ink passage through which waste ink is introduced into a waste ink tank (omitted from illustration). Reference numeral 11 represents a capping unit movement mechanism comprising a motor, a transmission mechanism, a guide member and the like. The capping unit movement mechanism 11 moves the capping unit 9 in illustrated direction C or D to a position below the head holder 3 which has been brought to -5 the retracted position and a position at which the capping unit 9 does not hinder the downward movement of the head holder 3 at the time of the recording operation.

In the ejection recovery process, the head holder 3 is moved upwards in direction B to a position at which the introduction of the capping unit 9 is not hindered. Furthermore, the cap unit 9 is brought into a space which is generated by the above-described upward movement of the head unit 3 so that the capping unit 9 is brought to a position at which the corresponding head and the cap confront each other. In this state or a state in which the portion of the recording head in which the orifice is formed confronts or connects to the cap at a predetermined interval by downwards moving the head holder 3, the pump of the ink supply/circulation system unit 7 is operated so that ink is forcibly ejected together with a factor for causing defective ejection such as dust, bubbles and ink the viscosity of which has been raised. As a result, the ink discharging state at the time of the recording operation can be stabilized. When the recording operation is completed or stopped, the head may be capped for the purpose of protecting the orifice from being dried.

Reference numeral 38 represents a cassette for accommodating the recording medium 2 such as a film for OHP. The recording medium 2 accommodated in the cassette 38 is separated and fed by a pickup roller 39 which rotates in direction F. Reference numeral 40 represents a conveying belt for conveying the thus fed recording medium 2 in direction E to the position at which the recording operation is performed by the recording heads 1C to 1BK, the conveying belt 40 being arranged between rollers 41. In order to smoothly convey the recording medium 2 and secure a proper distance (head gap) between the recording head and the recording medium by bringing the recording medium 2 into satisfactorily contact with the belt 40, a means for performing an electrostatical absorption or a means for performing an air absorption may be disposed. As an alternative to this, a member such as rollers for retaining the recording medium may be provided.

Reference numeral 42 represents a discharge roller for discharging the recording medium 2 to which information has been recorded. Reference numeral 43 represents a tray on which the recording medium sheet thus discharged are stacked.

Reference numeral 14 represents a uneven image density reading unit disposed between the position at which the recording is performed by the recording heads 1C to 1BK and the discharging roller 42 in such a manner that it confronts the surface of the recording medium 2 on which information is recorded. The uneven density reading unit 14 reads the test pattern formed on the recording medium 2 at the time of the uneven image density correcting process. Reference numeral 15 represents a mechanism for scanning the uneven image density reading unit to be described later with reference to FIG. 3. Reference numeral 16 represents a driving portion for driving elements relating to the conveyance of the recording medium 2, that is, the feeding roller 39, the roller 41 and the discharging roller 42.

When the uneven image density is corrected, the recording medium (according to this embodiment, exclusive paper to be described later is employed) accommodated in the cassette 38 is fed on the conveying belt 40 when the pickup roller 39 is rotated in the direction F similarly to the normal recording mode. When the roller 41 is rotated, the recording medium 2 is conveyed in the direction E together with the conveying belt 40. At this time, each of the recording heads is operated so that the test pattern is recorded to the surface of the recording medium 2.

Then, the recording medium 2 on which the test pattern has been recorded is conveyed to the position at which it confronts the uneven image density reading unit 14 so that the test pattern recorded by the reading sensor or the like is read before the recording medium 2 is discharged to the tray 43.

According to this embodiment, since the exclusive paper is used as the recording medium on which the test pattern is formed, a structure may be employed which is arranged in such a manner that another paper feeding method (a so-called manual paper feeding) can be performed in addition to the method in which the cassette 38 is used for the purpose of easily operating the apparatus.

Figure 2B:
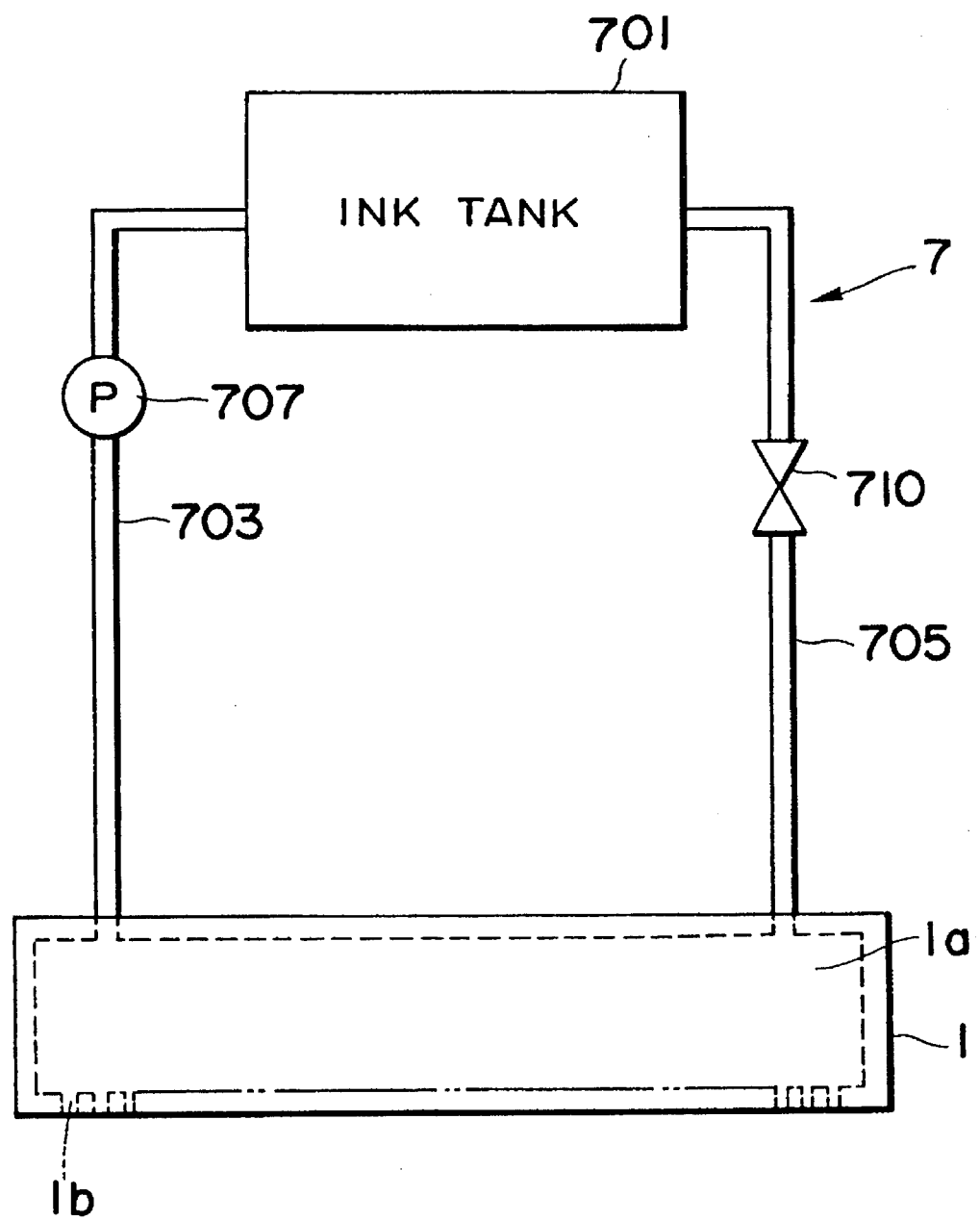

FIG. 2B schematically illustrates an ink system composed of the recording head 1 (the recording heads 1C, 1M, 1Y and 1BK are collectively represented) and the ink supply/circulation system unit 7.

The recording head includes a common liquid chamber 1a to which an ink pipe is connected from an ink supply source, the common liquid chamber 1a being connected to an ink orifice 1b via liquid passages. Each of the liquid passages has an ejection energy generating element such as an electrothermal converting element so that ink is ejected from the corresponding orifice when power is supplied to the ejection energy generating element.

Reference numeral 701 represents an ink tank serving as the ink supply source, the ink tank 702 being connected to the common liquid chamber 1a in the recording head 1 via the ink passages 703 and 705. Reference numeral 707 represents a pump disposed at an intermediate position of the ink passage 703. Reference numeral 710 represents a valve disposed at an intermediate position of the ink passage 705.

As a result of the thus constituted structure, the ink system can be established in each of the following modes by properly switching the operation mode of the pump 707 and by opening/closing the valve 710:

(1) Print mode

Ink required to perform the recording operation is supplied from the ink tank 701 to the head 1. Since this embodiment is adapted to an ink jet printer of the on-demand system, no pressure is applied to ink at the time of the recording operation. Therefore, the pump 707 is not operated, and the valve 710 is opened.

In this mode, ink is supplied to the head 1 via the ink passage 705 after ink has been ejected from the head 1.

(2) Circulation mode

Circulation mode is a mode which is necessary when ink is supplied to each of the heads when the apparatus is initialized or bubbles in the head or the supply passage is removed and as well as the ink in the above-described elements is refreshed. The circulation mode is selected when the apparatus, which has been allowed to stand for a long time, is again used.

In this mode, since the valve 710 is opened and the pump 707 is operated, ink passes the ink tank 701, the ink passage 703, head 1 and the ink passage 705, ink thus being circulated to the ink tank 701.

(3) Pressure application mode

A pressure application mode is a mode for removing ink adjacent to the orifice of the head 1 and the viscosity of which has been raised or for overcoming blinding of the orifice or the liquid passage by raising the pressure of the ink so as to be forcibly ejected from the orifice 1b.

In this mode, the valve 710 is opened and the pump 707 is operated so that ink is supplied to the recording head 1 from the ink tank 701 via the ink passage 703.

(3) Reading system

Figure 3:
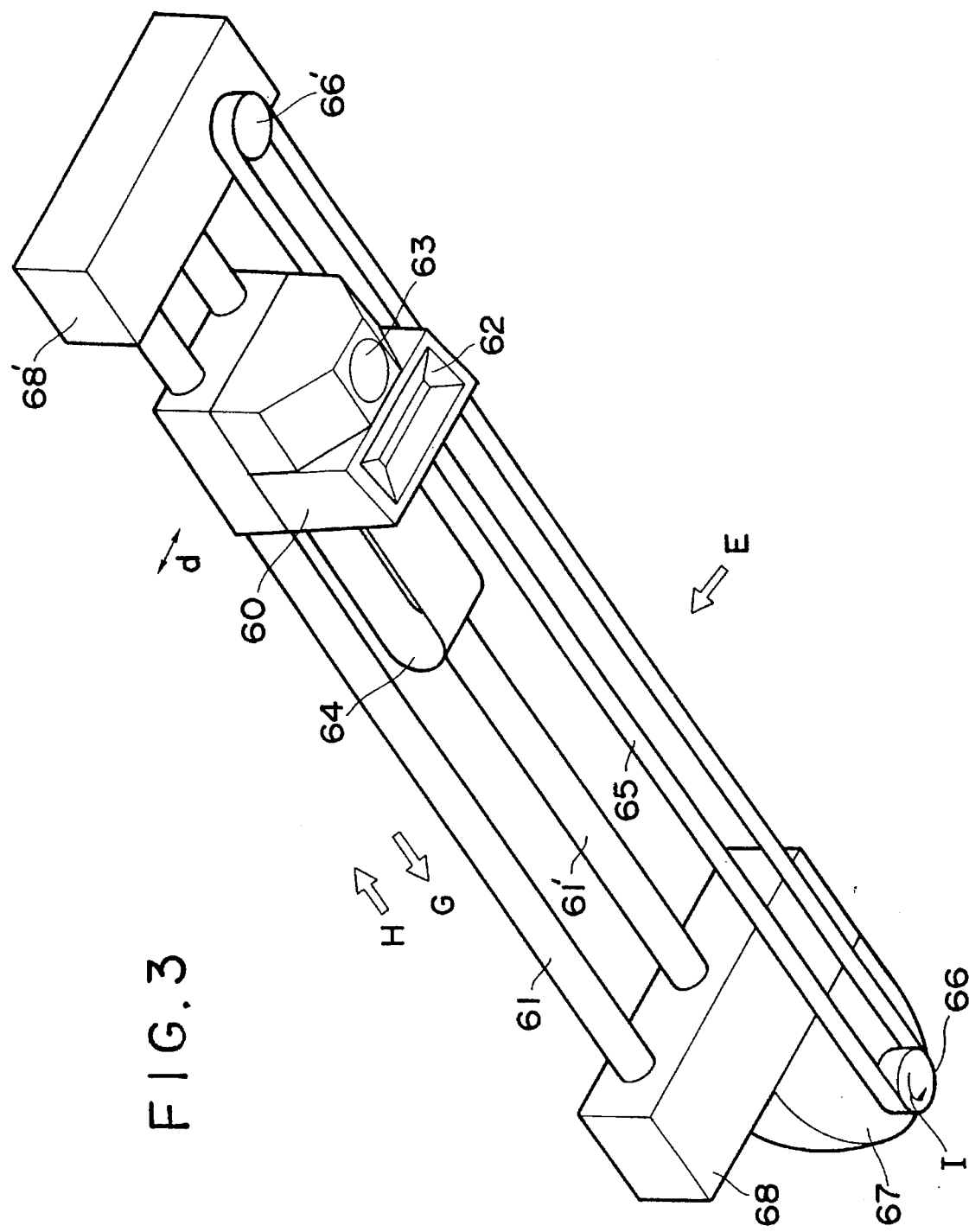
FIG. 3 is a perspective view which illustrates an example of the structure of a reading unit and its scanning mechanism shown in FIG. 2A.

FIG. 3 illustrates the structure of the reading unit and its scanning mechanism according to this embodiment.

A recording medium guide portion (the portion designated by reference numeral 17 shown in FIG. 2A) in a flat shape is disposed below the scanning portion of a reading head 60. The recording medium 2 is conveyed to the surface of the guide portion so that the image formed on the recording medium is read by the reading head 60. The position of the reading unit 60 shown in FIG. 3 is the home position for the reading head 60. It is preferable that the above-described home position is sidewards outside the range in which the recording medium is conveyed. The reason for this lies in that each of the elements of the reading unit must be protected from a risk that a water droplet or the like adheres to the same due to the evaporation of the ink.

Referring to FIG. 3, reference numeral 60 represents the reading head arranged in such a manner it slides on a pair of guide rails 61 and 61' so as to read the image. The reading head 60 comprises a light source for illuminating the original document and a lens 63 for forming the image of the original document on a photoelectrical converting element such as a CCD. Reference numeral 64 represents a flexible lead wire bundle for supplying power to the light source 62 and the photoelectrical converting element and for transmitting an image signal from the photoelectrical converting element.

The reading head 60 is secured to a driving force transmitting portion 65 such as a wire for performing the main scanning operation (in directions G and H) in a direction perpendicular to the direction in which the recording medium is conveyed. The driving force transmitting portion 65 in the main scanning direction is arranged between pulleys 66 and 66' so as to be moved when the main scanning pulse motor 67 is rotated. When the pulse motor 67 is rotated in direction I, the reading head 60 reads information about the line of the image which is perpendicular to the main scanning direction G with the number of bits which correspond to the photoelectrical converting elements.

After the image has been read for a predetermined width, the main scanning pulse motor 67 is rotated in a reverse direction to the direction designated by the arrow I. As a result, the reading head 60 is moved in the direction H until it returns to the original position. Reference numerals 68 and 68' represent supporting members.

When the main scanning operation is performed one time for the purpose of reading the uneven image density, the reading operation is thus completed. However, when the uneven image density for each of a plurality of colors is read or when the average value of a plurality of reading operations about a sole color is obtained, the recording medium 2 is, by the discharging roller 42, conveyed in the direction E for a predetermined distance (for a pitch between color patterns or distance d which is the same as the width of the read out image in the one time of the main scanning operation performed in the direction G) before the recording medium 2 is stopped. Then, the main scanning G is again started. The above-described main scanning G, the return H in the main scanning direction and the movement of the recording medium (the sub-scanning operation) are repeated so that the uneven image density of each of the color patterns can be read or the uneven image density can be read a plurality of times. In this process, the conveyance of the recording medium 2 may be replaced by a sub-scanning operation performed by the reading unit. Furthermore, if the sensor is arranged to be a full line sensor, the mechanism relating to the main scanning operation can be eliminated from the overall structure.

The image signal thus read out is transmitted to an image forming portion so as to be used in a process for correcting the conditions for operating the recording head in a manner to be described later.

According to the present invention, the definition of "the prevention of the generation of the uneven image density at the time of forming an image" includes at least one of the following operations: the image density formed by the liquid droplets ejected from a plurality of orifices formed in the recording head is equalized by the recording head; the image densities formed by a plurality of heads are equalized; and equalization is performed so as to obtain a desired color by mixing a plurality of colors or to obtain a desired density. It is preferable to meet a plurality of the above-described factors.

In order to achieve the above-described requirement, it is preferable that a density equalization correcting means is arranged in such a manner that the correcting conditions are automatically determined by automatically reading a reference character printed which gives the correcting conditions. Furthermore, a manual adjustment device for a fine adjustment or a user adjustment may be additionally provided.

An object of the correction obtained by the correcting conditions may be the most suitable printing conditions, an adjustment to a predetermined range including an allowable range and a reference density which is changed in accordance with a desired image. Furthermore, all of objects included in the thesis of the correction are included.

For example, a correction of uneven image density of a multi-head having N recording elements and arranged to converge the printed output to each of the elements to an average density value will now be described.

An assumption is made that the density distribution realized when printing is performed by operating each of elements (1 to N) in response to an equal image signal S is as shown in FIG. 44. First, densities OD1 to ODN of the portions corresponding to the recording elements are measured so as to obtain an average density $$\overline{OD} = \sum_{n=1}^{N} ODn/N$$

as a subject of the correction. The above-described average density is not limited to that for each of the elements. It may be obtained by integrating the quantities of reflected light or by any of the other known methods.

Figure 46:
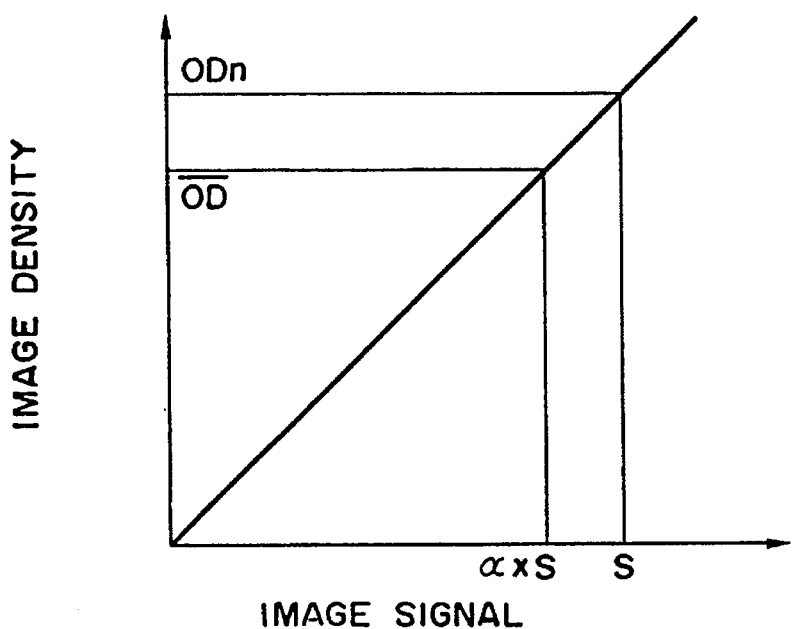
Figure 47:
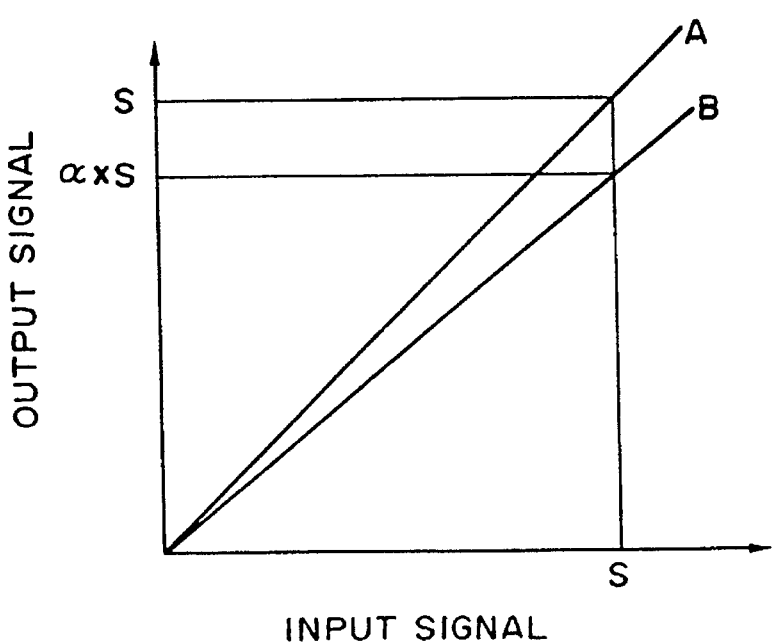
Figure 48:
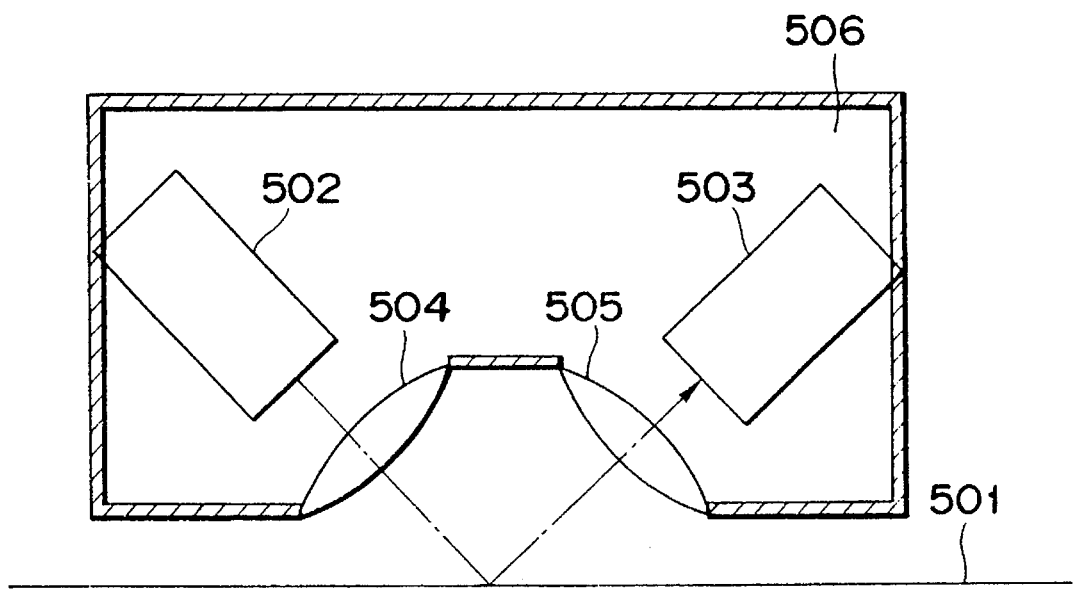
FIGS. 48 and 49 illustrate two examples of a reading unit for correcting the uneven image density correction.
Figure 49:
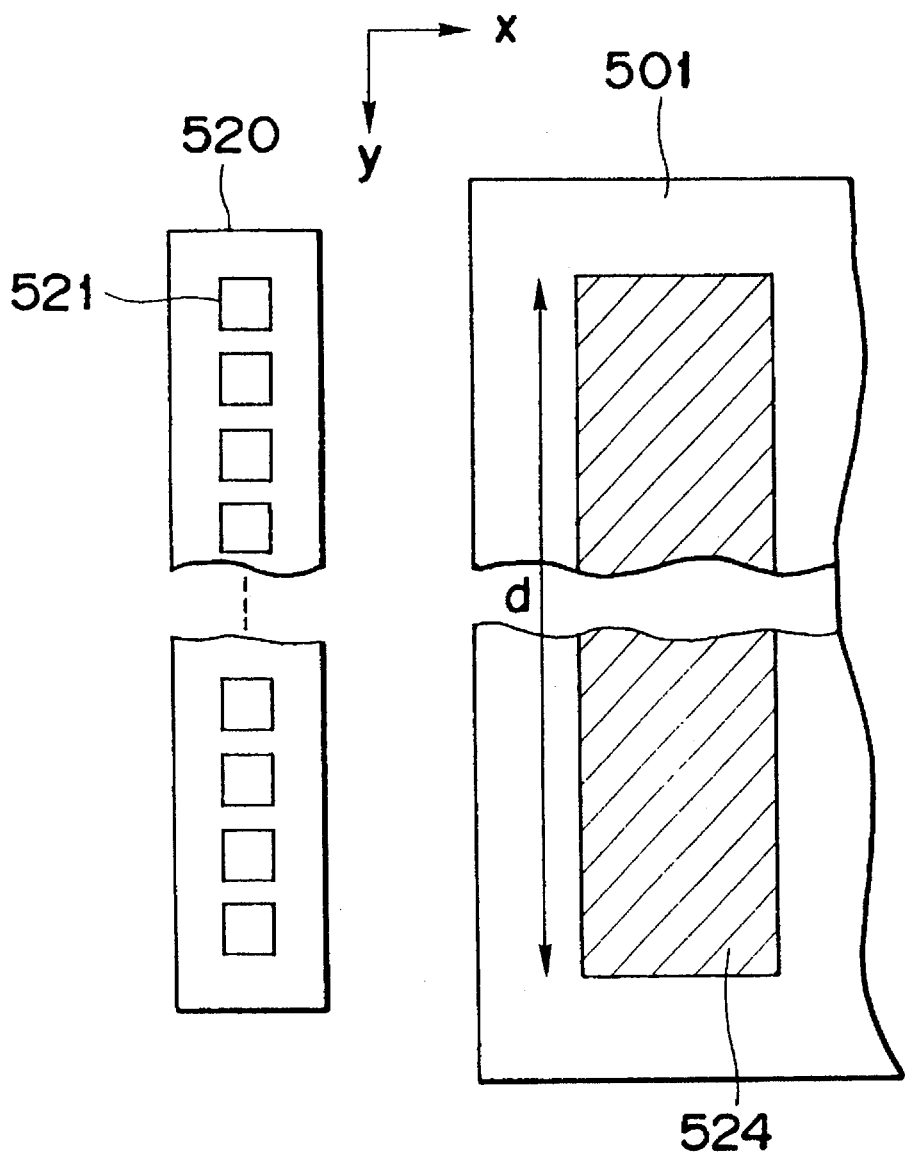

Assuming that the relationship between the value of an image signal and a certain element or an output density from a certain element group is as shown in FIG. 46, it is necessary for a signal to be actually supplied to this element or the element group to be obtained by correcting signal S by correction coefficient α so that the object density $\overline{OD}$ is realized. That is, correction signal S obtained by correcting the signal S in such a manner that α×S=($\overline{OD}$/ODn)×S must be given to the element or the element group in response to the input signal S. Specifically, it can be executed by subjecting the input image signal to a table conversion as shown in FIG. 47. Referring to FIG. 47, straight line A is a straight line having an inclination of 1.0 and is a table which transmits the supplied signal as it is, while straight line B is a straight line having an inclination of a =$\overline{OD}$/ODn and is a table which receives the signal S and converts it into α·S so as to transmit it. Therefore, when the head is operated after the image signal corresponding to the n-th recording element has been subjected to a table conversion as the straight B (see FIG. 47) in which correction coefficient αnis determined for each of the tables, the density of each of the portions recorded by N recording elements can be made the same as $\overline{OD}$. When all of the recording elements are subjected to the above-described process, the uneven image density can be corrected. As a result, an equal image can be obtained. That is, if data about the table conversion (to which the image signal corresponding to the recording element must be subjected) has been previously obtained, the unevenness can be corrected.

The above-described correction may be subjected to a density comparison for each of nozzle groups (in units of 3 to 5 nozzles) so as to arrange it as an approximate equalizing process.

The uneven image density can be corrected by the above-described method. It can be expected that the uneven image density will be generated due to change in the state where the apparatus is used, the change of environmental conditions, change in the uneven image density before the correction is performed or change in the correction circuit due to a lapse of time. Accordingly, the quantity of correction of the supplied signal must be changed. It might be considered feasible that the reason for the above-described change lies in that the density distribution varies due to an adhesion of a deposition from ink to a portion adjacent to the ink orifice or adhesion of foreign matter as the apparatus is used in a case of the ink jet recording head. It can be predicted from a fact which takes place in a thermal head that the density distribution is sometimes changed due to the deterioration or the decomposition of each of the heaters. In the above-described case, the unevenness cannot be satisfactorily corrected with the quantity of correction of an input which has been first set when the apparatus was manufactured. Therefore, a problem to be overcome arises in that the unevenness becomes apparent as the apparatus is used for a long time.

It is preferable that the interval between the reading unit and the recording medium on which the test pattern has been recorded be maintained to be a predetermined length although it must be varied depending upon the reading accuracy. Therefore, a structure shown in FIGS. 4 to 6 may be employed so as to maintain the above-described interval at a predetermined length.

Figure 4:
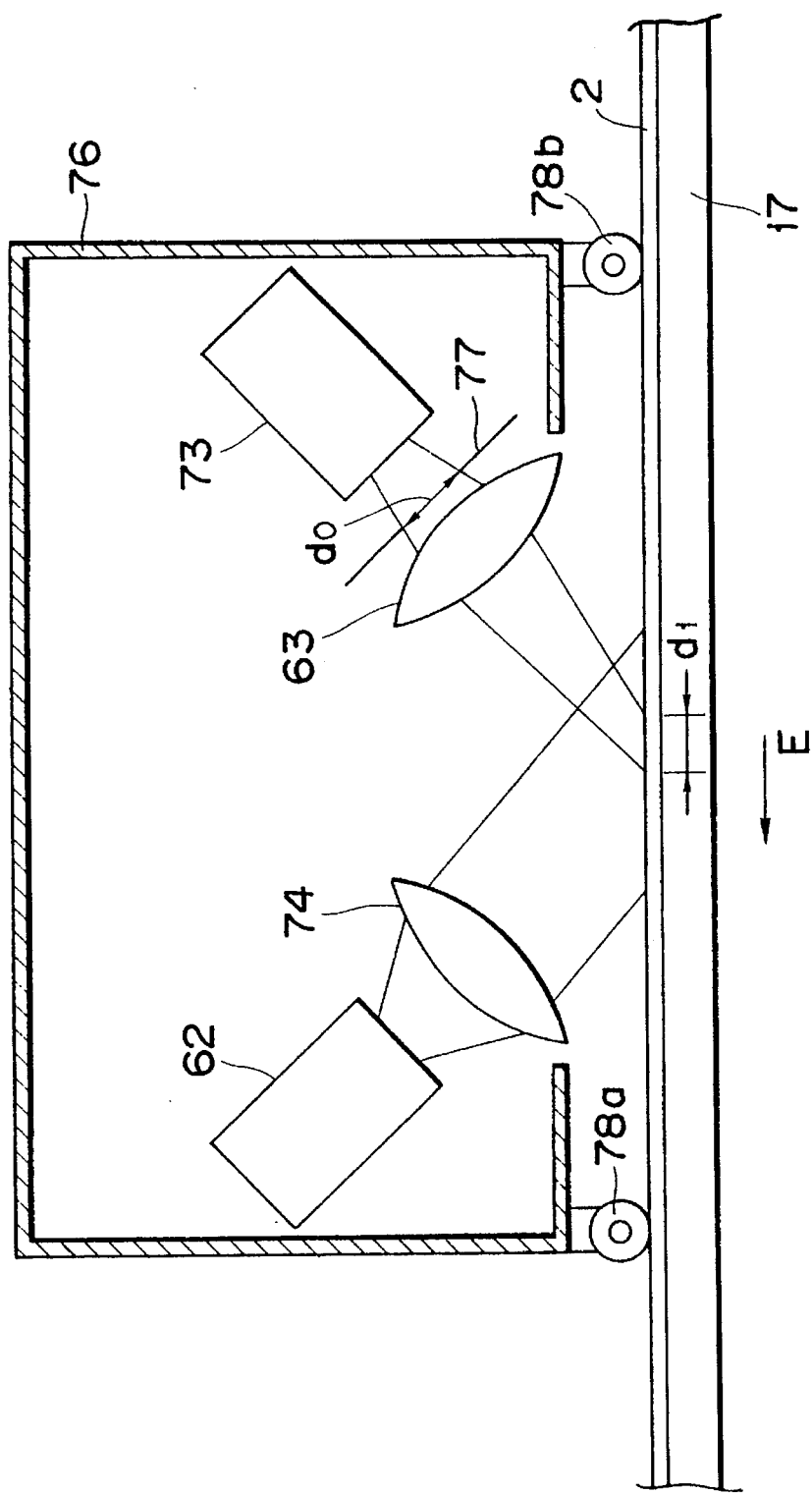
FIGS. 4 to 6 are schematic side elevational views which illustrates an example of the structure of a portion for holding an interval between a reading unit and a recording medium.

FIG. 4 schematically illustrates an example of the structure capable of enabling the above-described interval to be maintained as desired. Referring to FIG. 4, the structure is arranged in such a manner that a frame 76, in which the reading unit 14 and the scanning mechanism 15 are accommodated, includes a retaining rollers 78a and 78b which are engaged with the recording medium 2. The above-described rollers 78a and 78b are arranged to be rotated in the direction in which the recording medium 2 is conveyed. Therefore, the conveyance of the recording medium 2 is not hindered. As a result, the floating of the recording medium 2 can be prevented and the frame 76 is displaced in accordance with the thickness of the recording medium 2. Consequently, the above-described interval can be maintained at a predetermined distance.

Referring to FIG. 4, reference numeral 74 represents a lens for changing light emitted from the light source 62 to a parallel beam. Reference numeral 73 represents a sensor having a photoelectrically converting element group and 63 represents a lens for converging reflected light. Reference numeral 77 represents a filter having an opening the aperture of which is d0. The above-described lenses, the sensor, the light source and the filter are scanned in the frame 76 by the scanning mechanism shown in FIG. 3 in the directions G and H (in a direction which is perpendicular to the drawing sheet on which FIG. 4 is drawn).

Light reflected by the recording medium 2 is made incident upon the sensor 73 via the lens 63 and the filter 77 which has the opening d0. Since the incident light is included in range d1 on the test pattern, the value obtained by averaging the unevenness in the above-described range is detected. As a result of the experiments carried out by the inventors of the present invention, a satisfactory effect was obtained from an arrangement in which the diameter of the opening was about 0.2 to 1 mm. Therefore, an equal image can be obtained by correcting the unevenness in accordance with the result of the detection.

In a case where the reading unit including the lens, the sensor, and the light source is capable of vertical translation with respect to the position of the scanning mechanism 15 when viewed in FIG. 3, a roller serving as a retaining member may be provided for the reading unit. If the roller is arranged to be a caster structure in this case, the unit for conveying and reading the recording medium can be smoothly moved. In a case where the structure is arranged to read information while moving the recording medium, the reading operation can be performed while reducing the load of the roller by arranging the scanning direction to be made diagonal.

Figure 5:
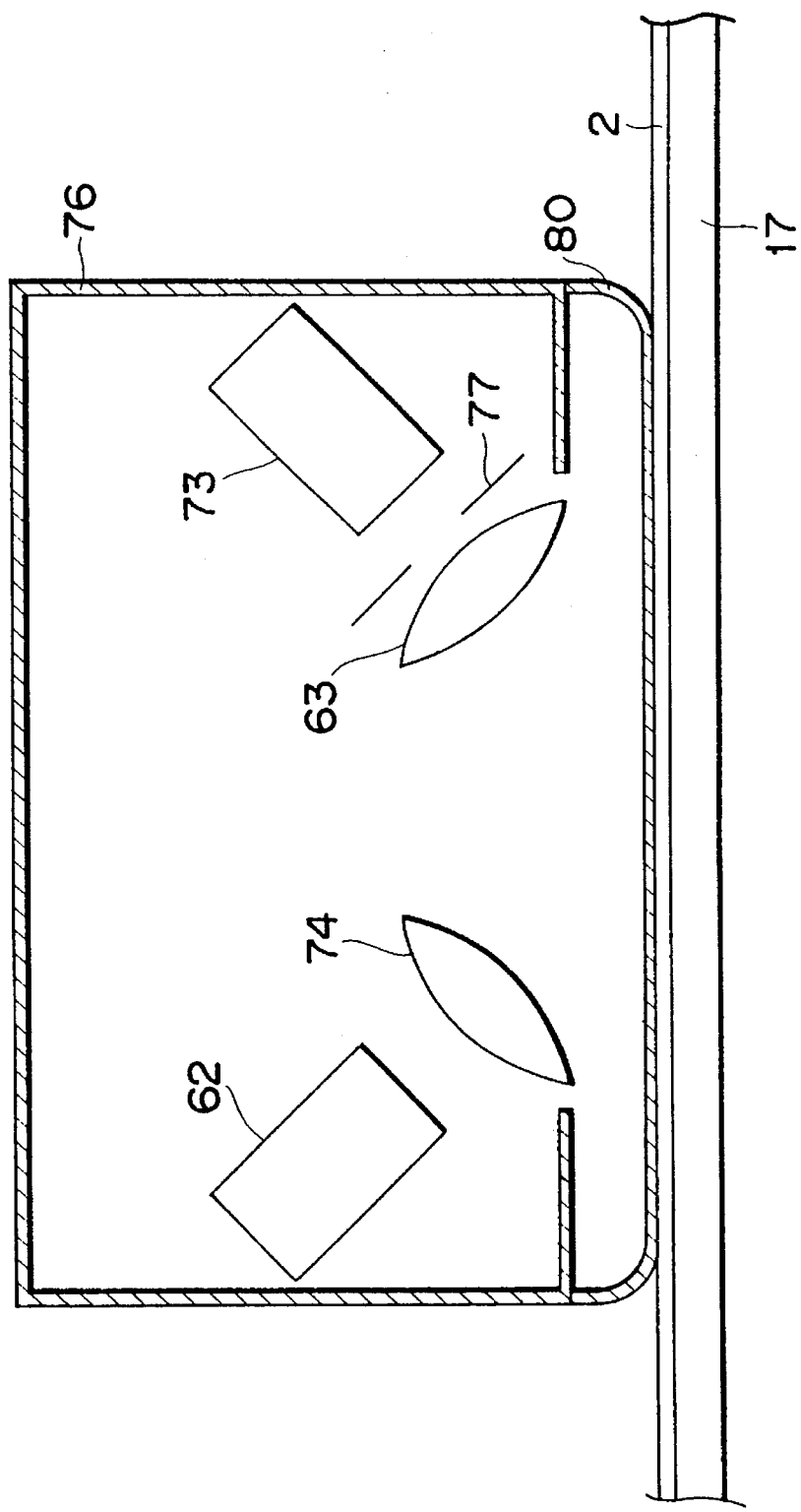

FIG. 5 illustrates another embodiment of the structure for maintaining the interval between the reading unit and the recording medium at a predetermined distance. According to this example, a retaining member 80 made of transparent plastic is provided in the lower portion of the frame.

According to this embodiment, the frame 76 accommodating the reading unit and the scanning mechanism is first positioned away from the platen 17 by about 10 mm. When the recording medium 2 reaches a position below the reading unit, the frame is moved downwards so that the recording medium 2 is held by the transparent plastic 80. Then, the above-described reading head 60 performs the scanning, and thus the uneven image density is detected. In this case, it is preferable that fixing of the image has been completed.

Also according to the thus arranged structure, the floating of paper can be prevented and thereby reading of information can be accurately performed. Another effect can be obtained in that the contamination of the light source 62, the sensor 73 and the like can be prevented by the presence of the transparent plastic 80 which covers the lower portion of the frame.

Figure 6:
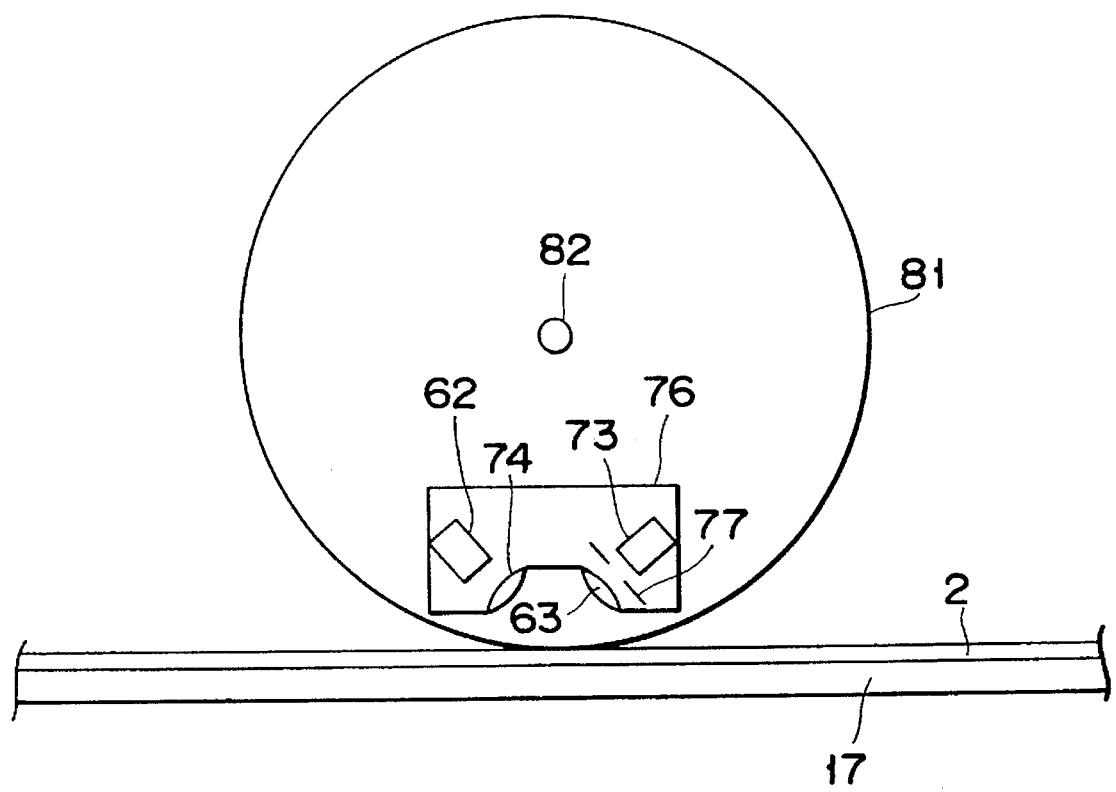

FIG. 6 illustrates another embodiment of the structure for maintaining the interval between the reading unit and the recording medium at a predetermined interval. Referring to FIG. 6, the frame 76 is secured when viewed in the vertical direction, while a cylindrical roller 81 made of transparent plastic or the like is rotatably disposed around a shaft 82. The recording medium 2 is held by the transparent roller 81 so that the uneven image density can be read from the inside of the transparent roller 81 while preventing the floating of the paper. Also according to this embodiment, the uneven image density can be accurately detected.

Another structure may be employed which is arranged in such a manner that the body of the apparatus has a recording medium holding means on both the upper stream side and the lower stream side thereof so as to read the recording medium positioned between the upper and the lower holding means. Also in this case, information can be accurately read similarly to the above-described embodiments.

When unevenness correcting data is unloaded in a case where color image recording is performed by using a three-color head consisting of cyan (C), magenta (M), yellow (Y) or a four-color head consisting of the above-described colors and black (Bk), it is significantly preferable that the correcting test patterns are recorded by the corresponding heads, the unevenness of each of the test patterns is read and correcting data for each of the heads is reloaded.

Figure 7B:
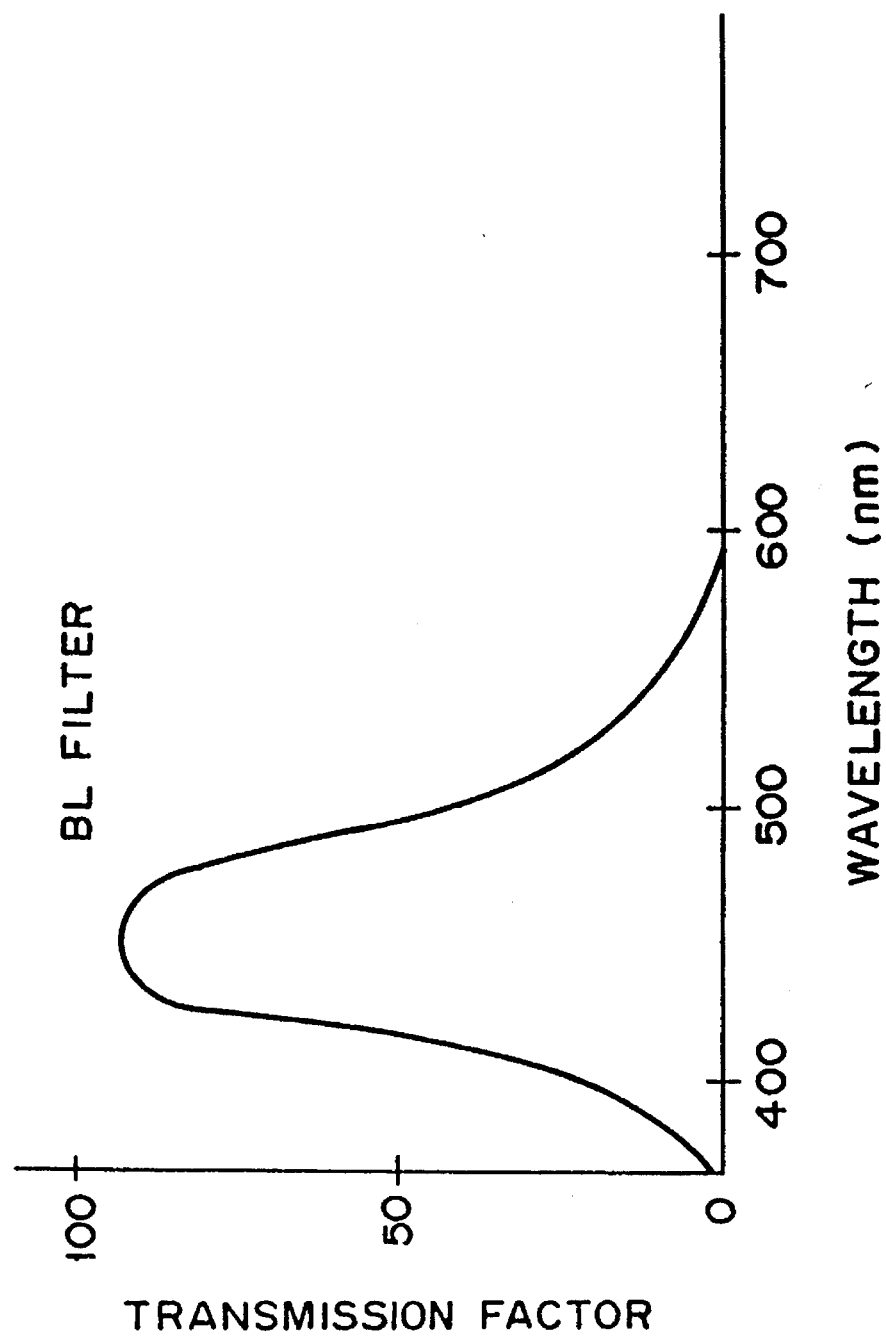

When white light is applied to the test pattern of Y and reflected light from the same is received without a filter in order to read the unevenness of C, M and Y, and in particular to read that of Y, the quantity of light received by the sensor 73 becomes as designated by a curve A of FIG. 7A. As shown in FIG. 7A, since the dynamic range is too narrow, unevenness (with a small optical density difference of about 0.02 to 0.15) cannot be accurately read. Accordingly, a BL (blue) filter having characteristics as shown in FIG. 7B is preferably employed to widen the dynamic range although the total quantity of received light is reduced as designated by curve B of FIG. 7A. As a result, the accuracy in reading the unevenness can be improved. As for C and M, an R (red) and a G (green) filter may be respectively used to obtain a similar effect.

Figure 8:
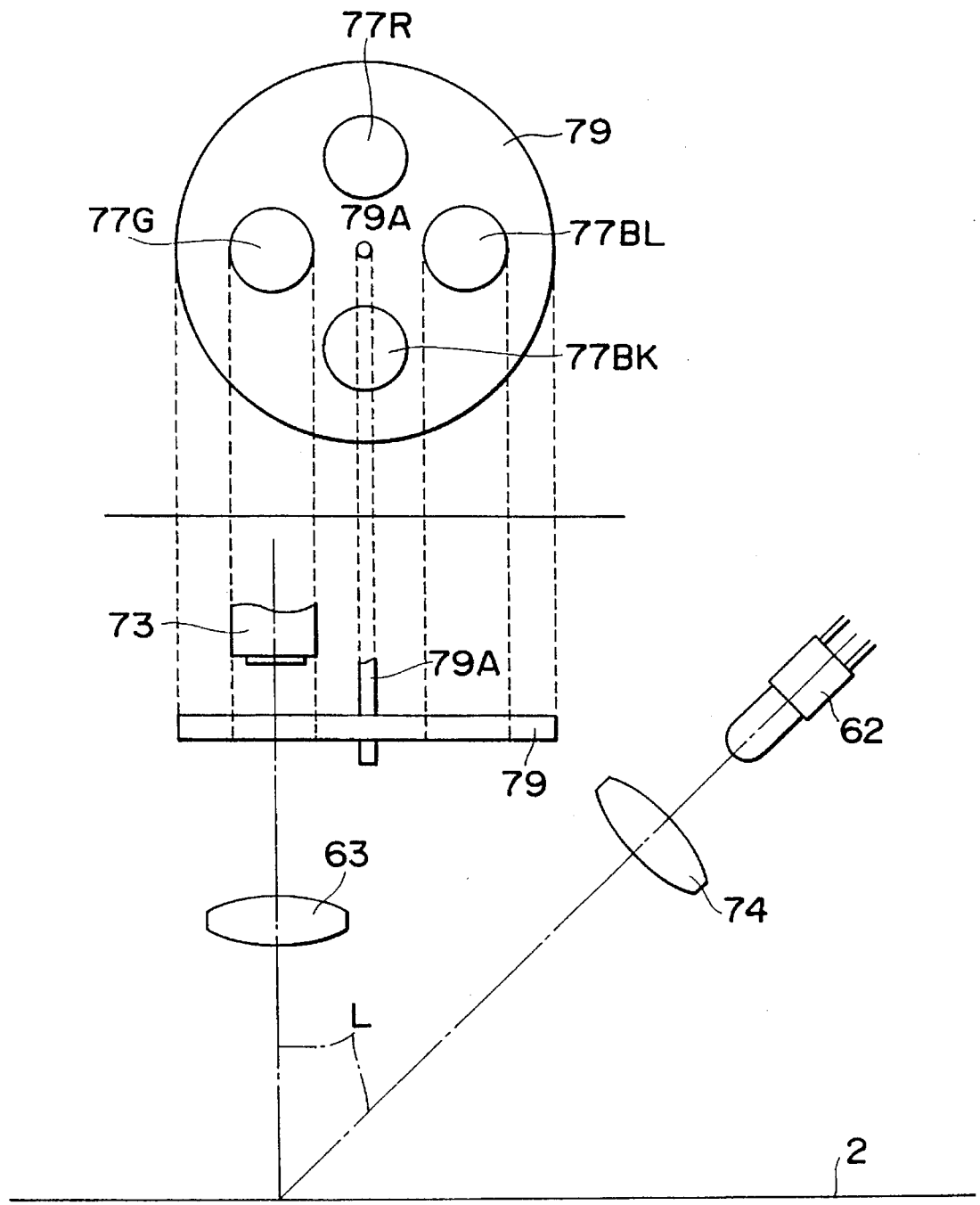
FIGS. 8 to 10 are schematic views which illustrates an example of the structure of a portion for reading the uneven image density of a test pattern in accordance with the color.

FIG. 8 illustrates an example of a structure for switching over the above-described color filters. Referring to FIG. 8, reference numeral 79 represents a color-filter switching portion arranged to rotate around a shaft 79A so as to selectively place an R filter 77R, a G filter 77G, a BL filter 77BL or an opening (no filter) 77BK for BK on the optical path connected to the sensor 73 at the time of reading the test pattern for each color. The aperture of each of the filters and the opening is, as described above, d0.

As a result, the unevenness of each color can be accurately corrected by the sole reading sensor 73 and the light source 62.

The position at which each of the filters is placed may be optionally determined if it is on an optical path L from the light source 62 to the sensor 73. In order to compensate the quantity of reduction of the quantity of light emitted from the lamp light source because light passes through the filter, the quantity of light emitted from the lamp light source is enlarged to compensate the above-described reduction. Therefore, the dynamic range can, as shown in FIG. 7C, be widened. Furthermore, a multiplication may be performed by using a proper constant which corresponds to the color or the signal may be amplified.

Furthermore, the above-described switching of the color filters may be replaced by switching the light source.

Figure 9:
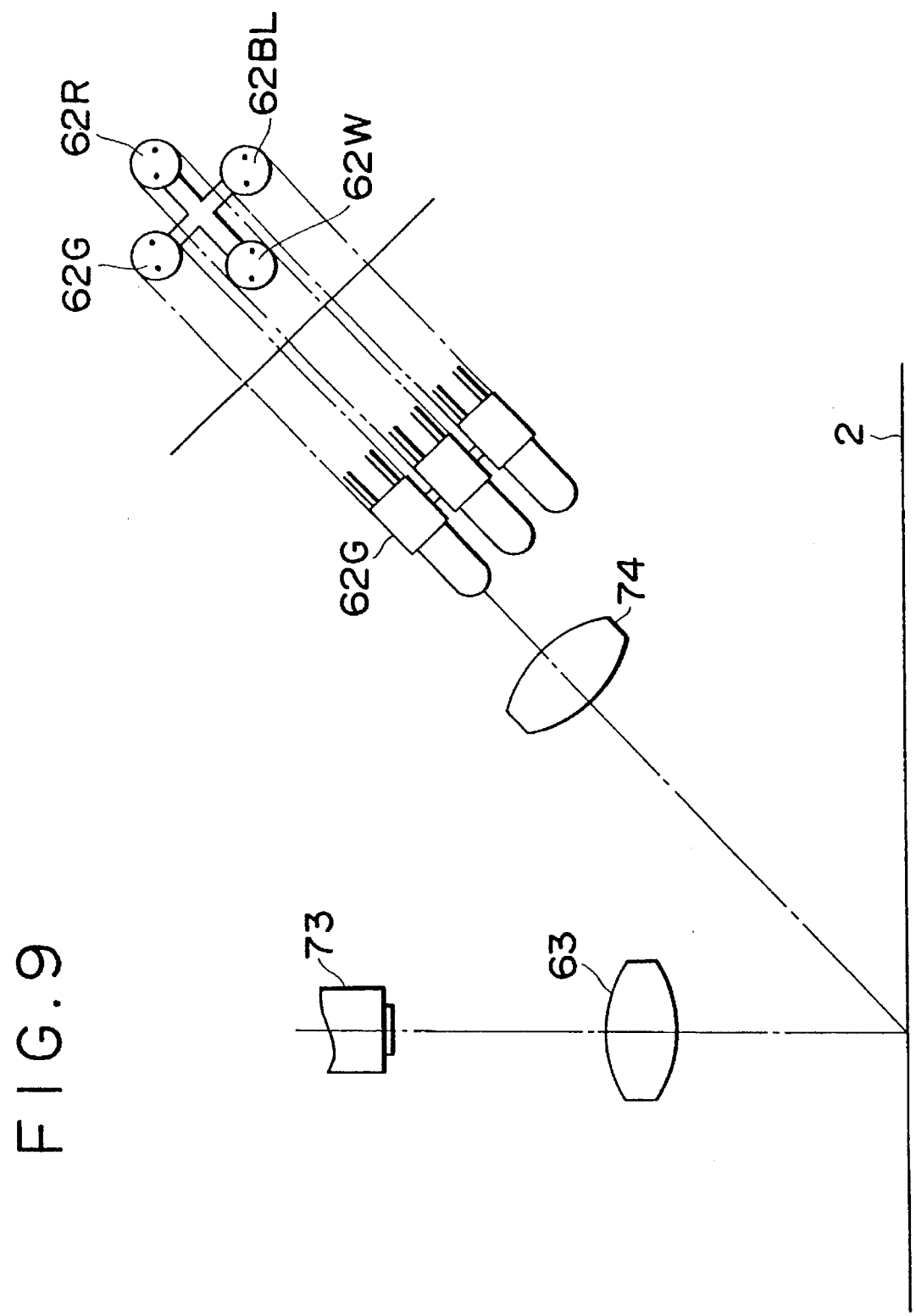

FIG. 9 illustrates an example of the structure to switch the light source in such a manner that four light sources 62R, 62G, 62BL and 62W respectively having spectral characteristics of R, G, BL and white can be switched over similarly to the above-described structure. A similar effect can be obtained from this example.

Furthermore, the above-described structure for preventing the floating of the recording medium 2 and the structure for widening the dynamic range in accordance with the color may be integrally constituted.

Figure 10:
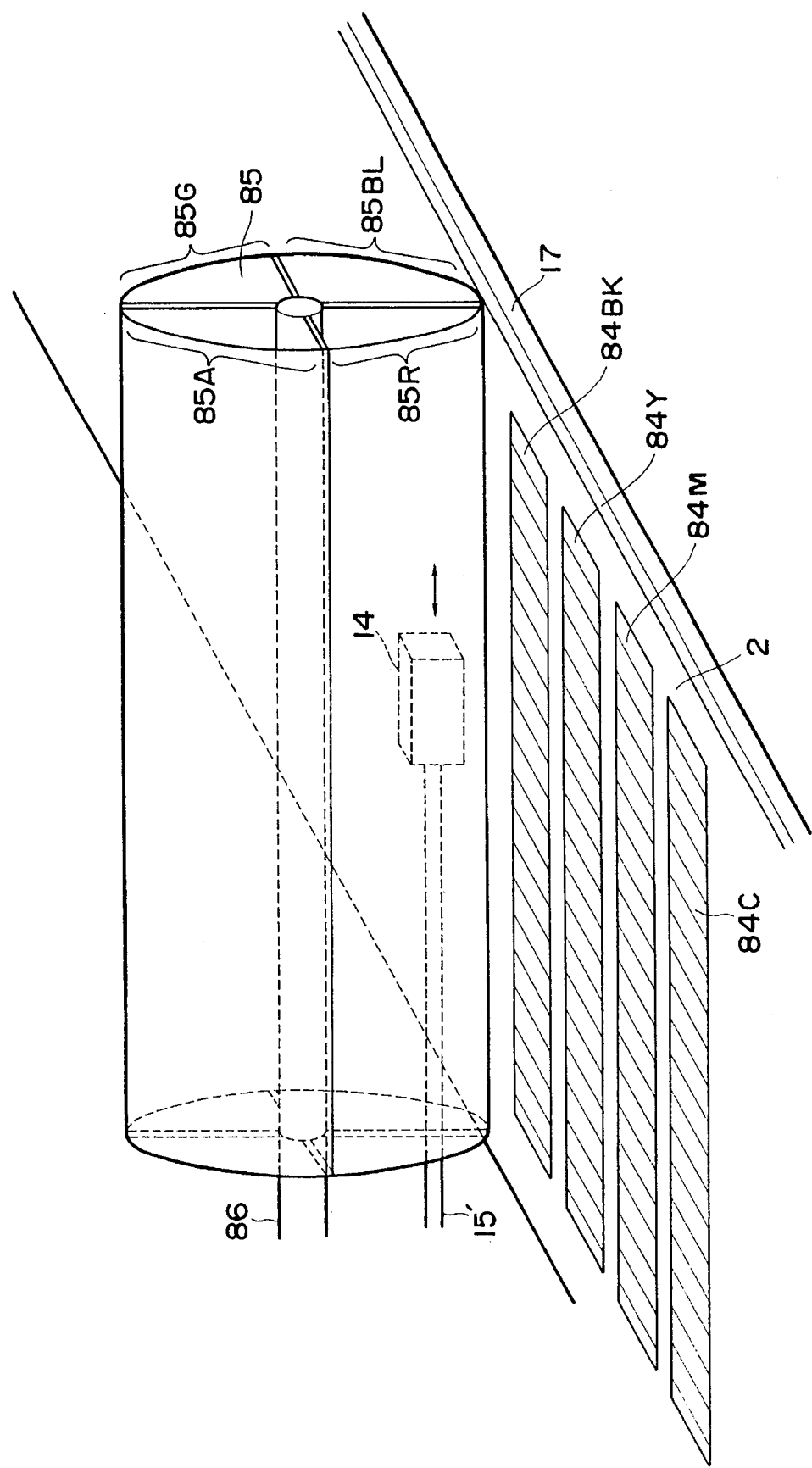

FIG. 10 illustrates an example of the structure constituted integrally as described above. Reference numeral 85 represents a retaining transparent roller sectioned into four pieces in its circumferential direction. The transparent roller 85 is sectioned into a portion 85A which serves as a colorless transparent portion, 85R which serves as a red filter, 85G which serves as a green filter and 85BL which serves as a blue filter. Reference numeral 84BK represents a test pattern on the recording medium 2 and adapted to the head 1BK for black, 84C represents a test pattern adapted to the head 1C for cyan, 84M represents a test pattern adapted to the head 1M for magenta and 84Y represents a test pattern adapted to the head 1Y for yellow.

When the unevenness of the test pattern 84BK is read by the black head 1BK, the roller 85 is rotated so as to introduce the unit 14 while holding the recording medium by the portion 85A. Similarly, when the test pattern 84C is read by the cyan head 1C, the recording medium is held by he portion 85R. When the test pattern 84M is read by the magenta head 1M, the recording medium is held by the portion 85G. When the test pattern 84Y is read by the yellow head 1Y, the recording medium is held by the portion 5BL.

As described above, according to the present invention, the uneven image density of each of the color heads can be accurately read through the filter. Furthermore, floating of the paper can be prevented, causing the accurate reading to be performed.

Then, the structure of the reading head will now be described with reference to FIG. 3

As described above, the recording medium on which the test pattern has been recorded is conveyed to the position at which the reading unit 14 is disposed, the reading unit 14 being positioned in the lower stream from the recording head in the conveyance direction and on the surface of the recording medium 2 on which information is recorded. Then, the pulse motor 67 shown in FIG. 3 is rotated so that the reading unit 14 secured to a power transmitting portion 65 such as a wire or a timing belt connected to the pulse motor 67, that is, the reading head 60 performs the main scanning operation in the direction G of FIG. 3. As a result, the test pattern recorded on the recording medium 2 is read by the reading sensor 73.

According to this embodiment, when the reading unit 14 is conveyed by rotating the pulse motor 67 by a control circuit to be described later, the pulse motor 67 is operated at a frequency which is different from the resonant frequency of that reading unit conveying system.

Figure 11:
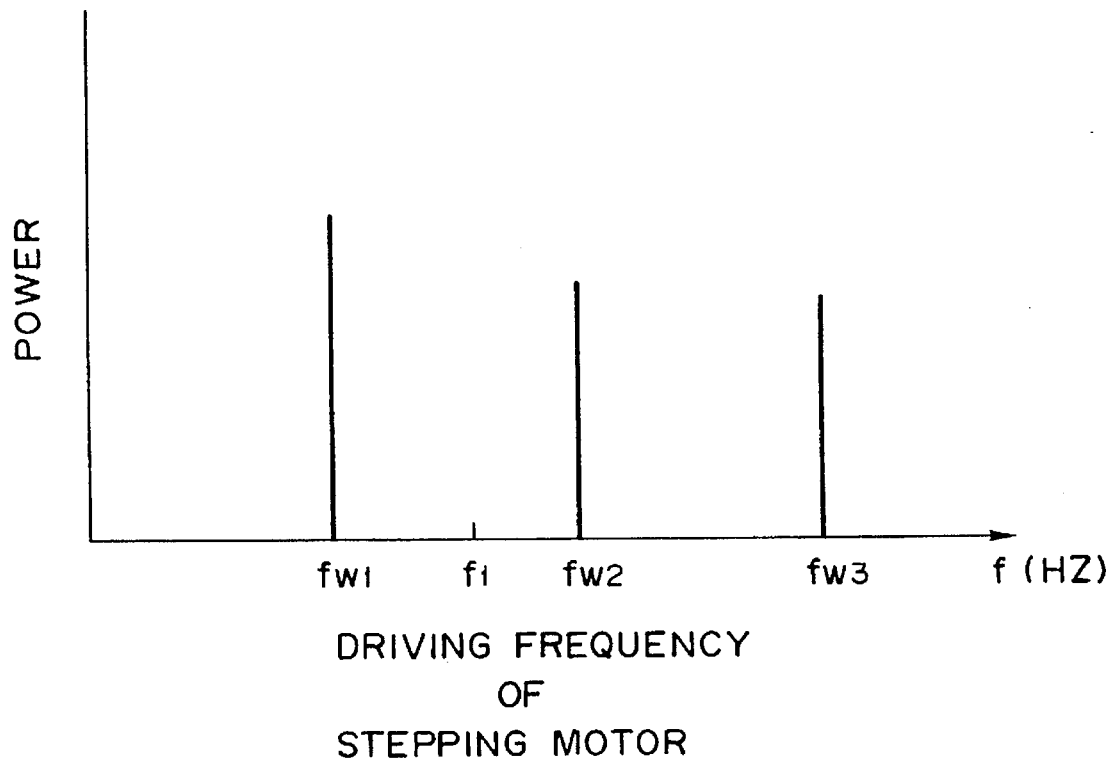
FIG. 11 illustrates a scanning operation performed by a reading unit according to the present invention.
Figure 12A:
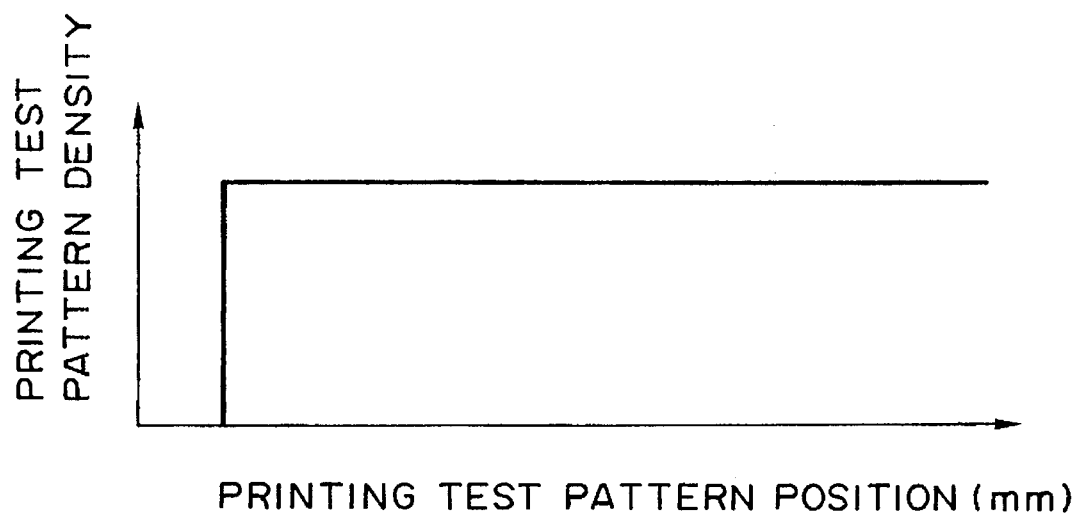
Figure 12B:
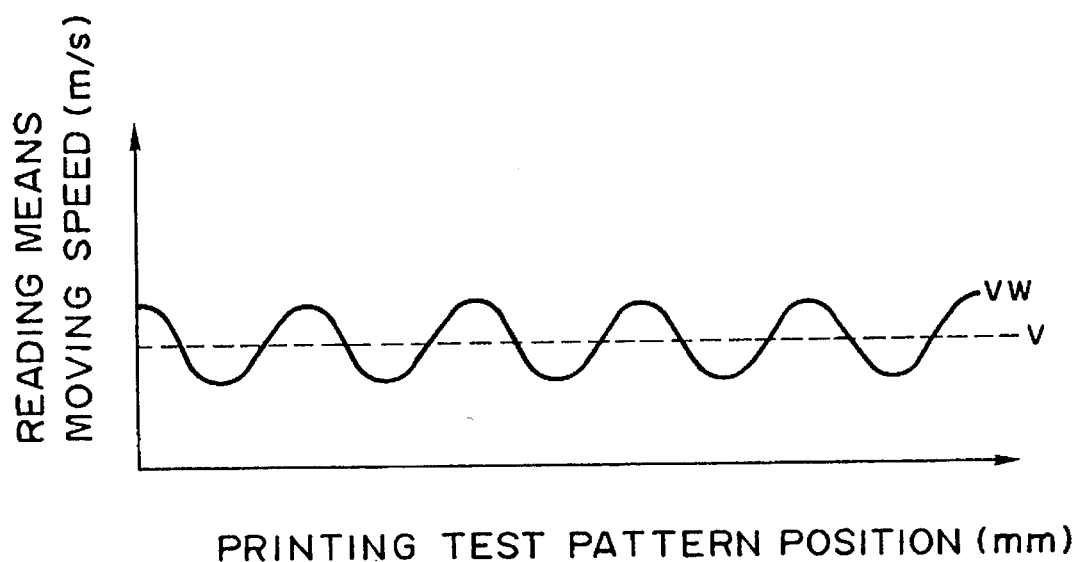

That is, when the reading unit conveying system is conveyed by rotating the pulse motor 67, the reading unit conveying system generates excessively large vibrations at resonant frequencies $f\omega 1$, $f\omega 2$, $f\omega 3$, . . . , as shown in FIG. 11. Therefore, in a case where the reading unit 14 is conveyed at a resonant frequency which causes the system to vibrate excessively, conveying speed $V\omega$ of the reading unit 14 shown in FIG. 12B is sometimes undesirably changed as shown in FIG. 12A even if the recording density of the test pattern recorded on the recording medium 2 is even. As a result, the output read from the reading unit 14 possesses pitch unevenness such as $k\omega$ as shown in FIG. 12C. Consequently, problem arises in that the density of the test pattern recorded on the recording medium 2 cannot be accurately read.

In order to overcome the above-described problem, this embodiment is arranged in such a manner that the reading unit 14 is operated at frequency f1except for the resonant frequency of the reading unit conveying system whereby the test pattern is read at a predetermined reading speed v. As a result, the density of the recorded test pattern can be accurately read without an influence of the vibrations of the conveying system.

(4) Structure of control system

Then, the control system of the apparatus according to this embodiment and constituted by assembling the above-described elements will now be described.

Figure 13:
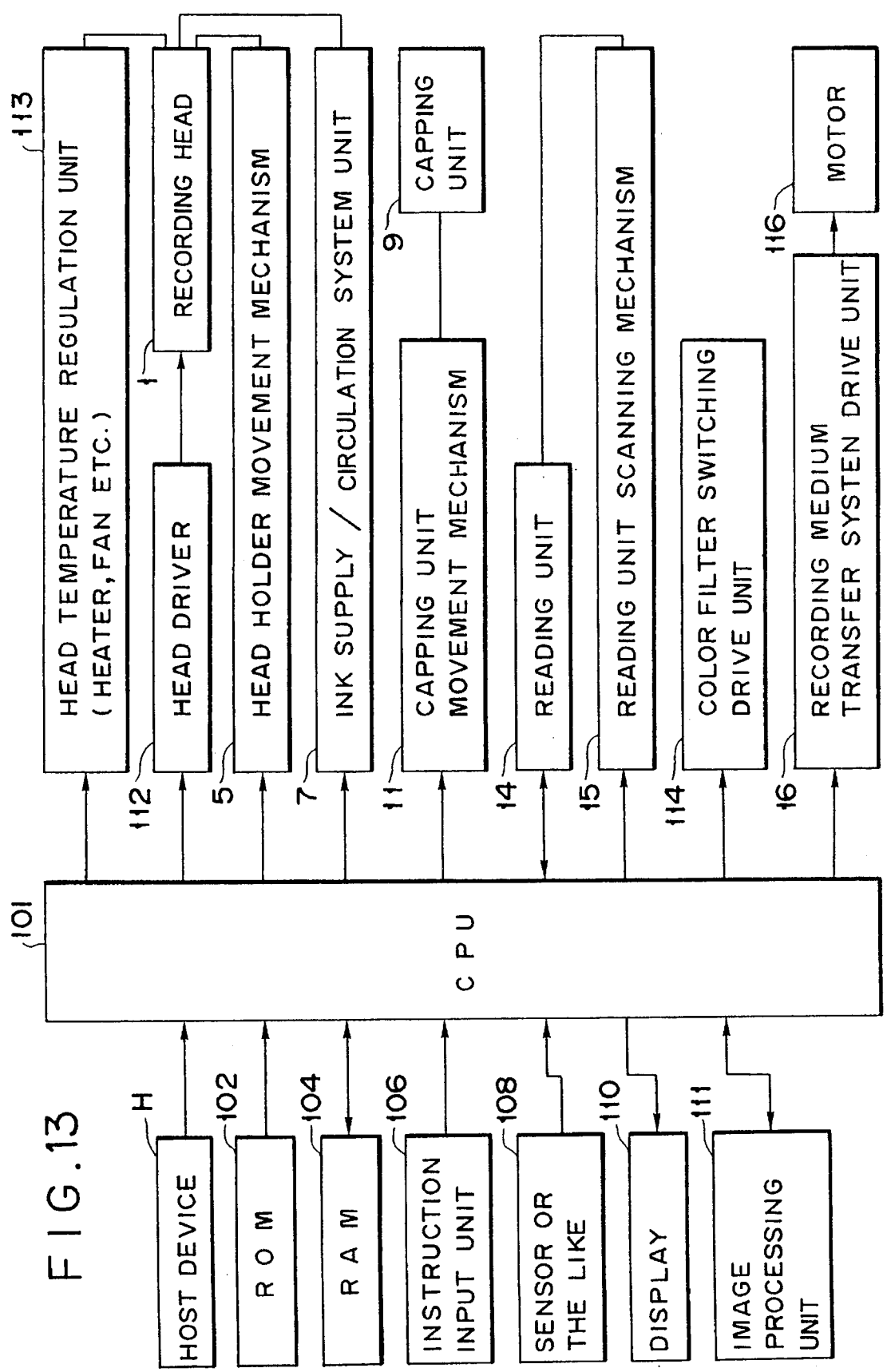
FIG. 13 is a block diagram which illustrates an example of the structure of a control system of an ink jet recording apparatus according to the present invention.

FIG. 13 illustrates an example of the structure of the control system. Referring to FIG. 13, symbol H represents a host device in the form of a computer, an image reader or the like for supplying image data and various commands, which relates to the recording operation, to the apparatus according to this embodiment. Reference numeral 101 represents a CPU which serves as the main control portion of the apparatus according to this embodiment, the CPU 101 being in the form of a microcomputer so as to control each of the elements in accordance with a processing sequence to be described later. Reference numeral 102 represents a ROM which stores a problem corresponding to the above-described processing sequence and other fixed data. Reference numeral 104 represents a RAM possessing a temporary data storing region and regions which are respectively used as the working regions during each of the controlling process.

Reference numeral 106 represents an instruction input portion which serves as an on-line switch of the host device and through which a command to start the recording operation, a command to record the test pattern for correcting the uneven image density and information about the types of the recording medium are supplied. Reference numeral 108 represents sensors for detecting the existence of the recording medium, the state of the conveyance of the same, the existence of the residual ink and other states of operations. Reference numeral 110 represents a display for informing the state of the operation of the apparatus, the mode and the existence of a problem. Reference numeral 111 represents an image processing portion for subjecting image data relating to the recording operation to a logarithmic conversion, a masking, a UCR and color balance adjusting processes. An uneven image density correcting portion is, as described later, connected to the image processing portion 111.

Reference numeral 112 represents a head driver for operating an ink ejecting energy generating element of the recording head 1 (the above-described heads 1Y, 1M, 1C and 1BK are collectively shown). Reference numeral 113 represents a temperature regulating portion for regulating the temperature of the recording head 1. Specifically, the temperature regulating portion may include a heater and a cooling fan disposed so as to act on the head 1. Reference numeral 114 represents a driving portion for driving the color filter switching portion 79 shown in FIG. 8, while 116 represents a driving portion of motors for operating the recording medium conveying system.

Figure 14B:
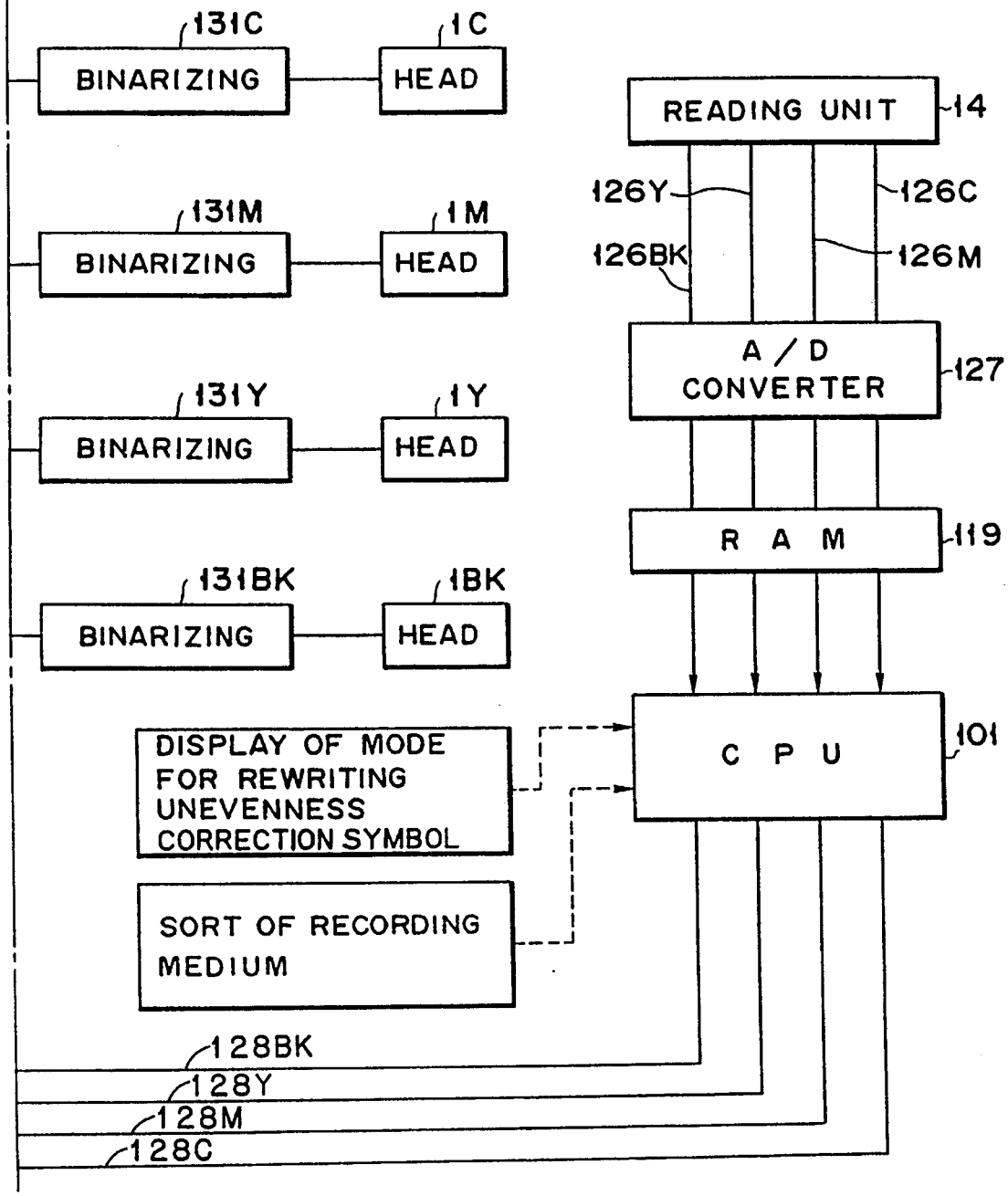
FIG. 14 is a block diagram which illustrates a system for correcting the uneven image density of the structure shown in FIG. 13.

FIG. 14 illustrates the system for correcting the uneven image density. Referring to FIG. 14, reference numerals 121C, 121M, 121Y and 121BK represent image signals of cyan, magenta, yellow and black processed by the image processing portion 111. Reference numerals 122C, 122M, 122Y and 122BK represent correcting tables for the corresponding colors. Reference numerals 123C, 123M, 123Y and 123BK represent image signals after they have been corrected as described above. Reference numerals 150C to 150BK represent gradation correcting tables for the corresponding colors. Reference numerals 131C to 131BK represent binary circuits which act in accordance with a dither method or an error expanding method. Thus, binary signals thus formed are supplied to the corresponding color heads 1C to 1BK via a driver 112 (omitted from FIG. 14).

Reference numerals 126C, 126M, 126Y and 126BK represent color signals read by the reading unit 14 via the color filters and the opening shown in FIG. 8, the signals being then supplied to an A/D converter 127. Reference numeral 119 represents a RAM region for temporarily storing a digital signal transmitted from the A/D converter 127, the RAM region being the area of the RAM 104. Reference numerals 128C, 128M, 128Y and 128BK represent correcting data calculated by the CPU 101 in response to the thus stored signals. Reference numerals 129C to 129BK represent unevenness correcting RAM for the corresponding colors, the RAM 129C to 129BK being the regions in the RAM 104. Unevenness correcting signals 130C to 130BK for the corresponding colors and transmitted from the above-described RAMs 129C to 129BK are respectively supplied to the unevenness correcting tables 122C to 122KB. As a result, the image signals 121C to 121BK are converted so as to be capable of correcting the unevenness of the heads 1C to 1BK.

Figure 15:
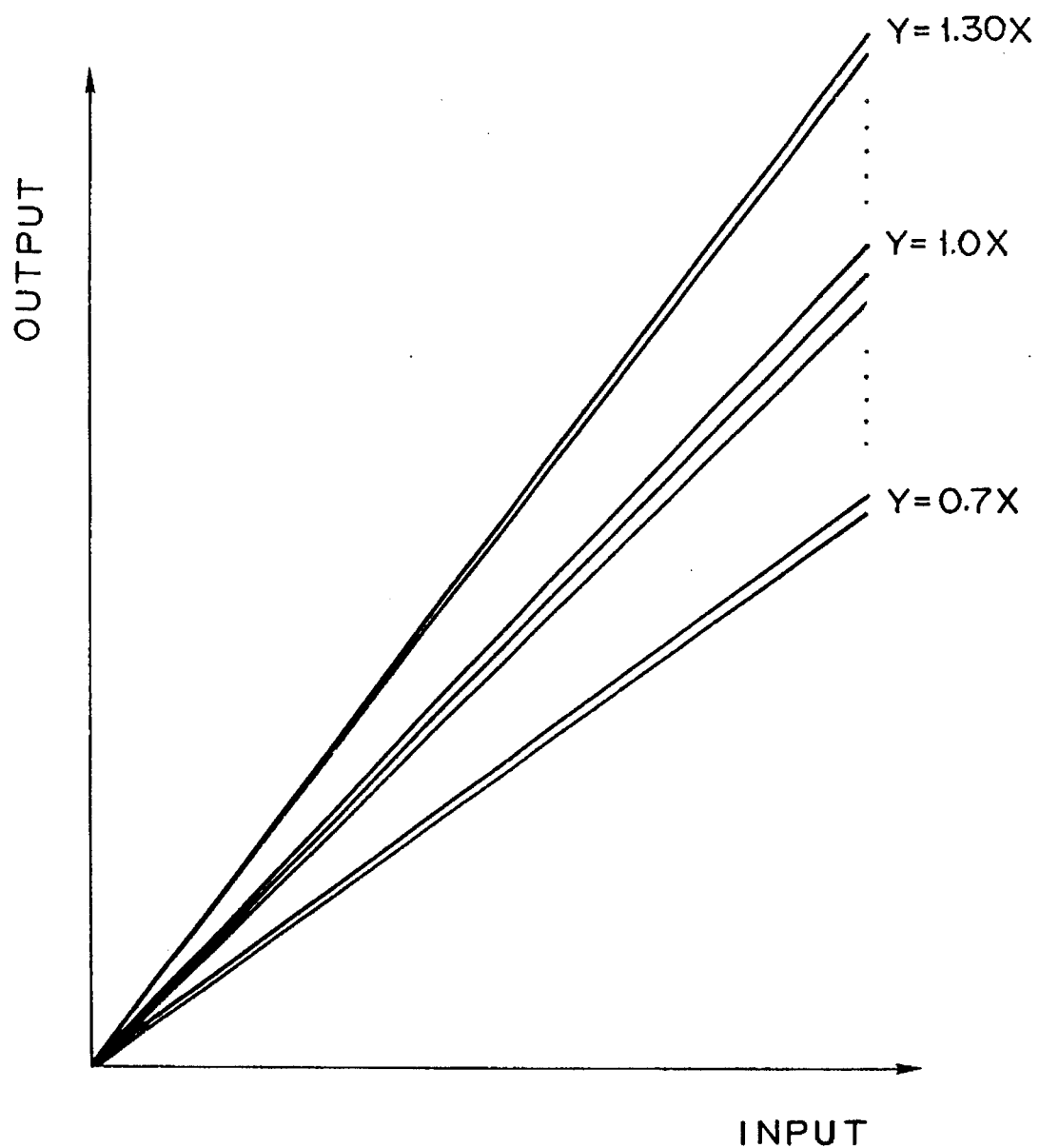
FIG. 15 illustrates an unevenness correction table for use in the structure according to the present invention.

FIG. 15 illustrates an example of the unevenness correcting table which possesses 61 correcting straight lines having different inclinations varied from $Y=0.70\times$ to $Y=1.30\times$ in units of 0.01. The correcting straight lines are switched over in response to the unevenness correcting signals 130C to 130BK. For example, when a signal of a pixel to be recorded by means of a aperture the dot diameter of which is considerably large is supplied, a correcting straight line the inclination of which is small is selected. On the contrary, when an aperture having a small dot diameter is used, a correcting straight line having a large inclination is selected so as to correct the image signal.

The unevenness correcting RAMs 129C to 129BK respectively store selection signals for selecting the correcting straight lines which are required to correct the unevenness of the heads. That is, the unevenness correcting RAMs 129C to 129BK store the unevenness correcting signals having values of 61 types from 0 to 61 by a number which corresponds to the number of the apertures. Therefore, the unevenness correcting signal 130C to 130BK are transmitted from the unevenness correcting RAMs 129C to 129BK in response to the supplied image signal. The signals 123C to 123BK the unevenness of which has been corrected by straight line γ selected in response to the unevenness correcting signal are supplied to the gradation correcting tables 150C to 150BK in which the gradation characteristics for each head are corrected so as to be transmitted. Then, the signals are binarized by the binary circuits 131C to 131BK so as to operate the heads 1C to 1Bk via the head driver. As a result, a color image is formed.

(5) Sequence for correcting unevenness

The following processes are performed in the above-described structure so that the unevenness is accurately corrected.

The operating energy (for example, an operating duty) of the ejecting energy generating element which corresponds to the high density orifice of the head is reduced by performing the unevenness correcting process. On the contrary, the operating energy of the ejecting energy generating element which corresponds to the low density orifice is increased. As a result, an even image can be obtained since the uneven image density of the recording head can be corrected. However, if the uneven density pattern is changed as the use of the apparatus, the uneven image density signal which has been used becomes unsuitable, causing unevenness to be generated on the image. In this case, when the unevenness data reloading is commanded by operating the unevenness signal reloading mode selection switch disposed in the instruction input portion 106, the following sequential operation is started.

Figure 16:
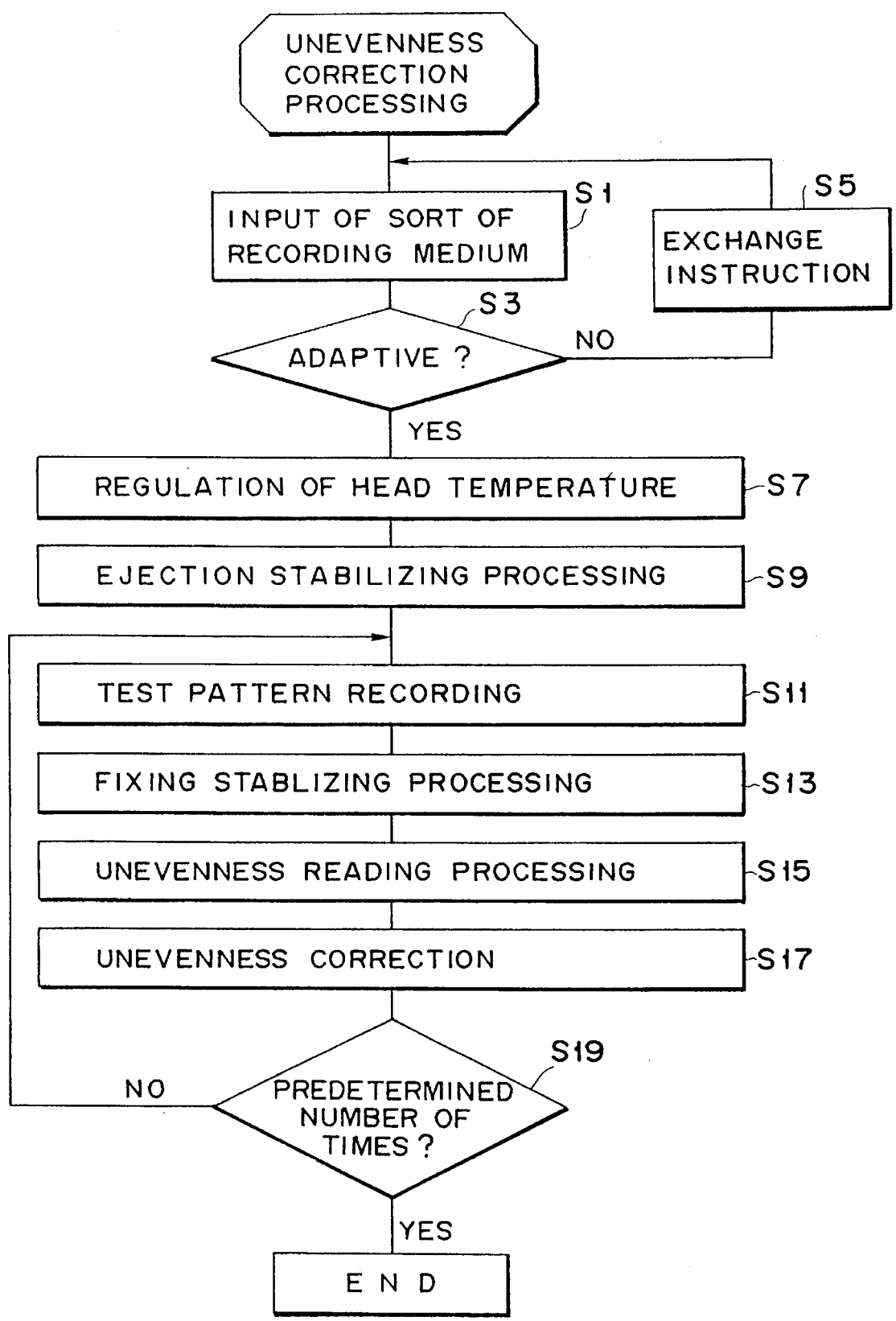
FIG. 16 is a flow chart which illustrates an example of an unevenness correcting process according to the present invention.

FIG. 16 illustrates an example of the sequence of the unevenness correcting operation according to this embodiment.

When the sequential operation according to this embodiment is started, the input of the type of the recording medium is received in step S1. At this time, for example, a display "Input the type of the recording sheet which is being used at present" is made on the display 110 of a liquid crystal panel or the like. Then, an operator informs the type of the recording medium which is being used at present by a switch or the like disposed on the instruction input portion 106. In step S3, a determination is made about the recording medium. If the instructed type of the recording sheet is not suitable for the unevenness detecting operation such as the OHP sheet or fine coat sheet, a message, for example, "Use predeterminedsheet" is displayed on the display 110 in step S5. If the predetermined sheet is placed and the type of this sheet is input or the type of the recording medium which has been input is the predetermined type, the sequence advances to the following process:

According to this embodiment, the type of the recording medium is newly input whenever the correction data reloading mode is selected so as to determine whether or not the reloading of the unevenness correcting data is performed. However, information about the type of the recording medium has been usually instructed at the time of the recording operation. For example, a structure has been known which is arranged in such a manner that the image processing operation such as a masking operation is changed in accordance with the type of the recording medium to be used since the color tone of the recorded output is different depending upon the type of the recording medium.

Accordingly, a modification to this embodiment is arranged in such a manner that the type of the recording medium which is usually used at the time of the recording operation is input so as to perform an image processing operation which is most suitable to the input type of the recording medium. Furthermore, a determination is made whether or not reloading of the unevenness correction data is performed in accordance with the type of the recording medium which has been previously input. Therefore, an effect can be obtained in that a necessity of newly inputting the type of the recording medium can be eliminated.

Although the switch must be depressed to instruct the recording medium according to this embodiment, it can be eliminated according to the modification of this embodiment.

Figure 17:
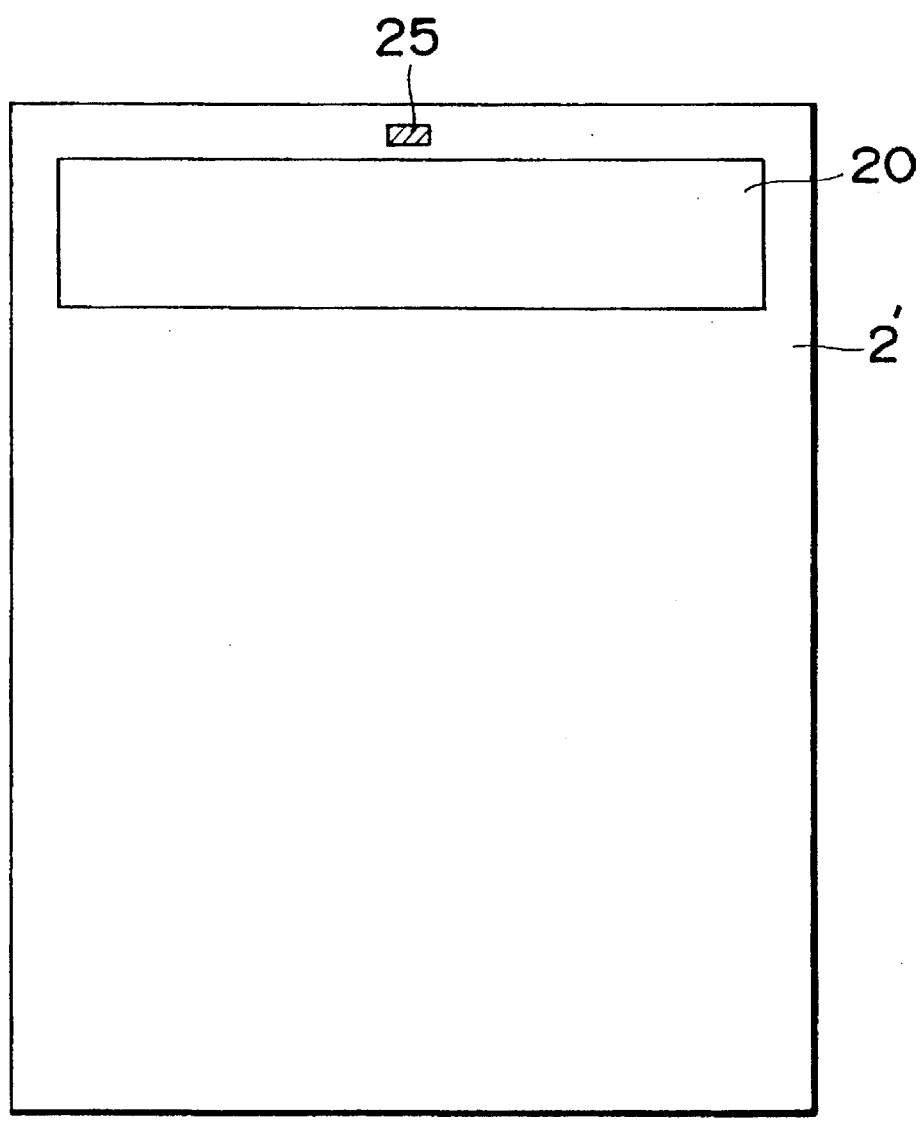
FIG. 17 is a schematic view which illustrates a state where an identification mark is provided for a recording medium for performing the uneven image density correcting operation in accordance with the type of the recording medium.

FIG. 17 illustrates a recording medium 2' for use in this modification. Referring to FIG. 17, reference numeral 20 represents a recorded unevenness correcting pattern and 25 represents a recording medium identification mark. The identification mark of a density which corresponds to the type of the recording medium is disposed at the front margin of the recording medium. Thus, when the uneven image density is read, the density of the identification mark is read by the density unevenness reading unit prior to reading the unevenness correcting pattern.

If a determination is made that the set recording medium is the instructed paper, the reloading of the unevenness correcting data is started. If a determination is made that the set recording medium is not the instructed paper, the display to change the recording medium for the instructed paper is made and as well as the operation of the reloading of the correcting data is inhibited.

As a result, the necessity of performing an operation of inputting the type of the recording medium can be eliminated.

Another modification to this embodiment will be described which will enable a similar effect to be obtained without the identification mark. In order to obtain this effect, a sensor is structured similarly to the structure shown in FIG. 8 in such a manner that a sensor unit for detecting the type of the recording medium is provided independently from the uneven image density reading unit 14. However, a ultraviolet ray lamp is employed as the lamp and a sensor which is sensitive to the ultraviolet ray region is used. Furthermore, the quantity of light reflected from the margin of the recording medium is used to determine the type of the recording medium. In general, a ultraviolet agent is added to the major portion of the coat paper sheets for use in the ink jet recording operation. Therefore, the type of the recording medium can be determined depending upon the above-described reflected light if the structure is arranged in such a manner that the ultraviolet lamp is employed as the lamp. That is, a determination can be made that the subject recording medium is a thick coat paper sheet when the quantity of reflected light is large. Another determination can be made that the subject recording medium is a thin coat paper sheet when the same is an intermediate quantity. Furthermore, another determination can be made that the subject recording medium is an OHP film when the same is too small to be detected. If the quantity of reflected light is large and a determination is made that the subject recording medium is the instructed paper suitably used to detect the uneven image density, the reading of the uneven image density and the reloading of the correcting data are performed. In the other cases, a display similar to the above-made description is made so as to prohibit the above-described operations. Therefore, a similar effect can be obtained while eliminating the necessity of inputting the type of the recording medium by an operator and providing an identification mark.

Referring again to FIG. 16, if the recording medium is suitably used in the unevenness correcting process, the flow advances to step S7 in which the temperature is regulated. The reason for this lies in the following reason:

In general, an ink jet recording apparatus is constituted in such a manner that the temperature of its recording head is maintained at a predetermined temperature range (for example, a first reference level of the regulated temperature of about 40° C.) in order to restrict the change in the density of the image and to stabilize the ink ejection. Therefore, in a case where the test pattern is recorded because this sequence is started, the recording operation is performed in a state where the temperature of the recording head is, as shown in region a of FIG. 18, at 40° C. which is the first reference level of the regulated temperature. On the other hand, when images are successively recorded, the temperature of the recording head is raised as shown in region b of FIG. 18, the recording is sometimes performed at 50° C. or lower which is the second reference level of the regulated temperature.

Figure 19A:
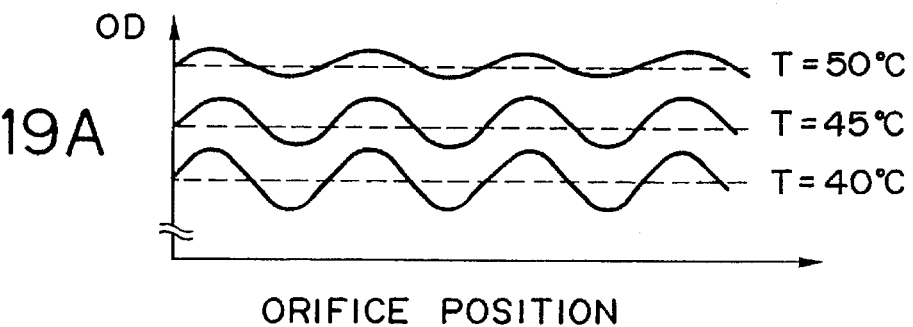
FIGS. 19A, 19B and 19C illustrate a state where a stable uneven image density correction is performed regardless of the temperature.
Figure 19B:
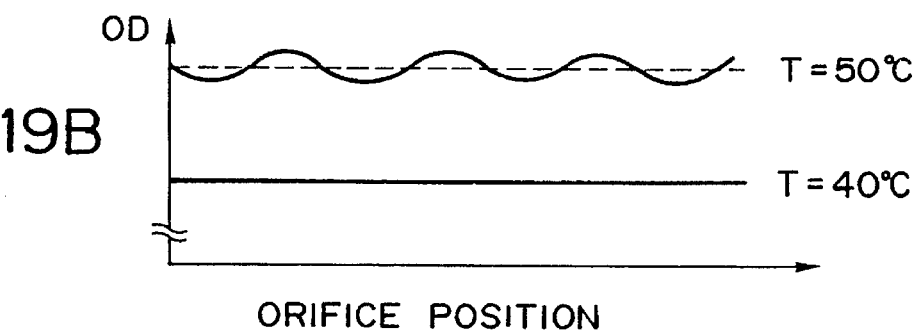
Figure 19C:
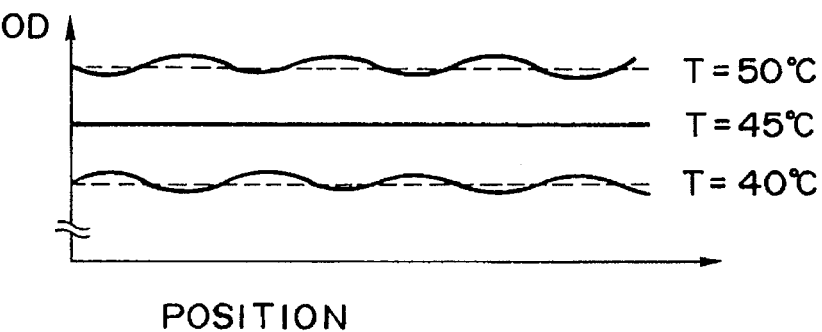

As a result of an experience, a fact has been found that the degree of the unevenness of the density (OD value) is, as shown in FIG. 19A, changed in accordance with the temperature of the recording head. Therefore, if the unevenness at 40° C. is corrected as shown in FIG. 19B in this case, there is a fear that the unevenness is left in the image at a head temperature of 50° C. although an even image at the head temperature of 40° C. can be formed.

Accordingly, the apparatus according to this embodiment is arranged in such a manner that the temperature regulating portion 113 (a heater and a fan) is properly turned on/off in accordance with the temperature of the recording head 1 at the normal recording mode or the recording waiting mode. As a result, the temperature of the recording head is maintained at a predetermined temperature range (about 40° C.) as shown in FIG. 18. When the uneven image density correcting process is performed, the setting temperature is raised to 45° C., that is, the reference of the temperature regulation is raised when the test pattern is printed out in comparison to the reference of the temperature regulation for the normal recording mode. Furthermore, the heater and the fan are properly turned on/off so that the temperature of the head is raised to about 45° C. before the test pattern for checking the uneven image density is recorded, the test pattern being used to correct the uneven image density. As described above, the recording operation performed by the recording head is stabilized by regulating the temperature. That is, a test pattern is formed assuming that the temperature of the head is 45° C. and the uneven image density is corrected by using the thus formed test pattern. Therefore, a substantially uneven image density correction can be performed uniformly in the overall range of the controlled temperature.

This embodiment may be arranged in such a manner that the test patterns are printed at 40° C. which is the first reference of the regulated temperature and at 50° C. which is the highest temperature (the second reference of the regulated temperature) for the recording mode. Furthermore, the uneven image density of each of the two types of the test patterns is detected and a value obtaining by averaging the density unevenness values (data about the first and second densities) is used as the reference to perform the correction.

In order to shorten the time taken to complete the uneven image density operation, electric pulses of an intensity which does not cause ink to be ejected are supplied to a recording element (an electrothermal converting element) in addition to the temperature regulating heater so as to raise the temperature of the head from, for example, 40° C. to 45° C. As a result, the time taken to raise the temperature of the head is shortened so as to shorten the time taken to complete the uneven image density correction.

In order to record a test pattern for correcting the uneven image density to be described later and to lower the temperature of the head (from 45° C. to 40° C.) to a normal recording state after the correcting operation has been completed, the fan is rotated and the above-described ink circulation is performed. As a result, the time taken to realize the state in which the recording operation can be started can be shortened.

Furthermore, the regulated temperature at the time of recording the test pattern may, of course, be determined properly in relation to the range of the regulated temperatures at the normal recording operation.

Referring again to FIG. 16, according to this embodiment, an ejection stabilizing operation is performed in step S9. The reason for this lies in that, if the uneven image density is corrected in a state where the normal ejecting characteristics are lost from the recording head due to an increase in the viscosity of ink and mixing of dust or bubbles, the characteristics of the head (uneven image density) cannot be accurately recognized.

When the ejection stabilizing process is performed, the recording heads 1C to 1BK and the capping unit 9 may be confronted to each other so as to forcibly eject ink through the orifice after the above-described pressure applying mode has been selected. Furthermore, the surface, in which the orifice is formed, may be cleaned by abutting an ink absorbing material, which can be disposed in the capping unit, against the surface in which the orifice is formed or by applying an air flow or by performing a wiping operation. In addition, a sub-ejection may be performed by operating the recording head similarly to that performed in the normal recording operation. However, the necessity of making the operating energy at the time of the sub-ejection to be the same as that at the time of the recording operation can be eliminated. That is, an operation similar to the so-called recovery operation performed in an ink jet recording apparatus may be performed.

As an alternative to the above-described process or after it has been performed, a pattern for stabilizing the ejection may be recorded on the recording medium. Then, the test pattern for correcting the uneven image density may be recorded.

Figure 20:
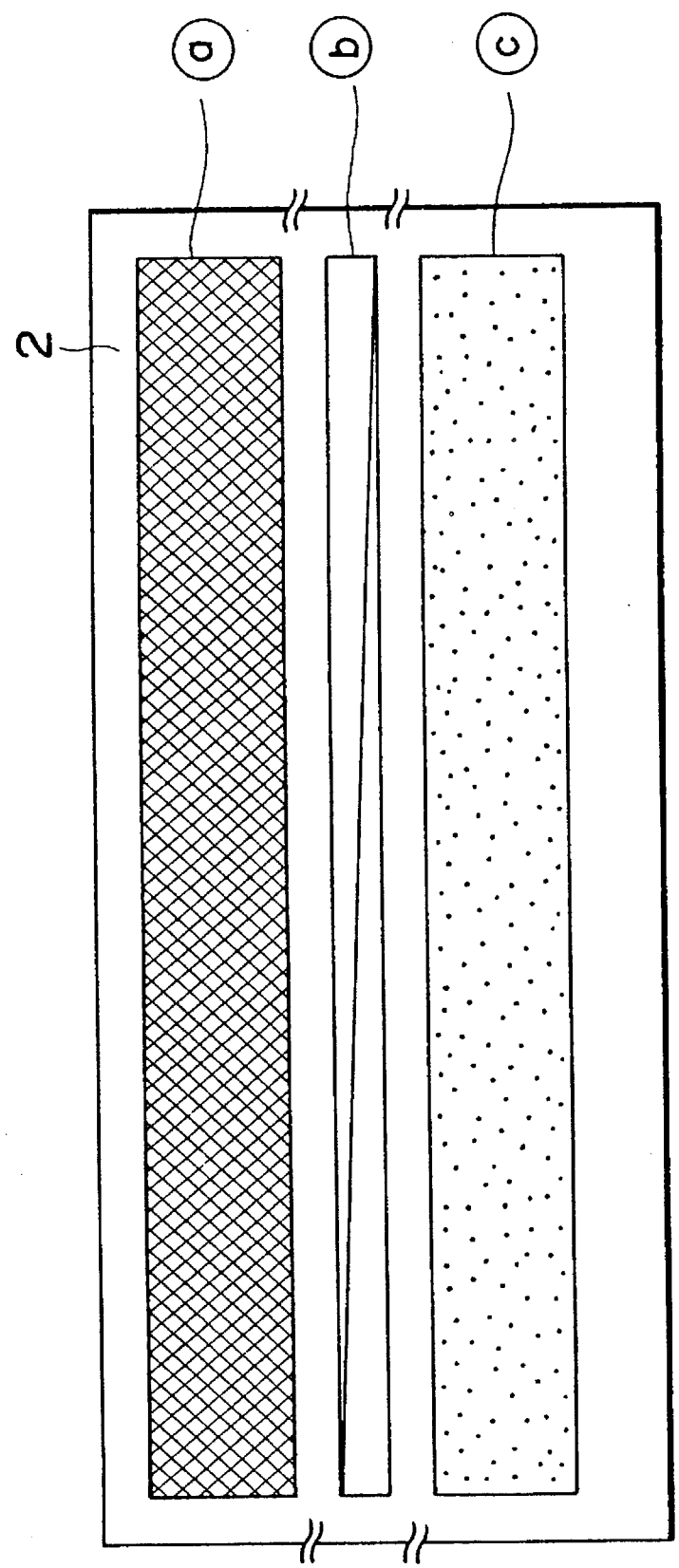
FIG. 20 illustrates a state where a pattern for stabilizing the ejection, a pattern for detecting the defective ejection and an uneven image density correcting test pattern are recorded on the recording medium.

FIG. 20 illustrates an example of the recorded pattern, where symbol (a) denotes a pattern for stabilizing the ejection, (b) denotes an inspection image pattern for inspecting the existence of the non-ejection (referring to the drawing, it is a pattern formed by successively operating from the end orifice while conveying the recording medium) and (c) denotes a test pattern for detecting the uneven image density. The pattern for stabilizing the ejection is arranged to be a pattern of a recording ratio of 100% duty in which all of the orifices of all of the recording heads are operated. Since the ejection stabilizing pattern is recorded, the temperature of the head can be stabilized and the ink supply system can be brought to a stationary state. Consequently, the conditions required to normally perform the recording operation can be established. Furthermore, the existence of the defective ink ejection and the uneven image density can accurately be recognized in an actual recording state.

In an apparatus which is arranged in such a manner that the recording head 1 is of a full multi-type head and the recording width is made slightly larger than the width of the image to be recorded so as to be subjected to a resist regulation, it is preferable that the recording width at the time of the test pattern recording operation be larger than the normal width of the image to be recorded. Then, an assumption is made that the maximum size of the recording paper sheet is A3, the normal width of the image to be recorded is about 293 mm which is determined to taken the two side margins into consideration to adapt to 297 mm which is the short side of an A3 sheet or the long side of an A4 sheet and the recording width of the recording head is 295 mm. The above-described structure is arranged in such a manner that the range of the orifice to be used is electrically adjusted and a mechanical error which takes place in the positional relationship between the heads and the recording medium is corrected. Therefore, it is significantly preferable that a portion of 295 mm in width which is the range of the arrangement of the orifices be inspected in this case so as to record a test pattern having a length of 295 mm.

Figure 21:
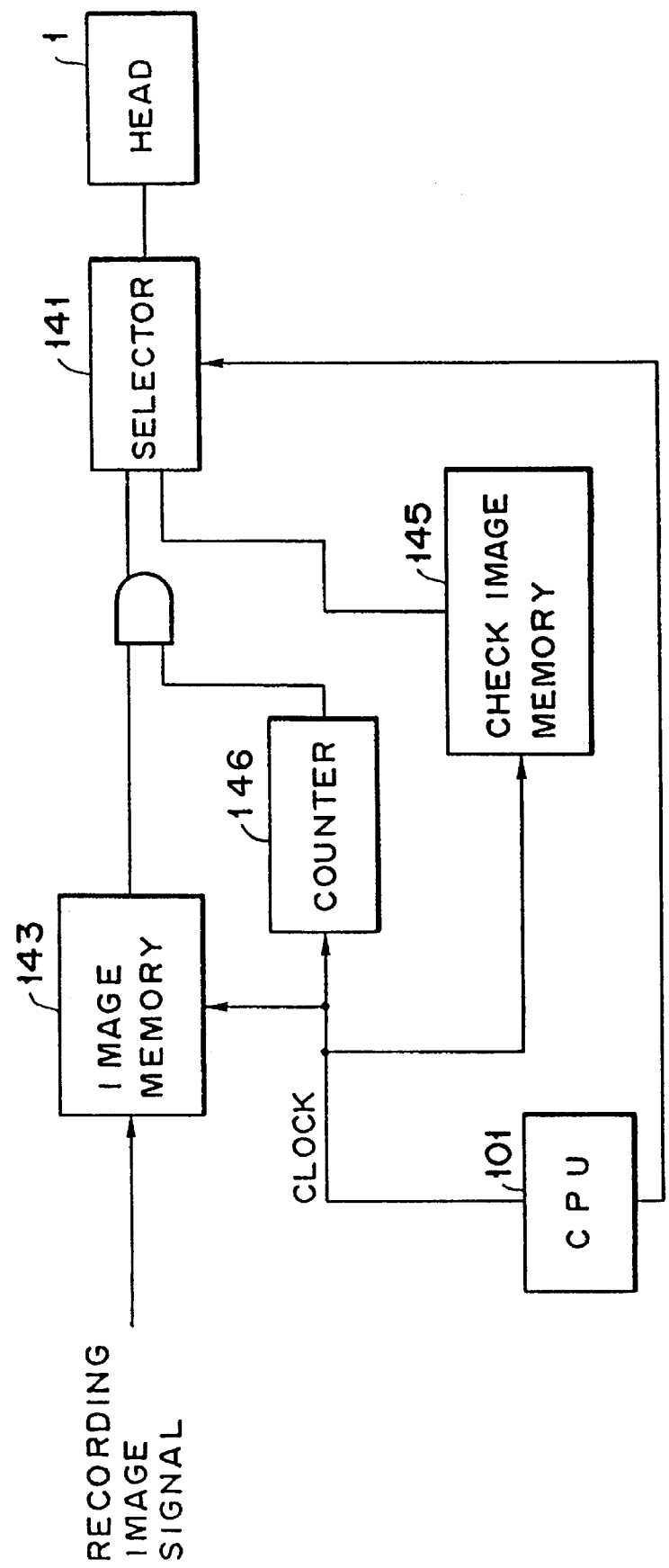
FIG. 21 is a block diagram which illustrates an example of the structure of a control system for performing the uneven image density correction for all orifices of a full multi-type recording head according to the present invention.

FIG. 21 illustrates an example of the structure of a circuit for performing the above-described operation. Referring to FIG. 21, reference numeral 141 represents a selector for selecting the range of the orifice of the recording head. Reference numerals 143 and 145 respectively represent memories for storing image data and test pattern to be recorded. Reference numeral 146 represents a counter which is used to cause the selector 141 to select the range of the orifice to be used at the time of the actual recording operation.

When the above-described ejection stabilizing operations has been completed, a predetermined test pattern is recorded by the recording heads 1C to 1BK in step S11. As a result, the uneven image density is read. Then, the operation performed at the time of recording the test pattern and reading the uneven image density according to this embodiment will now be described with reference to a timing chart shown in FIG. 22.

Figure 22:
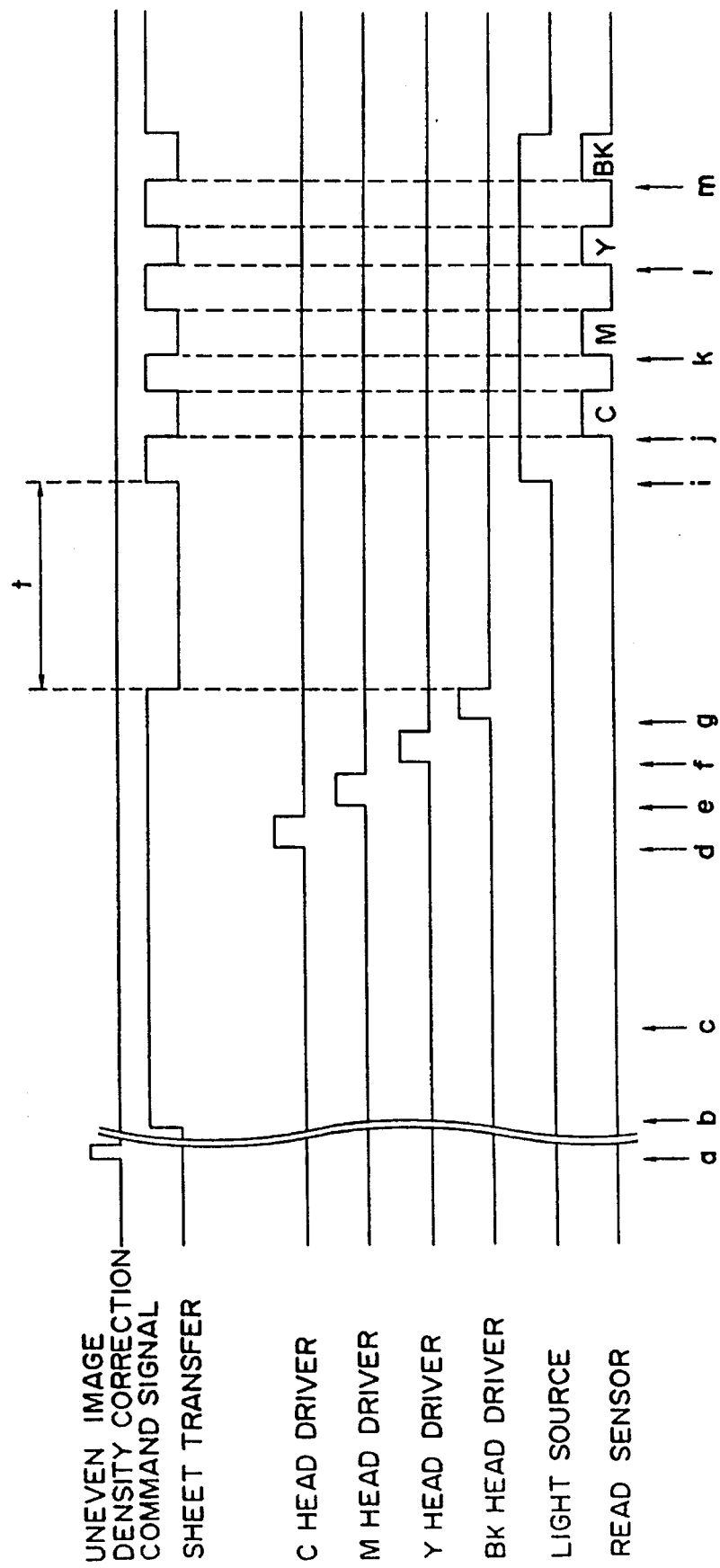
FIGS. 22 and 23 are timing charts which illustrate two examples of the operations of the apparatus according to the present invention from recording of a test pattern to reading of the uneven image density.

FIG. 22 is a timing chart for the operation performed by the apparatus according to this embodiment. The uneven image density correcting operation is started at timing a shown in FIG. 22. After the uneven image density correcting operation has been completed, the recording medium 2 is conveyed to the image recording region at timing b before the main scanning motor is rotated at timing c. Furthermore, the recording heads 1C, 1M, 1Y and 1BK for cyan, magenta, yellow and black are operated at timings d, e, f and g so that the test pattern is recorded to the surface of the recording medium 2. The test pattern thus recorded is used to read the uneven image density in a state where all of the unevenness correcting tables are arranged to be straight lines having an inclination of 1.0 and thereby the unevenness correction is not performed. The pattern at this time may be a uniform half tone type and its printing ratio of about 30 to 75%.

When the test pattern is recorded to the recording medium 2 by the corresponding recording heads, ink supplied from each of the recording heads cannot be immediately absorbed depending upon the type of the recording medium. As a result, the state of the uneven image density of the test patten recorded on the recording medium 2 cannot sometimes be stabilized in a short time.

According to this embodiment, the operation of reading the uneven image density of the test pattern by means of the uneven image density reading unit 14 is stopped until the state of the uneven image density of the test pattern recorded by the corresponding recording heads is stabilized. In order to stop it as described above, the conveyance of the recording sheet is stopped for a predetermined time t (step S13 shown in FIG. 16) after the recording of the test pattern has been completed by the recording head. After the state of the uneven image density of the test pattern has been stabilized, the recording medium is conveyed at timing i. Then, it is stopped when the pattern of C has reached the reading apparatus. Furthermore, the reading sensor 17 is operated at timing j so as to read the uneven image density of the test pattern for color C by the reading unit 14. Then, the uneven image density of each of M, Y and BK is read at timing k, l and m.

According to the result of an experiment carried out by the inventors of the present invention in such a manner that a test pattern was recorded at a printing ratio of 50% on an ink jet recording coat paper sheet by a recording head possessing a resolution of 400 dpi, it was sufficient to stop the recording paper sheet for about 3 to 10 seconds.

Figure 23:
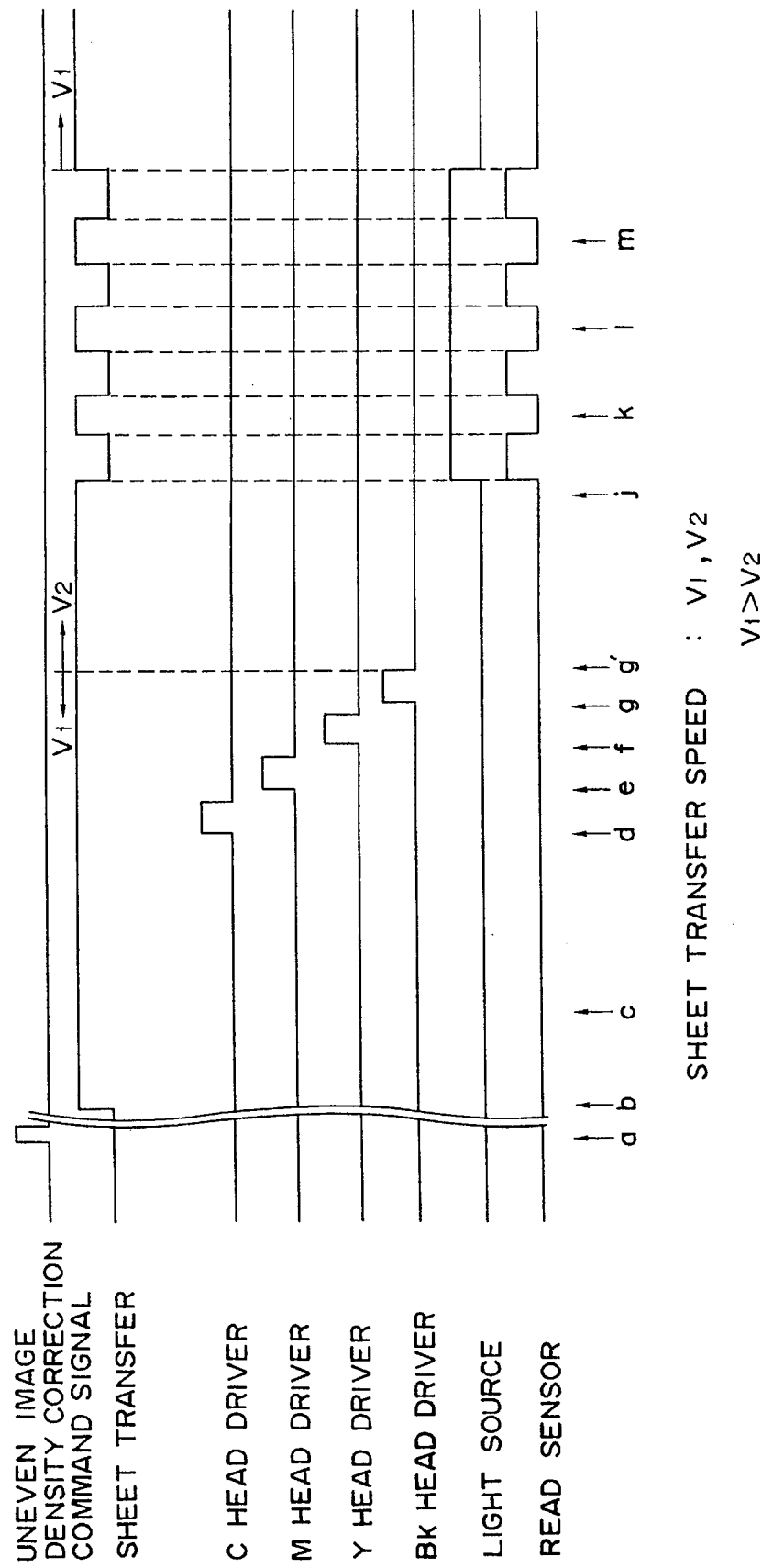

FIG. 23 is a timing chart which illustrates an example of the operation of the apparatus according to this embodiment. According to this example, it is arranged in such a manner that conveying speed v1 at which the recording medium is conveyed to the recording position and paper conveying speed v2 at which the recording medium is conveyed to the uneven image density reading unit 14 after the test pattern has been recorded (point g') by the recording head hold a relationship v1>v2. A similar effect to that obtainable from the structure shown in FIG. 22 can be obtained.

After the above-described fixing stabilizing process has been completed, the unevenness reading process is performed in step S15 shown in FIG. 16. That is, unevenness is read from each of the test patterns for each color so as to reload the correction data to each of the heads.

However, although a sole unevenness reading sensor 73 is provided according to this example, the sensor output denoting the result of reading is varied depending upon color. For example, in a case where an ordinary sensor having the spectral sensitivity which approximates visibility is used, BK displays the largest output density and C, M and Y display reduced output densities in this sequential order. For example, a ratio of outputs BK:C:M:Y becomes 1:0.8:0.75:0.25.

In a case where the quantity of the correction of the uneven image density is obtained from the ratio of the average density in the head and the density at the subject orifice, the above-described difference in the output causes no problem. An assumption is made that the output with respect to C is K1 times the output with respect to BK. Another assumption is made that the average density in the head 1BK is $\overline{ODBK}$, the density at the subject orifice is ODBKn, the average density in the head 1C is $\overline{ODc}$ and the density of the subject orifice of the head 1C is ODcn. When the unevenness at the subject orifice of the head 1BK and that of the head 1C are the same, the sensor output can be expressed by $\overline{ODc}=k1\times\overline{ODBK}$ and Dcn=K1×ODBKn. At this time, the quantity of correction of C becomes:

$$\frac{\overline{OD_c}}{OD_{cn}} = \frac{K_1 \times \overline{OD_{BK}}}{K_1 \times OD_{BKn}} = \frac{\overline{OD_{BK}}}{OD_{BKn}}$$

Therefore, it coincides with BK and no problem arises from the difference in the outputs from the corresponding colors.

However, in a case where the quantity of the correction of the uneven image density is obtained from the absolute value of the density at the subject orifice or from the difference between the average density and the density at the subject orifice, the difference in the sensor output from each of the colors causes a problem.

For example, in a case where the correction value is obtained from the difference between the average density and the density at the subject orifice, the following equation is held:

ODc–ODcn=K1(ODBK–ODBKn)

As is shown, the correction value of C is K1times that of BK. In accordance with the thus obtained value, the correction data for the subject orifice is obtained. However, another problem arises in that the final quantity of the correction becomes different between BK and C although the uneven image densities of the heads are the same.

Accordingly, in order to overcome the above-described problem, this embodiment is arranged in such a manner that the ratio of the sensor outputs from the corresponding colors has been previously obtained. The sensor output is multiplied by the inverse number of the above-described ratio by the CPU 101 at the time of the operation for reading the unevenness so as to perform the correction of the unevenness in accordance with the result of the multiplication.

For example, in a case where the output ratio between BK, C, M and Y is 1:K1:K2:K3, the output when BK is read is multiplied by "1", the output when C is read is multiplied by 1/K1, the output when M is read is multiplied by 1/K2 and the output when Y is read is multiplied by 1/K3.

As a result, the following relationship can be obtained from the above-described example:

$$1/K1 \times (0Dc-0Dcn) = 1/K1\{K1 \times (0DBK-0DBKn)\} = 0DBK-0DBKn$$

Therefore, the most suitable correction can be performed regardless of the sensor output ratio for each of the colors.

The structure in which the above-described correction of the sensor output is performed in the CPU 101 may be replaced by a structure arranged in such a manner that the same is performed in a stage prior to the CPU 101.

In this case, an effect can be obtained in that deterioration in the resolution of read data about each of the colors can be prevented since the output value of each of the colors must be converted into digital data in a width of 8 bit of the dynamic range in a case where the A/D converter 127 is constituted by 8 bit.

Figure 24:
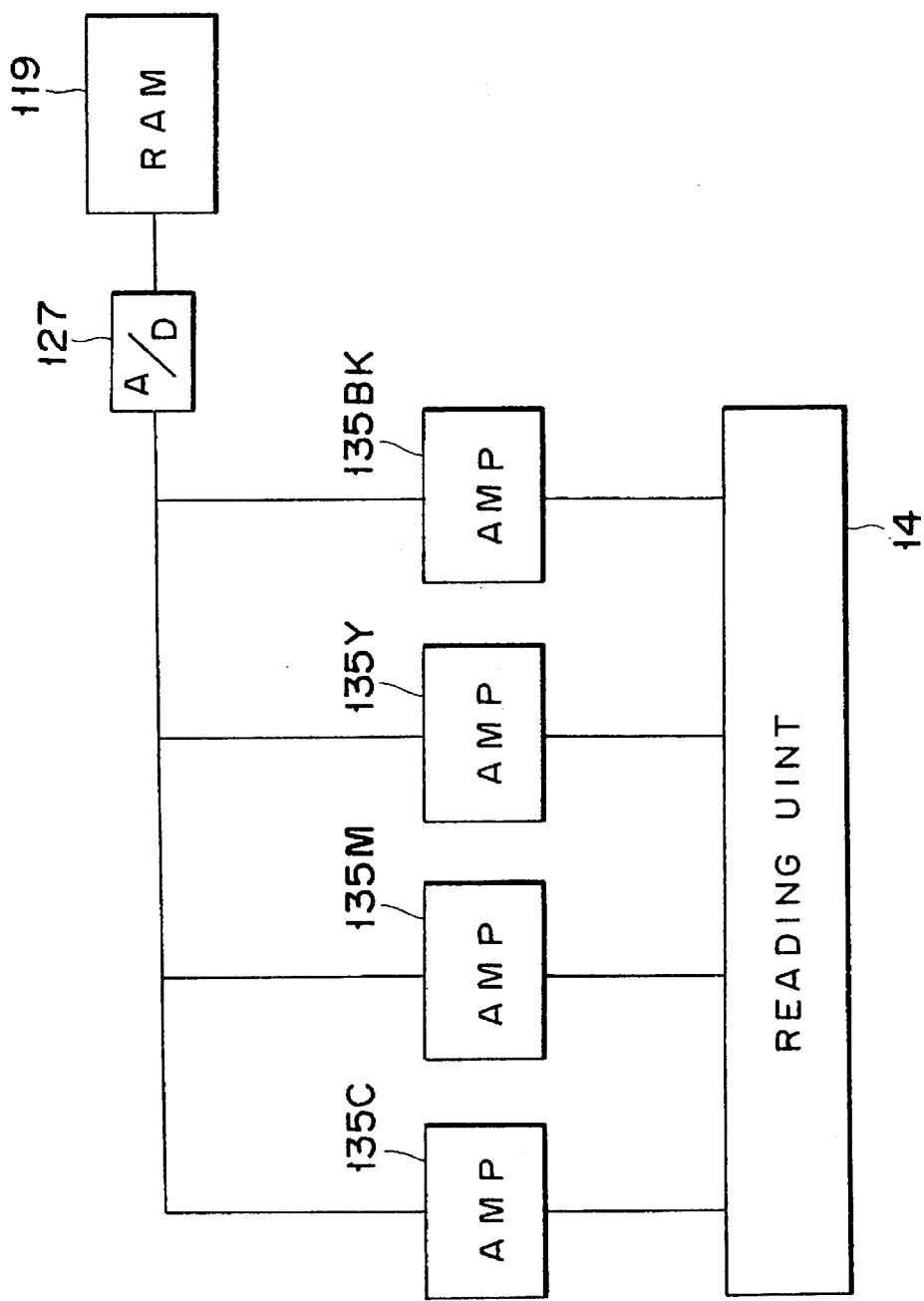
FIG. 24 is a block diagram which illustrates an example of the structure for correcting the difference in the output depending upon the color of the unevenness reading sensor.
Figure 25A:
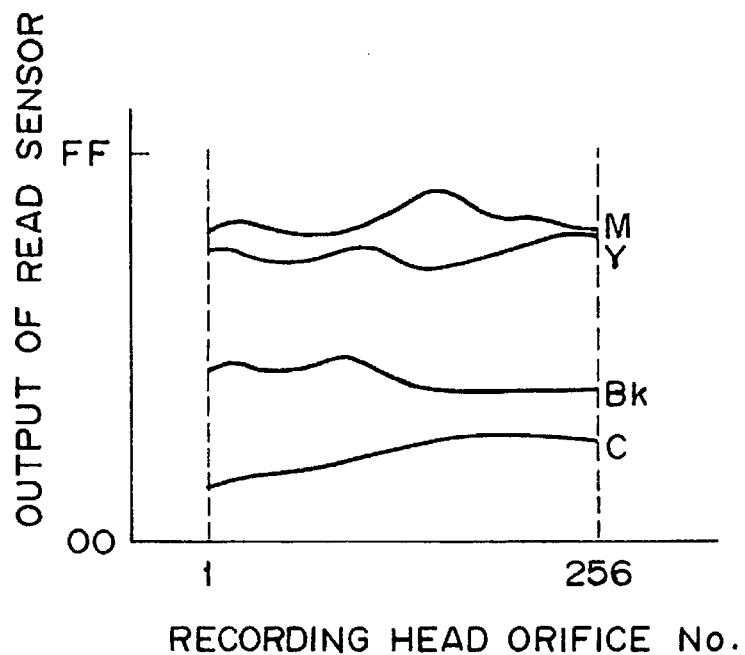
FIGS. 25A and 25B illustrate its correction.
Figure 25B:
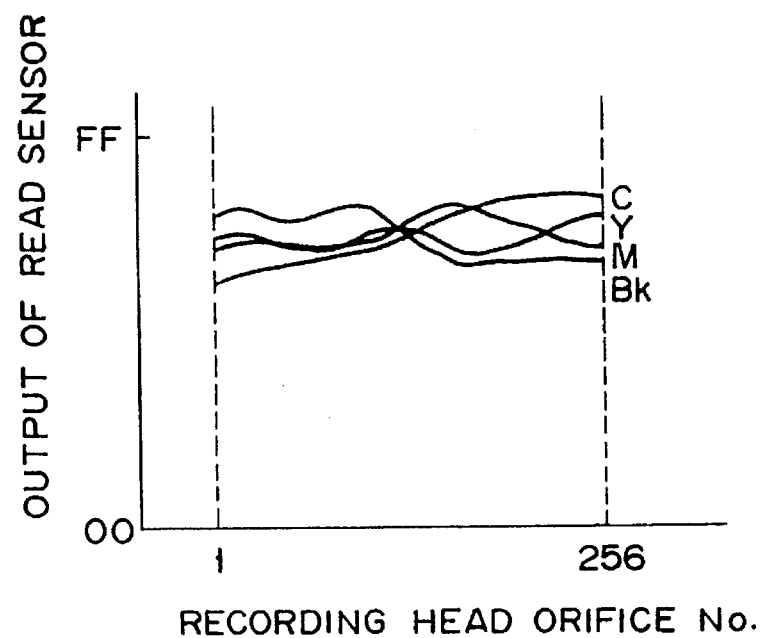

That is, amplifiers 135C, 135M, 135Y and 135BK for amplifying the read signals of the corresponding colors are, as shown in FIG. 24, provided, so as to make, as shown in FIG. 25B, substantially coincident the sensor output value of the read signal of the corresponding colors as shown in FIG. 25A. As a result, the overall signal width at the time of the A/D-converting of the read signal can be reduced. Therefore, the resolution of read data in 8 bit can be improved, and the reading accuracy can further be improved.

Thus, the unevenness correction is performed in step S17 shown in FIG. 16. That is, signals corresponding to the number of the orifices are sampled from the signal denoting the read uneven image density so as to make it data which corresponds to the orifice. Assuming that the above-described data is R1, R2, ..., RN (N denotes the number of the orifices), the following calculation is performed in the CPU 101 after it has been temporarily stored in the RAM 119. The above-described data is subjected to the following calculation so as to be converted into a density signal:

$$Cn = -\log(Rn/R0)$$

where R0 is a constant satisfying the relationship $$R0 \leq Rn;\ 1 \leq n \leq N$$

Then, the average density is obtained from the following calculation:

$$\bar{C} = \sum_{n=1}^{N} Cn/N$$

Subsequently, the degree of deviation of the density corresponding to each of the orifices from the average density is calculated as follows:

$$\Delta Cn = \bar{C}/Cn$$

Then, the signal correction quantity $(\Delta S)n$ corresponding to $(\Delta C)n$ is obtained from the following equation:

$$\Delta Sn = A \times \Delta Cn$$

where symbol A denotes a coefficient determined in accordance with the gradation characteristics of the head.

Subsequently, a selection signal for a correction straight line to be selected is obtained in accordance with $\Delta Snso$ as to cause the unevenness correction signal having 61 types of values from "0" to "60" to be stored in the correcting RAMs 129C to 129BK by a quantity which corresponds to the number of the orifices. By using the thus processed uneven correction data, γ straight lines which are different depending upon the orifices are selected so as to correct the uneven image density and reload the unevenness correction data.

Then, a determination process in step S19 shown in FIG. 16 is performed before the test pattern is again recorded by each of the recording heads by using the above-described correction data. The test pattern thus recorded by each of the recording heads is again read by the uneven image density reading unit 14 so as to calculate the uneven image density correction data. The above-described L0 operation is repeated several times, and the uneven image density correcting operation is ended.

As described above, only a single operation is necessary for one recording medium to be automatically repeatedly subjected several times to the processes of recording the test pattern of each of the recording heads, reading by means of the uneven image density reading unit 14 and calculating the uneven image density. As a result, the accuracy of correcting the uneven image density of the recording head, the uneven image density of which cannot be sufficiently corrected by a sole operation of correcting the uneven image density, can be improved. Therefore, the total correcting time can be shortened.

According to the above-described embodiments of the present invention, when at least printing for inspecting the density such as a test pattern is performed, the printing duty, that is, the setting of printing can be performed by the modulation of the number of the recording dots within the number of the structural dots in a case where one pixel is constituted by several dots. In this case, it is preferable that the printing duty is 75% or lower and as well as 25% or higher in place of 100%. It is most suitable that the printing duty is 50% when the test pattern is formed. The reason for this lies in that the most satisfactory effect can be obtained when it is adapted to a system for optically obtaining the reflected image density and thereby a small density change can be obtained as that suitable for the printing characteristics of the recording head.

However, the above-described printing ratio can be established by modulating the driving voltage and/or the driving pulse width or by modulating the number of driven ink for one dot. The above-described arrangement can be adapted to a case in which one pixel is constituted by one dot. That is, the present invention can, of course, be applied to any structure regardless of the printing ratio established by modulating the subject.

The above-described embodiment of the present invention is the most suitable embodiment for performing the obtained correcting operation for each of the ejection energy generating elements. However, it is preferable that the structure be arranged in such a manner that a predetermined number of adjacent ejecting energy generating elements are subjected to a common correction when the state of convergence of the density uniforming process and required time are taken into consideration. In this case, the most suitable structure is arranged in such a manner that block driving groups formed by collecting a multiplicity of ejecting energy generating elements of a recording head are subjected to a common correction. The block driving may be arranged to be a known or conventional driving method or a special block driving method. However, any of the above-described methods must, of course, be employed providing that the driving conditions are capable of rendering uniform the corrected density after the uneven image density has been determined according to the present invention.

Furthermore, data relating to the test pattern may be supplied from the host device to the structure shown in FIG. 14. As an alternative to this, it may be supplied from a test pattern data generating means integrally combined with the structure shown in FIG. 14 or the recording head 1.

As described above, the test pattern is recorded in a state where the recording head has been properly adjusted. Then, the uneven image density is corrected in accordance with the test pattern. As a result, even if the temperatures at the time of the recording operation vary, a correction of the unevenness which can be adapted to the overall range can be performed so that a substantially even image can be obtained. Furthermore, the ejecting stabilizing is performed prior to the operation of recording the test pattern at the time of the correcting operation. As a result, normal operating characteristics of the recording head can be obtained. Therefore, the uneven image density can be correctly recognized. That is, the uneven image density can be accurately corrected by obtaining accurate information about the uneven image density.

In addition, since the uneven image density is read after fixing of the test pattern has been stabilized, reading of the uneven image density or correcting of the same in accordance with reading can be performed accurately.

Then, a second embodiment of the present invention will now be described. The second embodiment is arranged in such a manner that test pattern is formed while being subjected to the correction of the unevenness, the unevenness correction data is corrected in accordance with the result of the reading of the test pattern and the image signal is corrected in accordance with the unevenness correction data after the above-described correction has been completed. As a result, the uneven image density can accurately be read or corrected. Furthermore, the unevenness correction data can be reloaded in a short time.

The second embodiment will specifically be described below.

Figure 26:
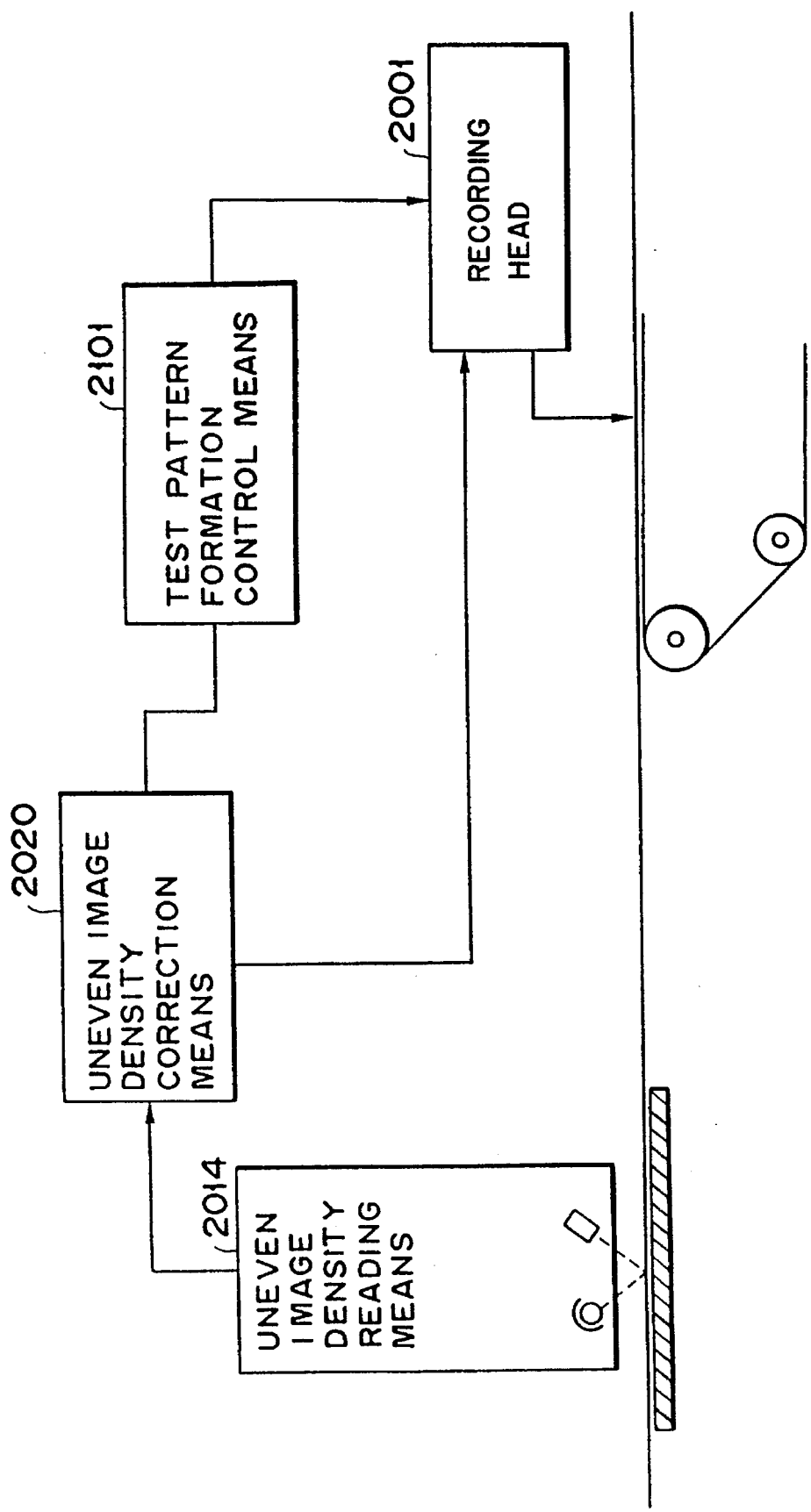
FIG. 26 illustrates the schematic structure of a second embodiment of the present invention.

FIG. 26 is a schematic view which illustrates an essential portion of the second embodiment. Referring to FIG. 26, the elements given the same reference numerals as those shown in FIG. 1 are the same elements.

Reference numeral 2101 represents a control means for forming the test pattern under the driving conditions established at the previous uneven image density correction operation. Reference numeral 1017 represents a platen for flattening the recording medium at the position at which the test pattern is read.

Figure 27B:
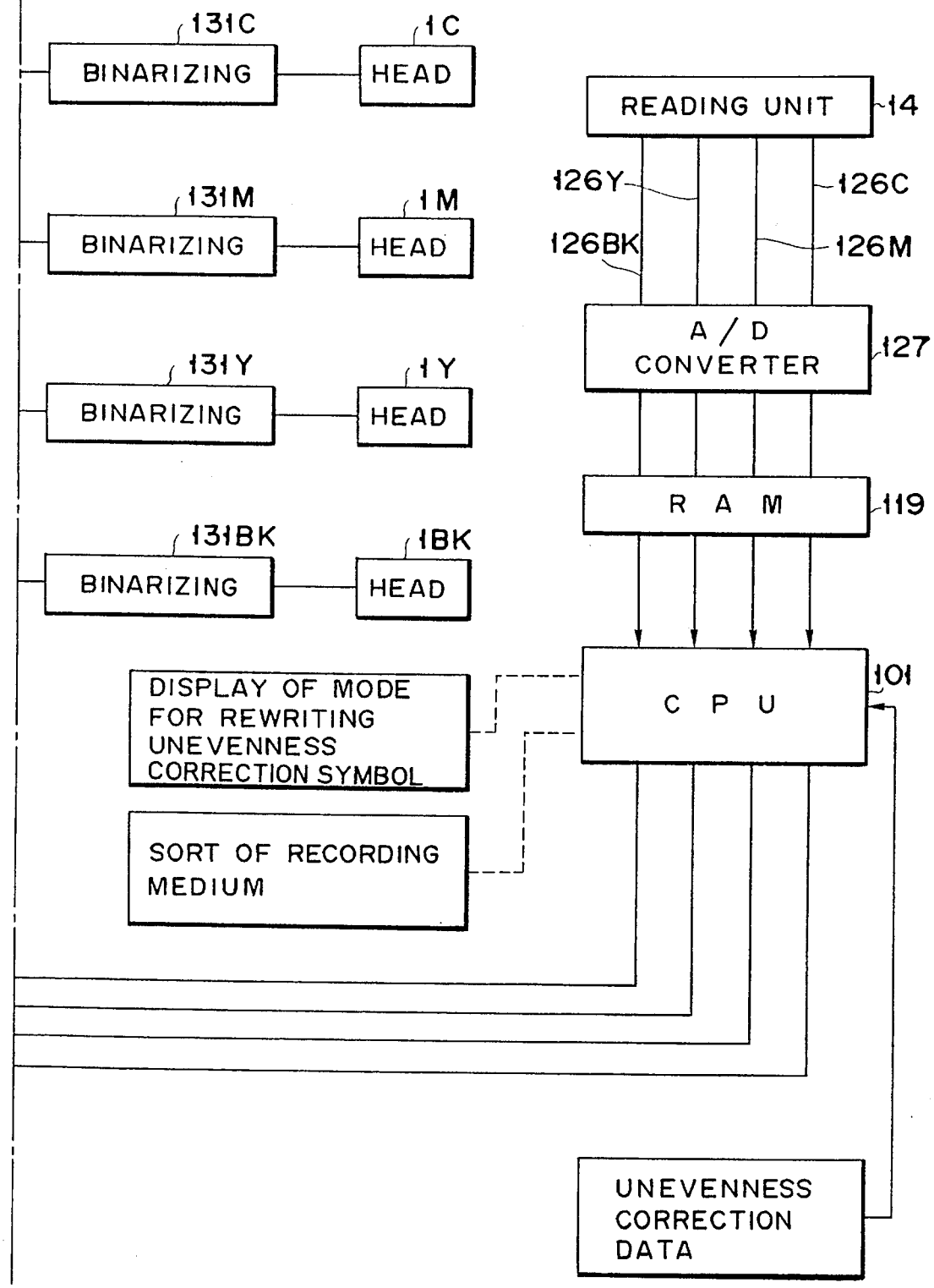
FIG. 27 is a block diagram which illustrates the unevenness correcting process according to the second embodiment of the present invention.

FIG. 27 illustrates a circuit for correcting the uneven image density according to the second embodiment. The control system disposed in front of the correction circuit is arranged to be the same as that shown in FIG. 13. The elements given the same reference numerals as those shown in FIG. 14 are the same elements. Referring to FIG. 27, reference numeral 141 represents an unevenness correction pattern generator, 143 represents a ROM which stores the initial value of the unevenness correction data.

Figure 28:
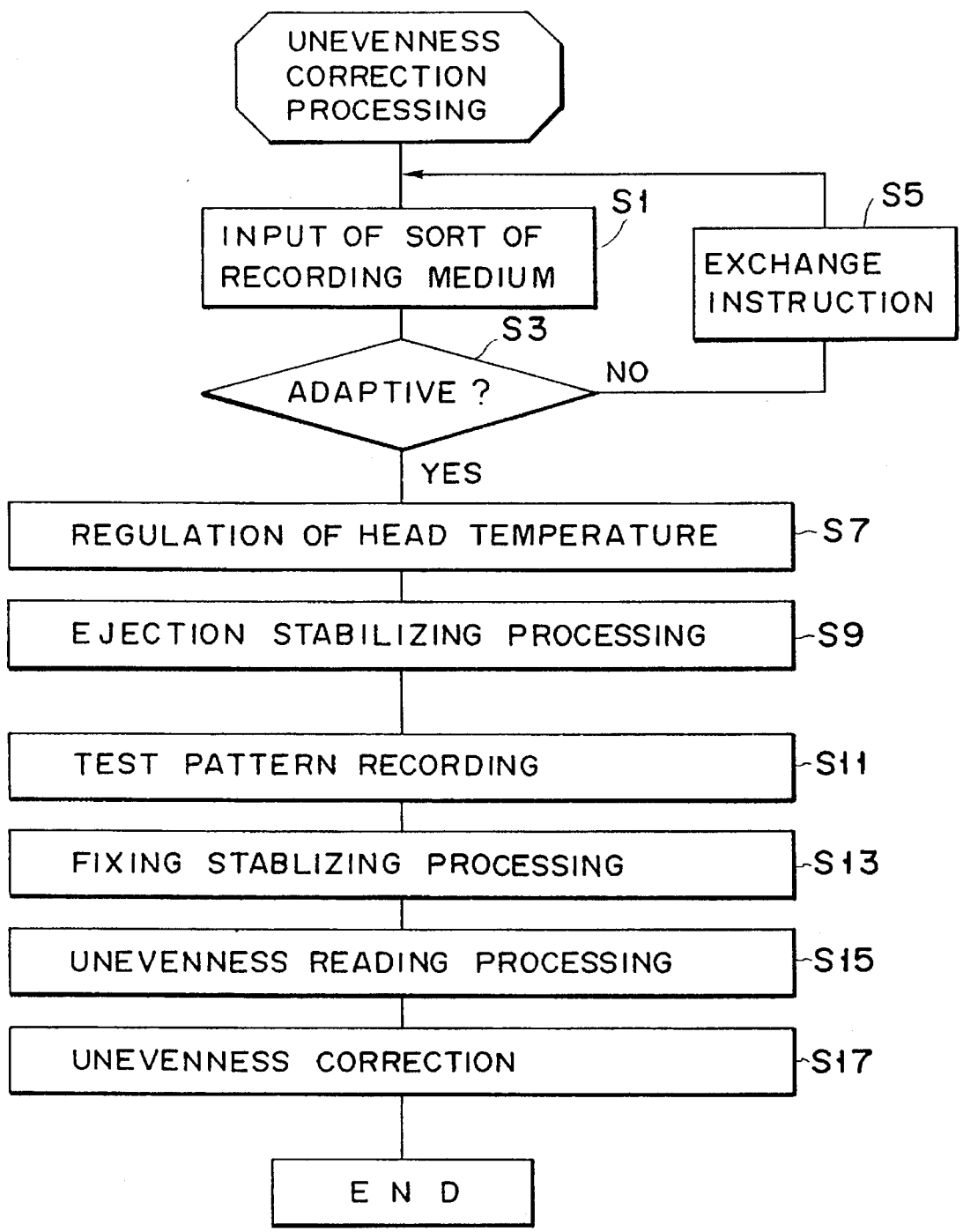
FIG. 28 is a flow chart which illustrates the unevenness correcting process according to the second embodiment of the present invention.

FIG. 28 illustrates an example of an unevenness correction process according to the second embodiment. Since steps S1, S3, S5, S7, S9, S13, S15 and S17 shown in FIG. 28 are the same as those shown in FIG. 16, their descriptions are omitted here.

When the above-described ejecting stabilizing process has been completed in step S9, a predetermined test pattern is recorded by the recording heads 1C to 1BK in step S11so that the uneven image density is read.

When the test pattern is recorded, an even signal of a duty ratio of 50% is generated in an unevenness correcting pattern generator 141. At this time, the unevenness correction table selects a correction line selected in accordance with the correction data which has been used. That is, when reloading of the unevenness correction data is first performed after the apparatus has been used, the correction line selected by data of the unevenness correction data ROM 143 is used. When the reloading is the second or ensuing time, the correction line selected by data obtained in the previous process is used. Therefore, the image signal supplied to the recording head 1 is not a uniform signal but it is an uneven signal which corrects the uneven image density of the head. Then, a test image formed by receiving the above-described signal becomes the correction patten.

Then, the operations in step S13 and ensuing steps are performed so that the unevenness correction is performed as described above.

As described above, the test pattern formed by using data obtained from the previous correction of the unevenness is read, the unevenness correction data is corrected in accordance with the result of the reading operation and the image signal is corrected in accordance with the unevenness correction data after the above-described correction has been performed. As a result, the uneven image density can be accurately read or corrected. Furthermore, the correction data can be reloaded in a short time.

The present invention is not limited to the above-described embodiments, and various modifications may be carried out within the scope of the present invention. Next, an embodiment arranged in such a manner that the present invention is applied to a serial printer will be described. The control system and the processing sequence can, of course, be employed in the following examples.

Figure 29:
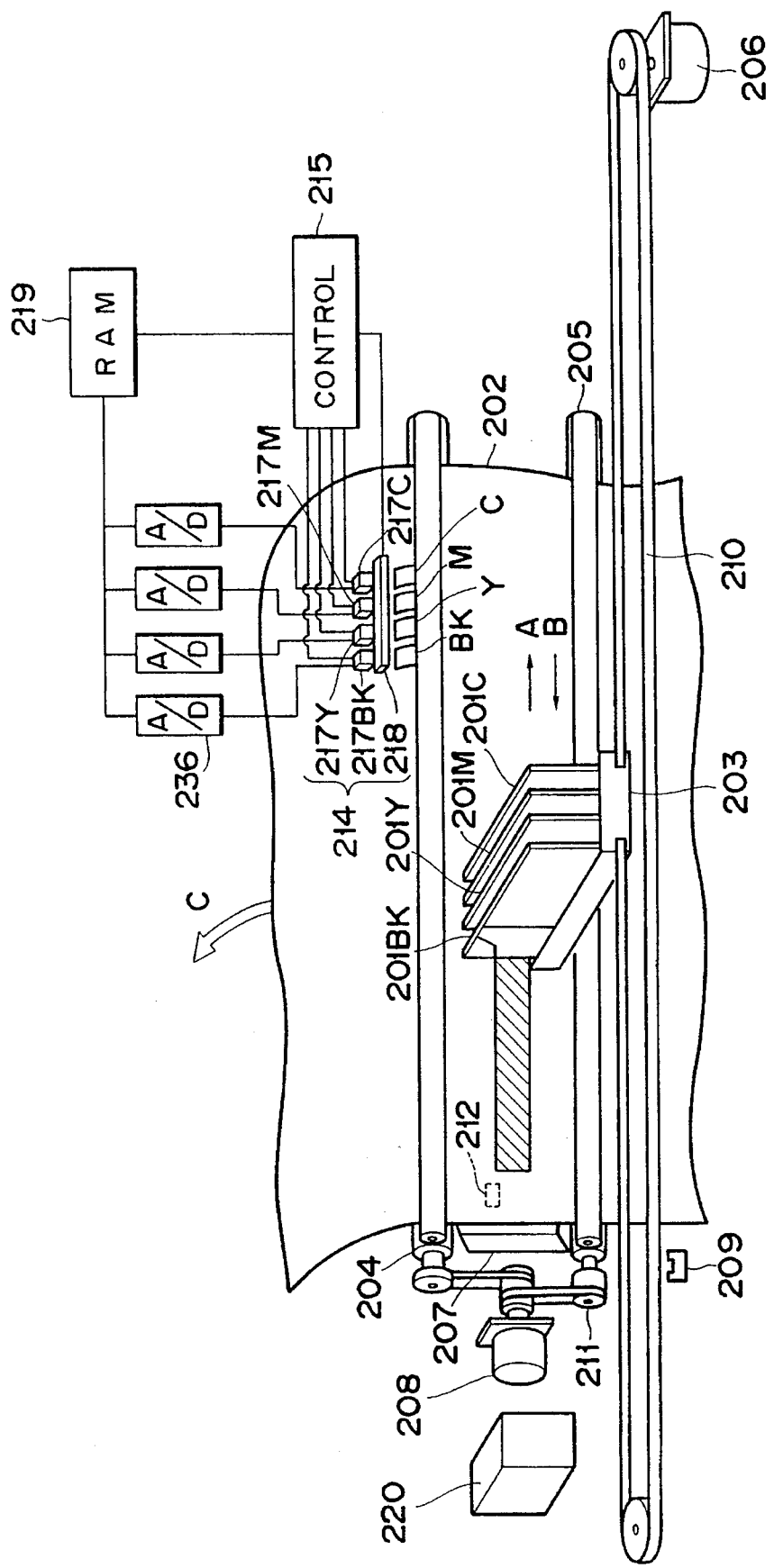
FIG. 29 is a schematic view which illustrates an apparatus of a serial printer type according to a third embodiment of the present invention.

FIG. 29 is a schematic view which illustrates a third embodiment of an ink jet recording apparatus of a serial printer type. The recording heads 201C, 201M, 201Y and 201BK are supplied with cyan, magenta, yellow and black ink from an ink tank (omitted from illustration) through ink tubes. Ink supplied to the recording heads 201C, 201M, 201Y and 201BK is ejected from the same when they are operated by the recording head driver or the like in response to a recording signal which corresponds to recording information supplied from a main control portion arranged substantially similarly to that shown in FIG. 13 so as to be recorded on a recording medium 202.

A conveying motor 208 is a power supply for intermittently conveying the recording medium 202. A main scanning motor 206 for operating a feeding roller 204 and a conveying roller 205 serves as a power source for causing a main scanning carriage 203 to perform a scanning operation via a main scanning belt 210 in directions designated by arrows A and B. It is necessary to accurately perform the conveying of paper in the structure according to this embodiment. Therefore, the paper feeding motor 208 and the main scanning motor 206 are arranged to be pulse motors.

When the recording medium 202 reaches a supplying roller 205, a supply roller clutch 211 and the conveying motor 208 are turned on so that the recording medium 202 is conveyed on the platen 207 until it reaches the conveying roller 204. The recording medium 202 is detected by a detecting sensor 212 disposed above the platen 207 so that sensor information is used in a position controlling operation and jam preventing operation. When the recording medium 202 reaches the conveying roller 204, the supplying roller clutch 211 and the conveying motor 208 are turned off so that a sucking operation is performed by a sucking motor (omitted from illustration) from the inside of the platen 207. As a result, the recording medium 202 is brought into closely contact with the surface of the platen 207 at a position on the image recording region. The scanning carriage 203 is shifted to the position of the home position sensor 209 prior to the operation of recording an image to the recording medium 202. Then, a forward directional scanning operation is performed in a direction designated by an arrow A so that cyan, magenta, yellow and black ink is ejected from a predetermined position of each of the recording heads 201C to 201BK whereby an image is recorded. After an image for a predetermined length has been recorded, the operation of the scanning carriage 203 is stopped, and the reverse directional scanning operation is performed in a direction designated by an arrow B whereby the scanning carriage 203 is returned to a position of the home position sensor 209. During the reverse directional scanning operation, the recording medium is conveyed by the conveying roller 204 by the conveying motor 208 for a length recorded by the recording heads 201 to 201BK in a direction designated by an arrow C.

According to this embodiment, the recording heads 201C to 201BK are ink jet recording heads which form bubbles due to heat so as to eject ink droplets due to the pressure of the bubbles. Four recording heads each of which is constituted by assembling 256 orifices are used in the structure according to this embodiment.

When the scanning carriage 203 is stopped at the home position detected by the home position sensor 209, an operation of recovering the recording head 1 is performed by a recovering device 220 so as to stably perform the recording operation. This operation is performed for the purpose of preventing the generation of unevenness at the start of the ejection due to the change in the viscosity of ink left in the orifice of the recording head 201. The operation is performed under conditions, such as the pause time, temperature in the apparatus and duration of the ejection which have been previously programmed in such a manner that the recording head 201 is subjected to the sucking process and ink sub-ejecting process and the like by means of the recovering device 220.

The above-described operation is repeated so that an image is recorded to the entire surface of the recording medium. Referring to the drawing, reference numeral 214 represents an uneven image density reading unit for reading a test pattern printed on the recording medium 202 by giving a uniform image signal to each of the recording heads 201C to 201BK so as to transmit a reading signal, the uneven image density reading unit being disposed outside the image recording region. According to this embodiment, it is disposed in the lower stream from the recording head when viewed in the direction (a direction designated by an arrow C) in which the recording medium 202 is conveyed, the uneven image density reading unit 214 being disposed adjacent to the discharge portion in such a manner that it confronts the recording side of the recording medium 202. Similarly to the above-described structure, the recording medium 202 on which the test pattern is recorded is irradiated with light supplied from a light source 218. Then, recorded image density of the test pattern recorded to the recording sheet by each of the recording head is read by reading sensors 217C, 217M, 217Y and 217BK. Then, a reading signal denoting the test pattern recorded by each of the recording heads and read by each of the reading sensors is converted into a digital signal by an A/D converter 236. The reading signal is temporarily stored in a RAM 219.

It is necessary for the test pattern recorded by the recording head to be a half tone patten of an even density and a specific pattern of a recording ratio of about 30 to 75% must be selected. The reading sensors 217C, 217M, 217Y and 217BK transmit reading signals after they read the test patterns. They are disposed outside the image recording region, according to this embodiment, it being disposed in the lower stream from the recording head when viewed in the direction designated by an arrow C in which the recording medium 202 is conveyed and adjacent to the discharge portion in such a manner that it confronts the recording side of the recording sheet.

Figure 30:
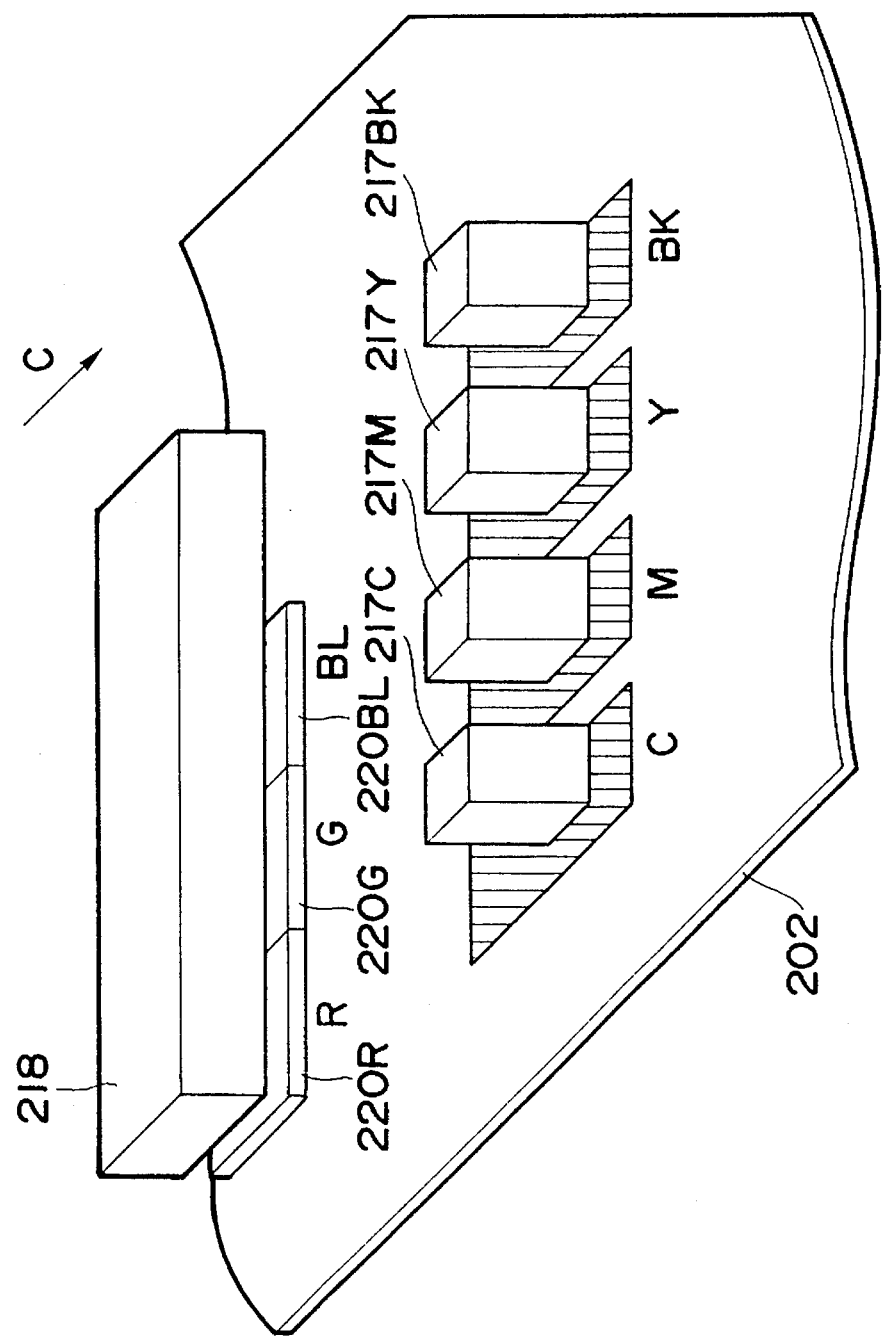
FIG. 30 is a schematic view which illustrates its reading system unit.

FIG. 30 is a schematic view which illustrates the reading portion according to this embodiment. In order to improve the accuracy of reading the uneven image density of the test pattern recorded on the recording medium 202 by the recording head, color filters 220R, 220G and 220BL are disposed near the irradiating light source 18 adjacent to the recording medium so as to apply R, G and BL light to the C, M and Y test patterns recorded on the recording medium 202. Thus, the additive complementary color light to C, M and Y are applied to the test patterns of C, M and Y colors. As a result, the necessity of varying the spectral sensitivity of each of the reading sensors 217C, 217M, 217Y and 217BK depending upon the color of the test pattern can be eliminated. Therefore, sensors of the same spectral sensitivity can be used to read the uneven image density for each of the colors. It is preferable that the test pattern be read by the uneven image density reading means 14 by averaging to a certain degree. As a result of the experiment carried out by the inventor of the present invention, a satisfactory effect was obtained when the width of the reading opening of the reading sensor was made to be about 0.2 mm to 1 mm.

A structure arranged in such a manner that the above-described retaining member is provided to the above-described structure for the purpose of preventing floating of the sheet at the time of reading may be employed.

Figure 31:
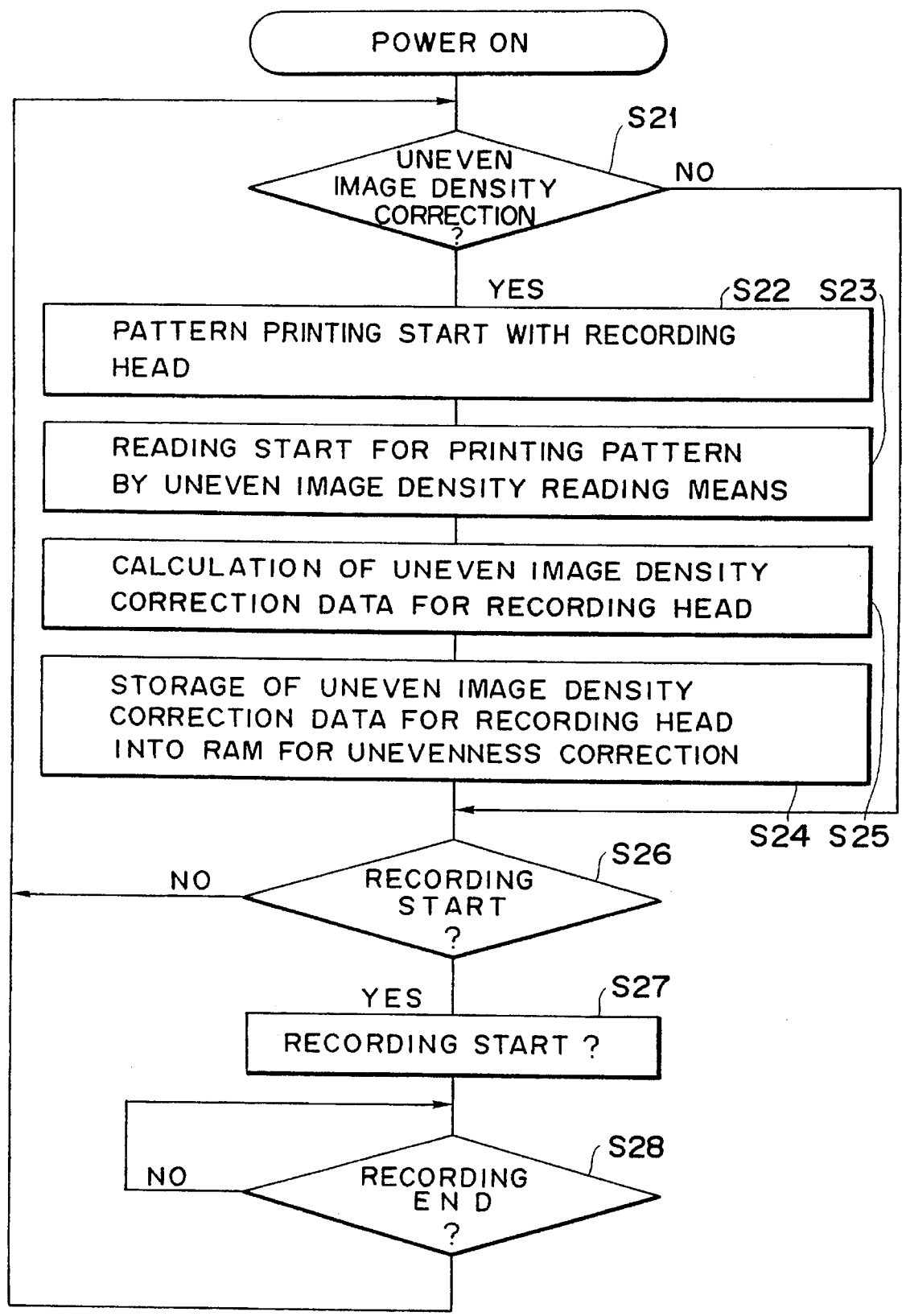
FIG. 31 is a flow chart which illustrates an unevenness correcting process according to the third embodiment of the present invention.

FIG. 31 is a flow chart which illustrates the sequence of a control operation performed by a control circuit structured similarly to that shown in FIGS. 13 and 14.

After power has been supplied to the recording apparatus, it is determined, in step S21, that the uneven image density correcting operation by means of the recording head is performed in response to a signal supplied from the control circuit 215. If it has been determined that the uneven image density correcting operation by means of the recording head is performed, the flow advances to step S22 in which the operation of printing the test pattern by the recording head is started. Then, in step S23, the test pattern of the recording head is read by the uneven image density reading means 214. In step S24, uneven image density correction data of the recording head is calculated before the flow advances to step S25 in which the uneven image density correction data of the recording head is stored in the correction RAM.

In step S26, a determination is made in response to a signal supplied from the control circuit 215 whether or not recording is started. If it has been determined that the recording operation is performed, the flow advances to step S27 in which the recording operation by the recording head is started. In next step S28, it is determined whether or not the recording operation has been completed. If it has been determined that the recording operation has been completed, the recording head is again brought to the waiting state. The structure may be arranged in such a manner that the determination whether or not the correcting operation is performed is made in accordance with a command issued by an operator through a display member or the like.

Figure 32:
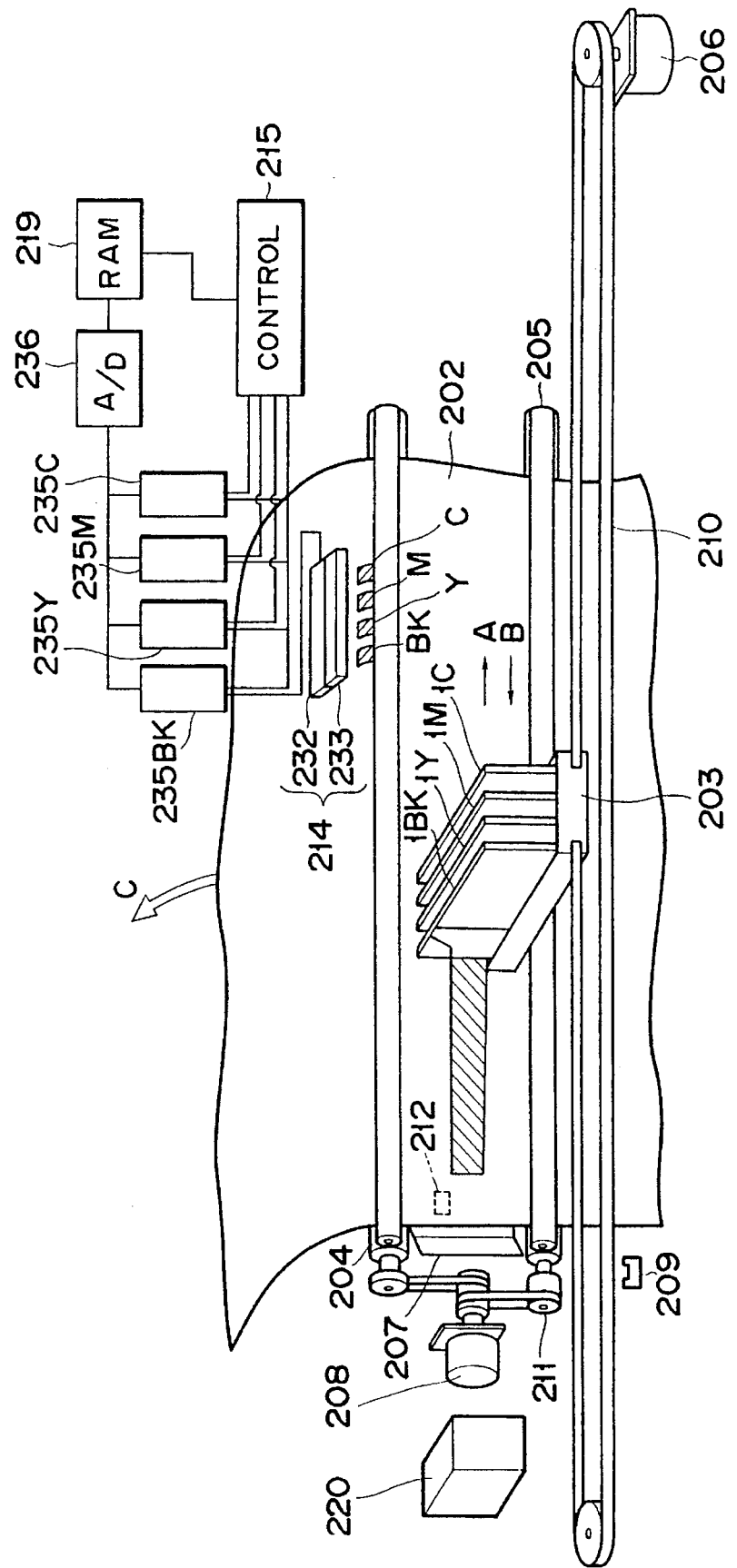
FIG. 32 is a schematic view which illustrates an apparatus of a serial printer type according to a fourth embodiment of the present invention.

FIG. 32 is a schematic view which illustrates a fourth embodiment of an apparatus of a serial printer type according to the present invention.

The structure arranged in such a manner that uniform image signals are supplied to the recording heads 201C, 201M, 201Y and 201B and the test pattern recorded on the recording medium 202 is thereby read so as to transmit the reading signal is the same as the above-described embodiment. According to this embodiment, the uneven image density reading unit 214 disposed outside the image recording region is constituted by a reading sensor 232 of a linear shape and a light source 233.

That is, according to this embodiment, the uneven image density reading unit 214 is disposed in a lower stream from the recording head in a direction (the direction designated by the arrow C) in which the recording medium 202 is conveyed adjacent to the discharging portion in such a manner that it confronts the recording side of the recording medium. Furthermore, a retaining member structured similarly to that according to the above-described embodiment is used. As a result, the distance between the recording medium 202 and the reading sensor 232 can easily be maintained when the test pattern recorded on the recording medium 202 is read. Furthermore, the number of reading sensors can be reduced to one, causing an effect of reducing the overall size of the apparatus to be obtained.

Figure 33:
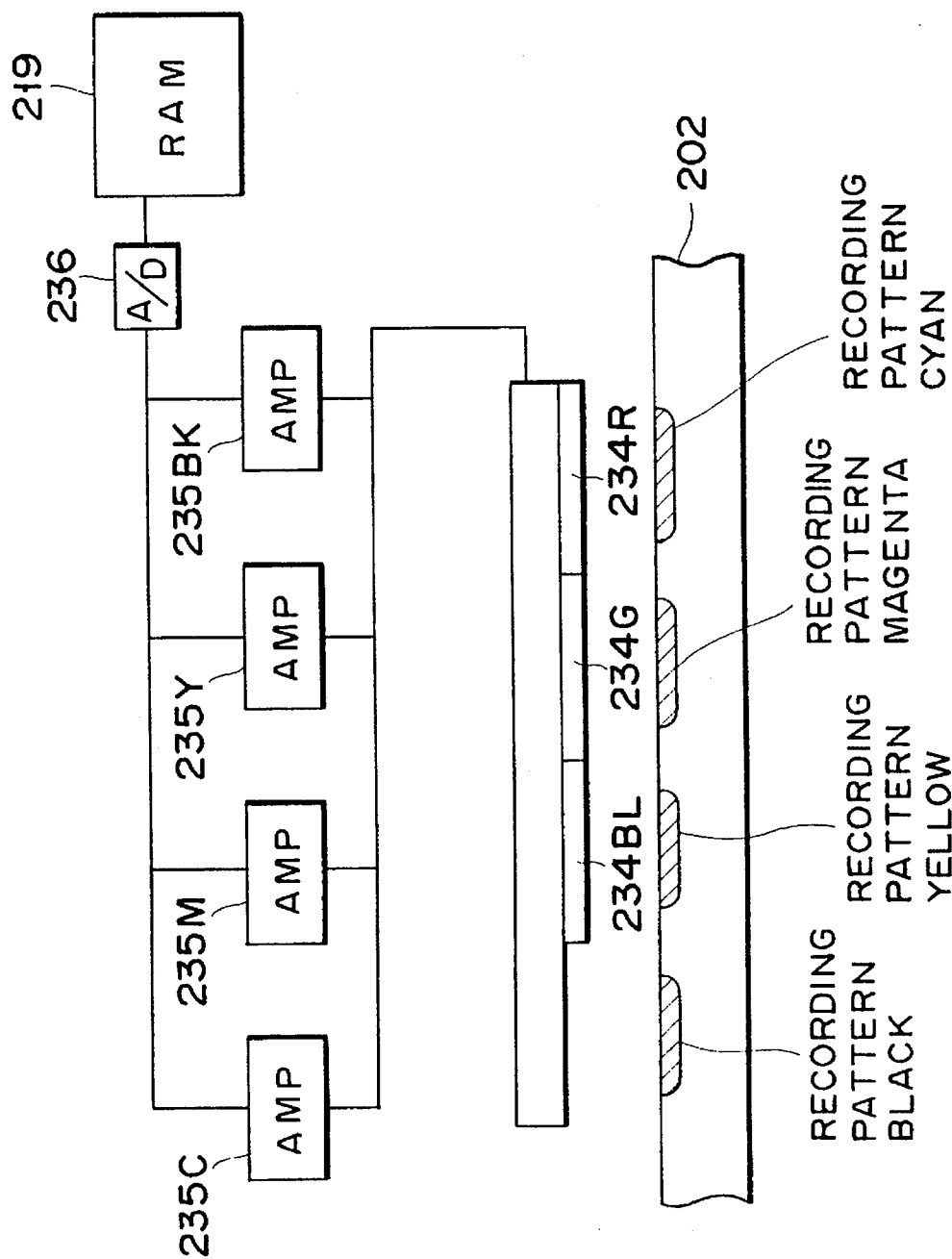
FIG. 33 is a schematic view which illustrates its reading system unit.

As shown in FIG. 33, color filters 234R, 234G and 234B of R, G, and BL an L are disposed on the reading side of the reading line sensor 232 to correspond to the positions of the test patterns recorded by the recording heads on the recording medium 202. As a result, accuracy in the operation of reading the colors of the printed pattern performed by the reading sensor 232 can be improved. Furthermore, similarly to the description made with reference to FIGS. 24 and 25, the reading signals for the corresponding colors are amplified by the amplifiers 235C to 235BK. As a result, the resolution of reading data can be improved so that the reading accuracy can further be improved.

Figure 34:
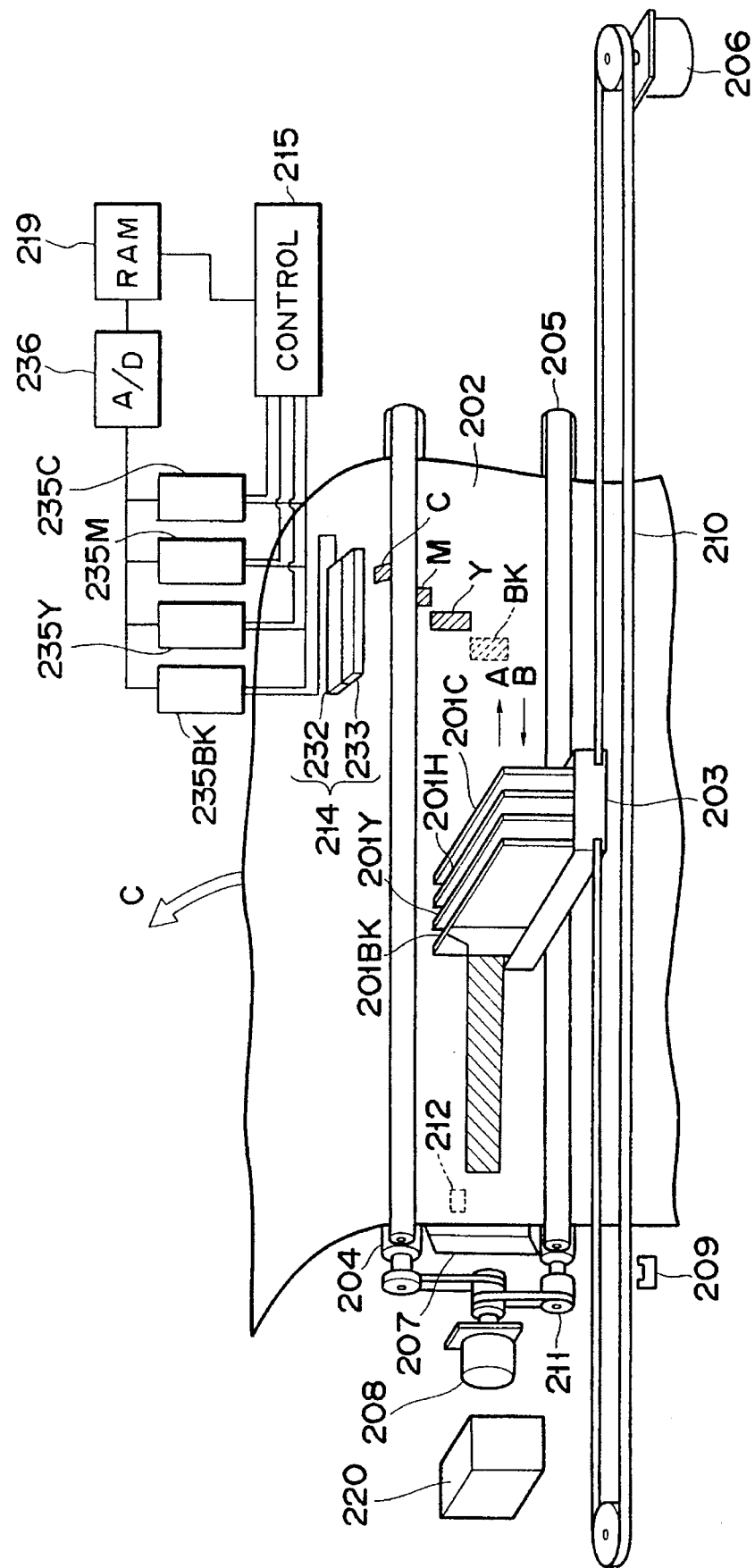
FIGS. 34 and 35 are schematic views which illustrate an apparatus of a serial printer type according to a fifth and sixth embodiments of the present invention.

FIG. 34 illustrates a fifth embodiment of the serial printer type apparatus of the present invention. According to this embodiment, when the carriage on which the recording heads 201C, 201M, 201Y and 201BK are mounted is scanned in directions A and B to record the test pattern to the recording medium 20, the test pattern is recorded by the recording head of a certain color whenever the carriage 203 is scanned. After the reading line sensor 232 has read the test pattern recorded on the recording medium 202, the carriage 203 is scanned so that the test pattern is recorded on the recording medium 202 by the next recording head.

That is, according to this embodiment, the test patterns recorded on the recording medium by the recording heads are read for each color. Therefore, the capacity of the RAM 219 for storing the read data of the test pattern can be reduced to one-fourth, causing the size of the apparatus to be reduced.

Figure 35:
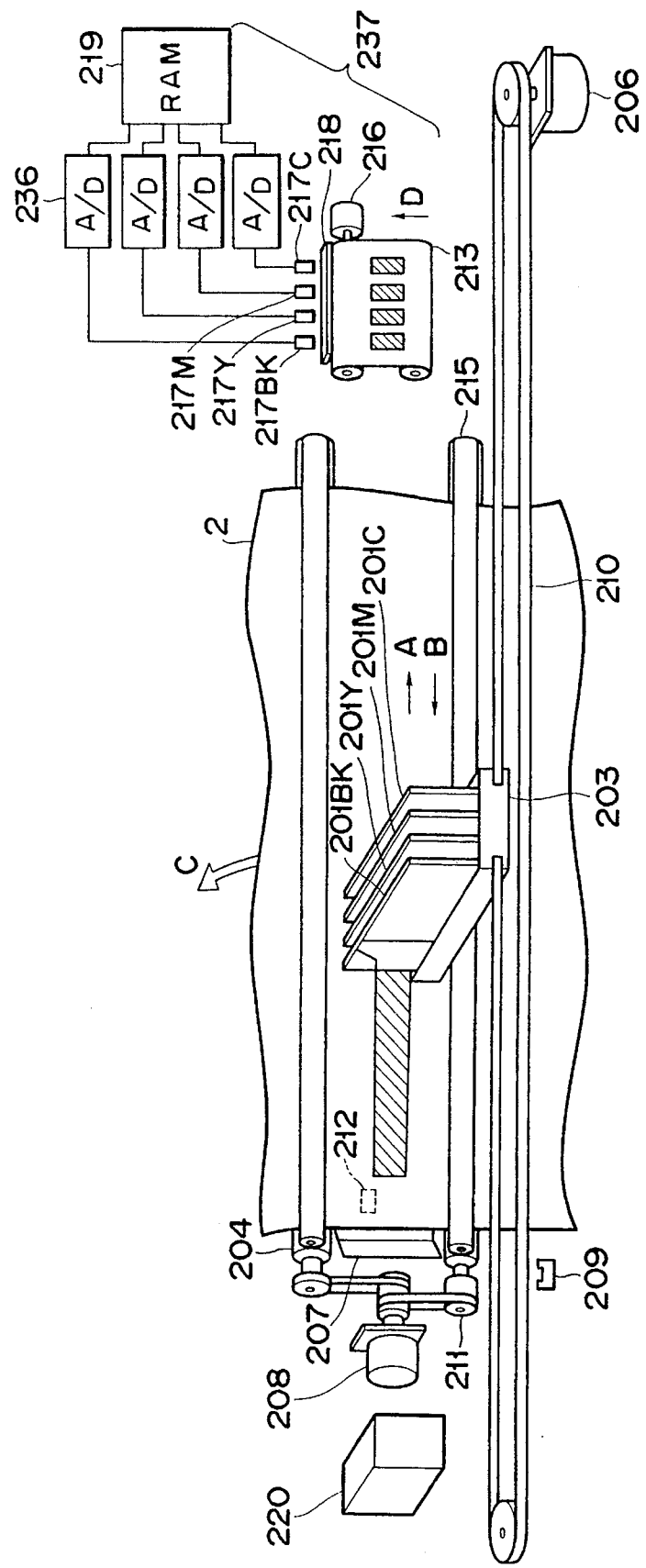

FIG. 35 illustrates the schematic structure of a sixth embodiment of the serial printer type apparatus. This structure is arranged in such a manner that an uneven image density correcting portion 237 is disposed outside the image recording region, the uneven image density correcting portion 237 being composed of a test pattern recording portion for recording the test pattern by the recording head and the test pattern reading portion.

Also according to this embodiment, the test patterns are recorded on test pattern recording sheet 213 in the test pattern recording portion by the recording heads before the state of the uneven image density of the test pattern is stabilized. Then, the test pattern recording sheet 213 is conveyed to the uneven image density reading portion.

Then, a seventh embodiment of the present invention will now be described. This embodiment is arranged in such a manner that the image of the original document is read and the printing image density level of the test image is determined in accordance with the result of reading of image of the original document. According to this embodiment, the unevenness correction data can be obtained from the test image formed in accordance with the original image. Therefore, an excellent image without unevenness can be obtained regardless of the type of the original document.

Figure 36:
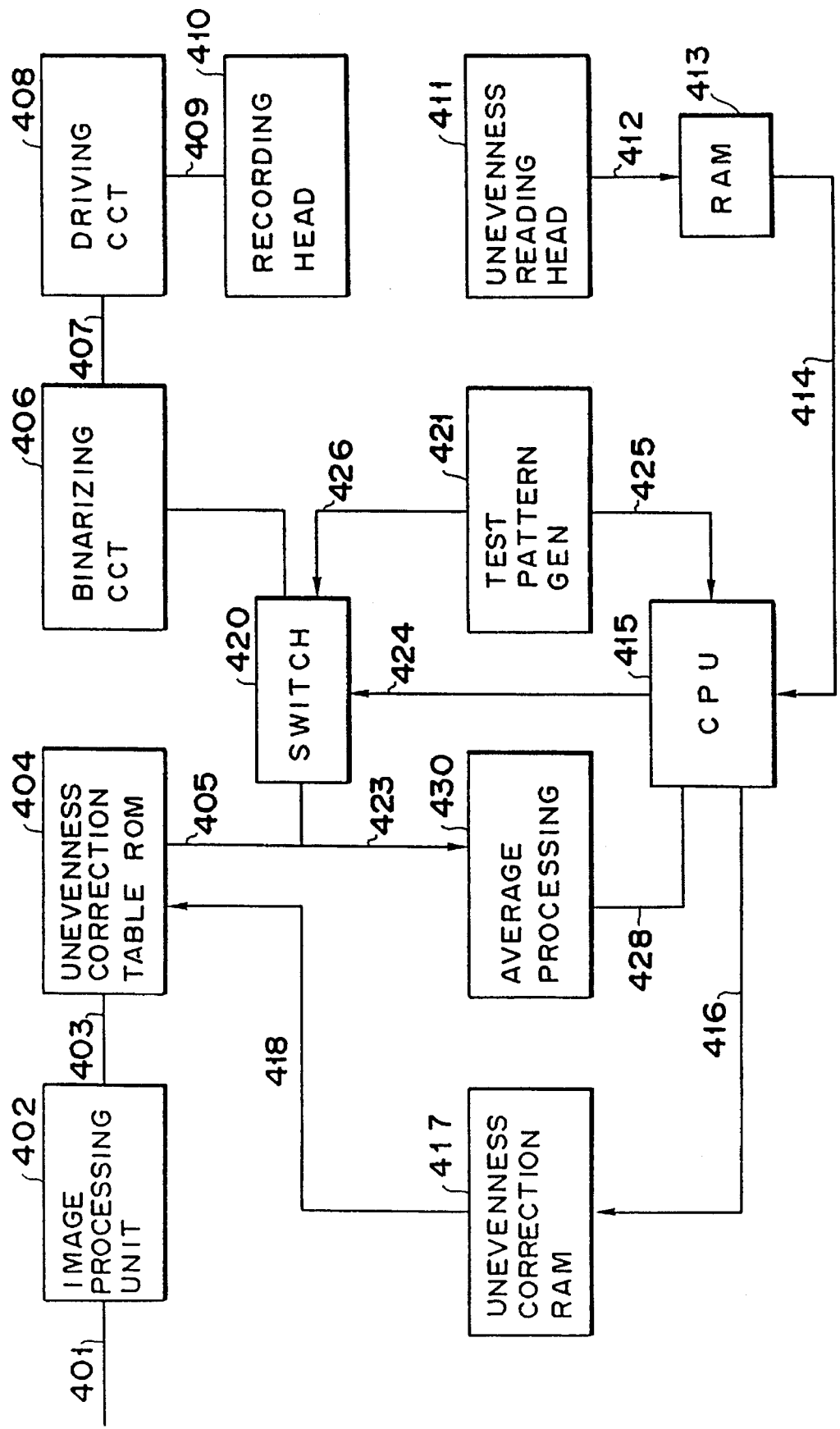
FIG. 36 is a block diagram which illustrates an image processing portion according to a seventh embodiment of the present invention.

Then, the image recording apparatus according to this embodiment will now be described. FIG. 36 is a block diagram which illustrates the image data processing portion according to this embodiment, FIG. 37 is a schematic perspective view which illustrates the image reading portion according to this embodiment and FIG. 38 is a schematic perspective view which illustrates the image forming portion according to this embodiment.

First, the image reading portion will be described with reference to FIG. 37.

Figure 37:
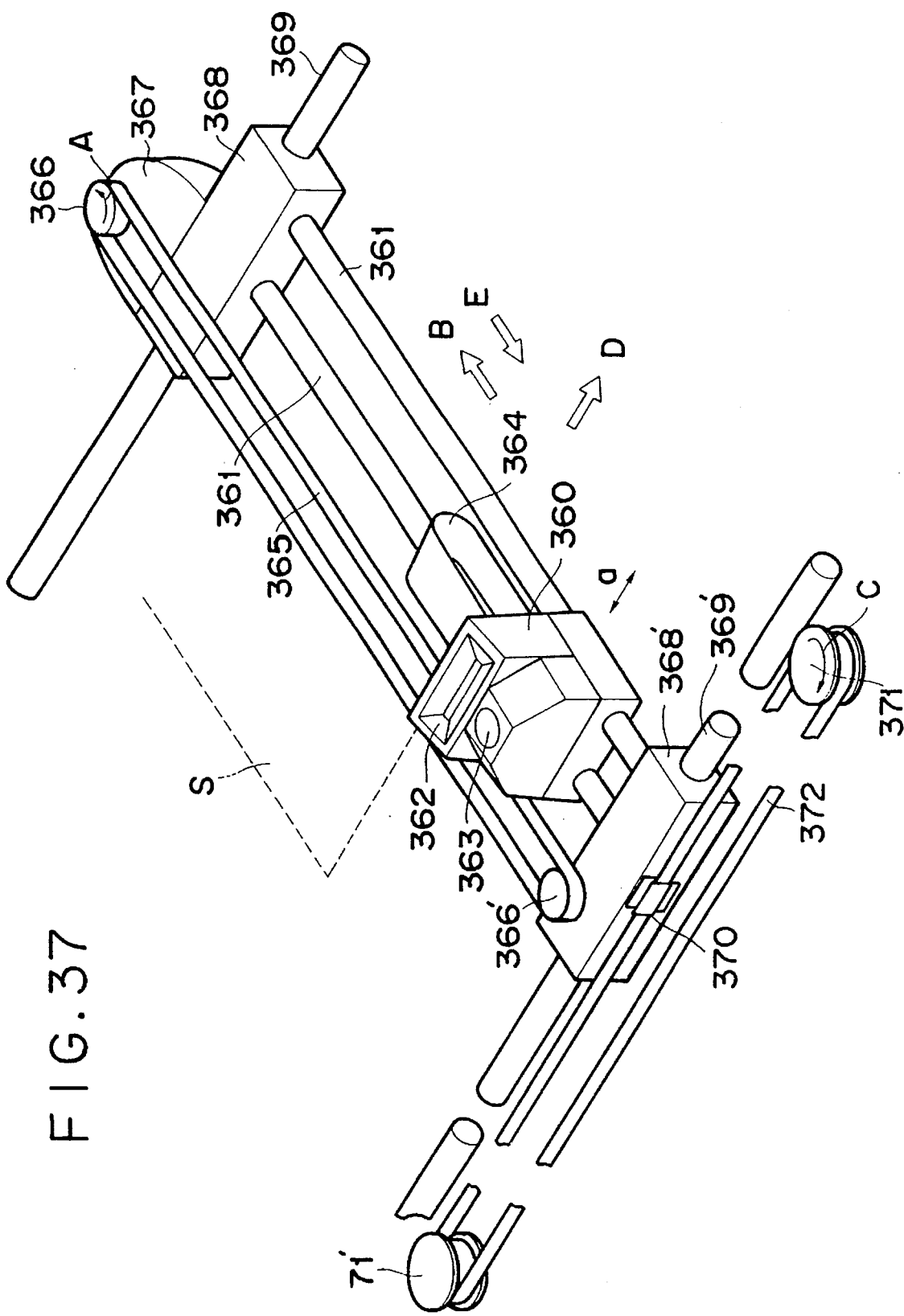
FIG. 37 is perspective view which illustrates an example of the structure of a reading unit and a scanning mechanism according to the seventh embodiment of the present invention.
Figure 38:
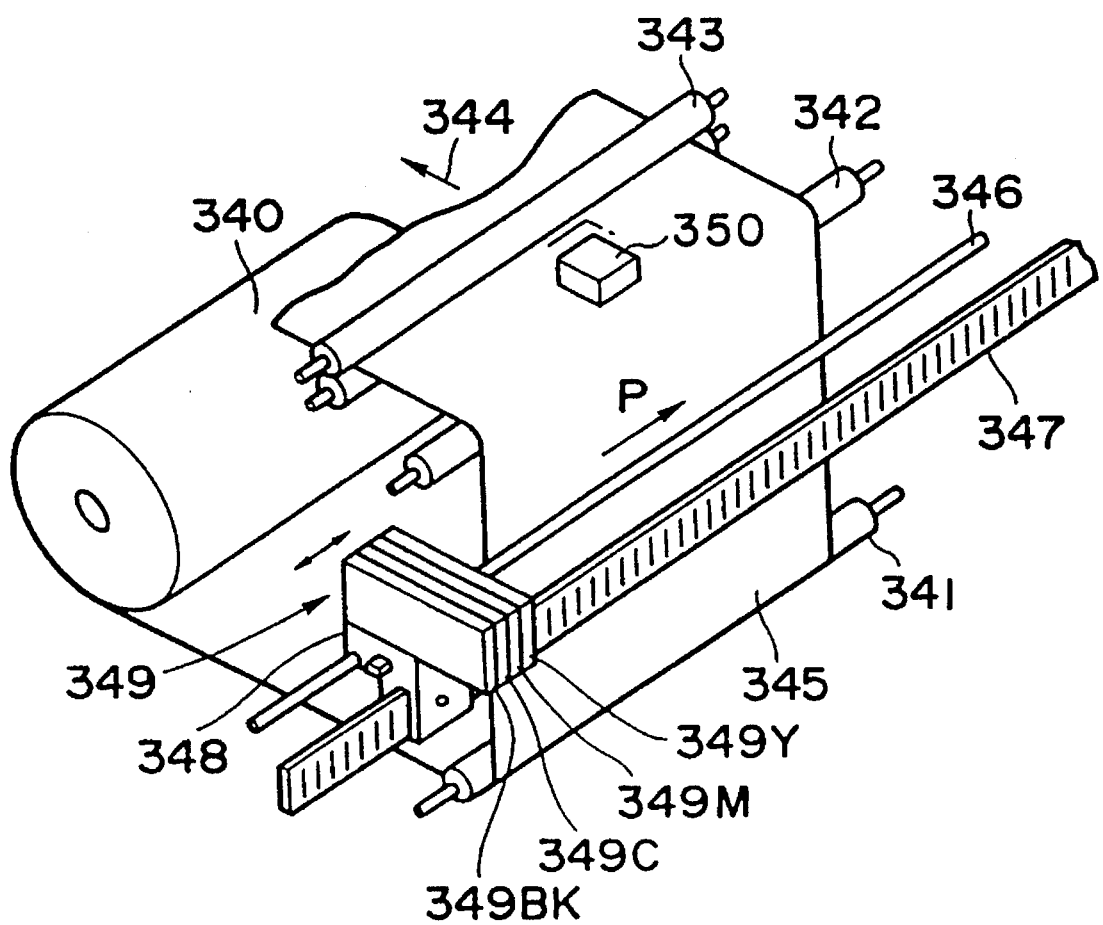
FIG. 38 is a perspective view which illustrates the schematic structure of a printer according to the seventh embodiment of the present invention.

Referring to FIG. 37, reference numeral 360 represents an original document reading head for reading an original document S by sliding on a pair of guide rails 361 and 361'. The original document S is placed on a transparent glass (omitted from illustration) disposed on the original document reading head 360 to face downwards. The original document reading head 360 comprises a light source 362 for irradiating the original document, a lens 363 for forming the image of the original document on a photoelectrical converting element group such as a CCD and the like. Reference numeral 364 represents a flexible lead wire bundle for supplying power to the light source 362 and the photoelectrical converting element and for transmitting an image signal from the photoelectrical converting element.

The reading head 360 is secured to a driving force transmitting portion 365 such as a wire for performing the main scanning operation (in directions B and E) in the main scanning direction is arranged between pulleys 366 and 366' so as to be moved when a main scanning pulse motor 367 is rotated. When the pulse motor 367 is rotated in direction A, the reading head 360 reads information about the line of the image of the original document S which is perpendicular to the main scanning direction B with the number of bits which correspond to the photoelectrical converting elements.

After the image has been read a predetermined width of the original document S, the main scanning pulse motor 367 is rotated in a reverse direction to the direction designated by the arrow A. As a result, the reading head 360 is moved in the direction E until it returns to the original position. Reference numerals 368 and 368' represent carriages which slide on the guide rails 369 and 369' in the direction of a sub-scanning (D) which is substantially perpendicular to the main scanning direction B. The carriage 368' is, by a securing member 370, secured to a driving power transmitting portion 372 in the direction of the sub-scanning (D) such as a wire arranged between the pulleys 371 and 371'.

When the main scanning operation B is performed, a sub-scanning driving power source (omitted from illustration) such as a pulse motor or a servo motor rotates the pulley 371 in a direction designated by an arrow C to move by a predetermined distance (the same distance d which is the same as the width of the image read when the main scanning B is performed). As a result, the carriages 368 and 368' are sub-scanned in a direction designated by an arrow D. At this time, the main scanning B is again started. As a result of the main scanning B, the return E in the main scanning direction and the sub-scanning D are repeated so that the overall area of the original document image is read.

The thus read out image signal is subject to a color correcting process such as a logarithmic conversion, a UCR process, a masking operation, a color balance adjustment process and the like before it is transmitted to an image forming portion.

Then, the image forming portion shown in FIG. 38 will now be described.

The image forming portion employs an on-demand type ink jet recording head.

Referring to FIG. 38, a recording material 340 in the form of a roll is held and rotated by a supplying roller 343 via conveying rollers 341 and 342 so as to be conveyed in a direction 344. Guide rails 346 and 347 are in parallel disposed transverse to the recording material 345 so that a recording head unit 349 mounted on the carriage 348 laterally scans.

Heads 349Y, 349M, 349C and 349BK of yellow, magenta, cyan and black are mounted on the carriage 348 and are provided with ink tanks of the four colors. Each of the heads is a multi-nozzle head having 256 nozzles. The recording material 345 is intermittently conveyed by a width of a printing motion of the recording head 349. When the recording material 345 is stopped, the recording head 349 performs the scanning operation in direction P so as to eject an ink droplet which corresponds to the image signal.

As described, the original document is subjected to the read color correction process before ink is ejected to correspond to the image signal. As a result, a color image is formed.

An uneven image density reading head 350 is disposed to confront the recording side of the recording material 345. The uneven image density reading head 350 is structured in the same manner as that shown in FIG. 4. After the test pattern has been printed by the recording head 349, the recording material 345 is conveyed in the direction 344 by the supplying roller 343. As a result, the test pattern passes through a portion below the uneven image density reading head 350. The uneven image density reading head 350 reads the uneven image density at the time of the above-described passing operation.

The recording head 349 is a so-called bubble jet type recording head which changes the status of ink such as the film boiling by thermal energy so as to eject ink to the recording material through the orifice by utilizing bubbles generated. The recording head 349 has orifices each having heating resistors (heaters) the size of which is significantly reduced in comparison to the piezoelectric element employed in the conventional ink jet recording apparatus. Therefore, the orifices can be densely mounted in a multiplex manner, causing recorded image of an excellent quality to be obtained while maintaining a high speed and reducing noise.

Next, the image data processing portion for correcting the uneven image density of each of the recording heads of the above-described image forming portion will now be described with reference to the block diagram shown in FIG. 36.

In order to simplify the description, a process for one head will be described below. In order to obtain a full color image, the four color heads must be subjected to the same process.

Referring to FIG. 36, reference numeral 401 represents image data read by the image reading portion shown in FIG. 37. Reference numeral 402 represents an image processing portion for performing a logarithmic converting process, a masking process, a UCR process, a color balance adjusting process and the like. Reference numeral 403 represents an image signal in a state after the image has been processed and 404 represents a ROM in which an unevenness correction table is stored. Reference numeral 405 represents an image signal in a state where the unevenness has been corrected, 406 represents a binary circuit and 407 represents an image signal after the binarizing process. Reference numeral 408 represents a head driving circuit, 409 represents a head driving signal and 410 represents a recording head of a multi-nozzle type which corresponds to any one of 349Y, 349M, 349C and 349BK shown in FIG. 38. Reference numeral 411 represents an uneven image density reading head which corresponds to 350 shown in FIG. 38. Reference numeral 412 represents an unevenness reading signal, 413 represents a RAM, 415 represents a CPU, 416 and 418 represent unevenness correction signals and 417 represents an unevenness correcting RAM.

The image signal 403 which has been processed is, by the unevenness correcting table ROM 404, converted so as to correct the unevenness of the recording head. As shown in FIG. 15, the unevenness correcting table ROM 404 has 61 correction straight lines the inclinations of which are varied from Y=0.70× to Y=1.30× in units of 0.01 assuming that the input image signal is X and the output image signal is Y. The unevenness correcting table ROM 404 switches over the correction straight line in response to the unevenness correcting signal 418. For example, when a signal of a pixel to be printed by a nozzle having a large dot diameter is supplied, a correcting straight line having small inclination is selected. When a nozzle having a small dot diameter is used, a correcting straight line having a large inclination is selected so that the image signal is corrected.

The unevenness correcting RAM 417 stores the selection signal of the correcting straight lines which are required to correct the unevenness of each of the nozzles. That is, it stores the unevenness correction signals having 61 values from 0 to 60 for 256 nozzles so as to transmit the unevenness correction signal 418 in synchronization with the supplied image signal.

The image signal 405 which has been corrected by the selected straight line is binarized by the binary circuit 406 which acts in accordance with a dither method or an error dispersion method. Then, it is supplied to a head driving circuit 408. The head driving circuit 408 transmits a driving pulse which is suitable for the head in response to the binary signal so that an image is recorded by the recording head 410.

As a result, the dot ejected from the nozzle of the recording head for a thick density lowers the printing duty, while the dot ejected from the nozzle of the same for a thin density raises the printing duty. As a result, the uneven image density of the recording head is corrected so that an even image is obtained.

If the uneven image density pattern of the recording head has been changed in accordance with the use of the apparatus, the unevenness correction signal becomes unsuitable, causing uneven image density to be generated on the image. In this case, the uneven image density data is reloaded in the unevenness correction signal reloading mode.

In the unevenness correction signal reloading mode, the following operation is performed.

First, an original document to be copied is placed on a document frame so that the image of the central region of the original document is read out.

The above-described reading operation may be performed while placing the central portion of the original document deviated from the position of the original document reading head 360, or the original document reading head 360 may be moved to the central portion of the original document. It is preferable that the region to be read be the portion in which an excessive unevenness will be generated and which must be corrected particularly if it is not the central portion of the original document.

A reading signal 423 is averaged in an averaging portion 430 so that an averaged value 428 is supplied to a CPU 415.

Then, the CPU 415 transmits a control signal 425 which corresponds to the supplied value to a test pattern generating circuit 421.

Then, the test pattern generating circuit 421 generates a test pattern signal 426 denoting the image density level which corresponds to the control signal 425. For example, in a case where the signal 428 supplied to the CPU 415 is a signal denoting a value which corresponds to a printing duty of 35%, the test pattern generating circuit 421 also generates a signal denoting a value which corresponds to 35%.

A switch 420 switches over a normal image signal 405 and the test pattern signal 426 and performs the switching operation in response to a selection signal 424 supplied from the CPU 415. In a normal copying mode, the image signal 405 is selected, while the test pattern signal 426 is selected in an unevenness correction data reloading mode. The test pattern signal 426 is printed by a recording head 410 via a binary circuit 406 and a driving circuit 408.

The test pattern recorded by the recording head 410 passes through a portion below the uneven image density reading head 411. During this passage motion, 256 signals are sampled from the signal denoting the read uneven image density, the sampled signal being used as data which corresponds to the nozzles.

Assuming that the data are R1, R2, ... , R256, they are temporarily stored in the RAM 413 before calculated as follows:

$$Cn = -\log \frac{R_n}{R_0}$$

where R0 is a constant holding a relationship R0≧Rn
As a result, they are converted into a density signal Cn.
Then, the average density is obtained as follows:

$$\overline{C} = \sum_{n=1}^{256} Cn/256$$

Then, the degree of deviation of the density which corresponds to each of the nozzles from the average density is calculated as follows:

$$\Delta Cn = \overline{C}/Cn$$

Then, the signal correction quantity ΔSn which corresponds to ΔCn is obtained as follows:

$$\Delta Sn = K \times \Delta Cn$$

where K is a coefficient determined by the gradation characteristics of the head. For example, if the gradation characteristics display linear characteristics, it is necessary to make K=1. In the other cases, it is preferable that the value of K is set in a range from about 0.6 to 1.4 in terms of reducing the number of repetition of the operation.

Then, a selection signal of a correction straight line to be selected in accordance with ΔSnis obtained so that the unevenness correction signal having 61 values from 0 to 60 are stored in the unevenness correction RAM 417 by a quantity which corresponds to the 256 nozzles.

For example, when ΔSn=1.1, $$Cn = \frac{\overline{C}}{1.1}$$

and the density of the nozzle is 1/1.1 with respect to the average density, an unevenness correction signal which causes the correction straight line having the inclination of 1.1 to be selected is stored in the RAM 417. That is, the correction data which causes a correction straight line having the same inclination as ΔSnis employed for each nozzle.

The thus processed unevenness correction data is used to select a γ straight line for each nozzle so that the uneven image density is corrected.

As described above, a test pattern of the same density as that of the original document to be copied is printed and the unevenness of the patten is corrected. Therefore, an actual copy exhibiting an excellent quality while substantially preventing unevenness can be obtained.

According to this embodiment, the unevenness correction data is obtained to correspond to one region in the original document. The present invention is not limited to this.

That is, the present invention can be adapted to a case where there are two or more places which must be subjected to the unevenness correction. For example, the present invention can be applied to a case where the original document includes a blue sea picture portion having a high density and a cloudy sky picture portion having low density and the two types of unevenness are desired to be corrected.

Therefore, the signal correction quantity ΔSn1 of a region 1 of the original document of is obtained similarly to the above-described embodiment. Then, the signal correction quantity ΔSn2 of a region 2 is obtained in a similar manner.

Then, they are averaged so that the final quantity of correction ΔSn is obtained as follows:

$$\Delta Sn = (\Delta Sn2 + \Delta Sn2)/2$$

The γ straight line for each nozzle is selected in accordance with the thus processed unevenness correction data so that the uneven image density is corrected.

If there are a plurality of regions to be subjected to the unevenness correcting process and they have different densities, the most suitable unevenness correction data items are averaged to be used. Therefore, the all of subject regions can be subjected to an average and satisfactory uneven image density operation.

Then, another embodiment of the present invention will now be described with reference to FIG. 10. Although the above-described embodiments are effective in a case where an original document including a region which is desired to be subjected to a precise uneven image density correction is copied, there are a multiplicity of original documents which are desired to be subjected to an average unevenness correction process of all of the density levels. In this case, it takes a complicated labor to read the original document every time to determine the printing duty of the test pattern. This embodiment is arranged to eliminate the above-described complicated task in such a manner that a test pattern of a predetermined printing duty is printed so as to reload the uneven image density data.

Figure 39:
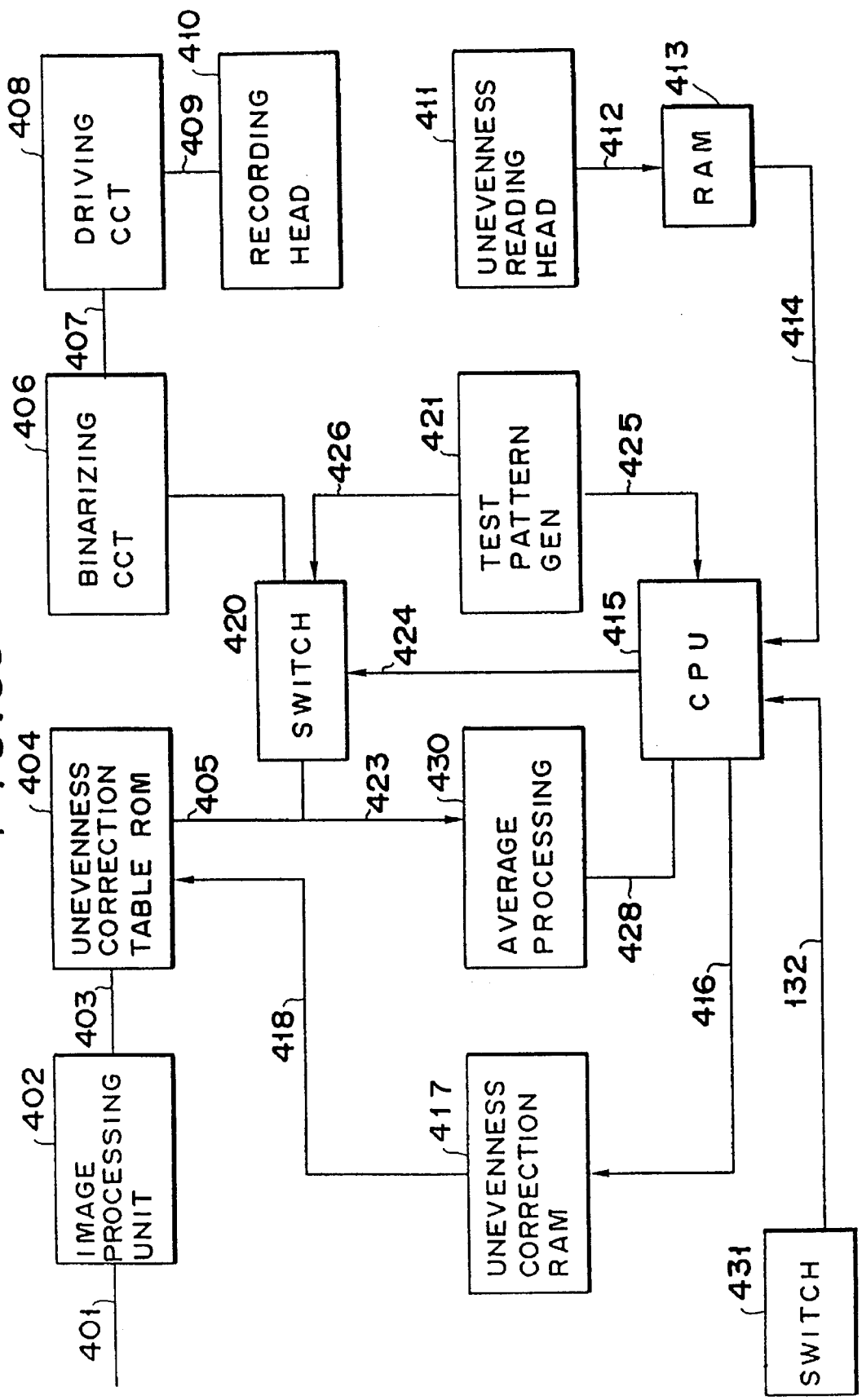
FIG. 39 is a block diagram which illustrates a modification to the image processing portion shown in FIG. 36.

FIG. 39 is a block diagram which illustrates the embodiment of this arrangement, where the elements having the functions which correspond to those shown in FIG. 36 are given the same reference numerals.

Referring to FIG. 39, reference numeral 431 represents a second switch by which it is selected that the printing duty of the test pattern in the unevenness correction data reloading mode is determined in accordance with the result of reading of the original document or a predetermined printing duty is used.

In particularly, in a case where there is a region which is desired to be subjected to a precise unevenness correcting process, a user operates the switch 431 to perform the operation which is similar to the above-described embodiment.

In the other cases, the CPU 415 transmits a control signal which corresponds to 50% printing duty to the test pattern generating circuit 421 so that the test pattern generating circuit 421 transmits a test pattern of a printing duty of 50%. As a result, the unevenness correction data of the test pattern of the printing duty of 50% is reloaded. The printing duty of 50% is determined so as to obtain an average unevenness correction effect for all of the image density levels. The present invention is not limited to the above-described printing duty and a value obtained experimentarily may be used in consideration of the density or the like of the original document.

As described above, according to this embodiment, a test pattern of a predetermined printing duty is used in a normal unevenness correction data reloading mode. Furthermore, in a special case, the printing duty of the test pattern is determined by reading the original document. Therefore, the time necessary to take to reload the unevenness correction data can be shortened.

According to the above-described embodiments, the recording head of a semi-multihead is used to be serial-scanned to record the image. The present invention can be applied to also a structure for recording an image by using a full-multihead.

Furthermore, the present invention is not limited to the ink jet recording head. It can be applied to a multi-head such as a thermal transfer thermal head. The present invention can be applied to a structure in which a multihead has a plurality of recording elements.

According to the above-described embodiments, the number of dots are corrected as the method of correcting the uneven image density. However, the diameter of the dot may be corrected by modulating the voltage of the driving pulse of the head or the pulse width.

According to the above-described embodiments, the image recording apparatus comprising the image reading portion and the image forming portion is described. The present invention can also be applied to a printer for transmitting an image by receiving an image signal supplied from a computer or the like.

According to the above-described embodiments, the exclusive head for reading the uneven image density is provided for reading the test pattern. However, it may be arranged to also act as a head for reading the original document.

As described above, the unevenness correction data can be obtained from the test pattern image which corresponds to the original image. Therefore, an excellent quality image can be obtained from any type of original documents while preventing the generation of the unevenness.

However, the following problems will be arisen although the unevenness correction data can be reloaded at any time as described above.

Figure 40:
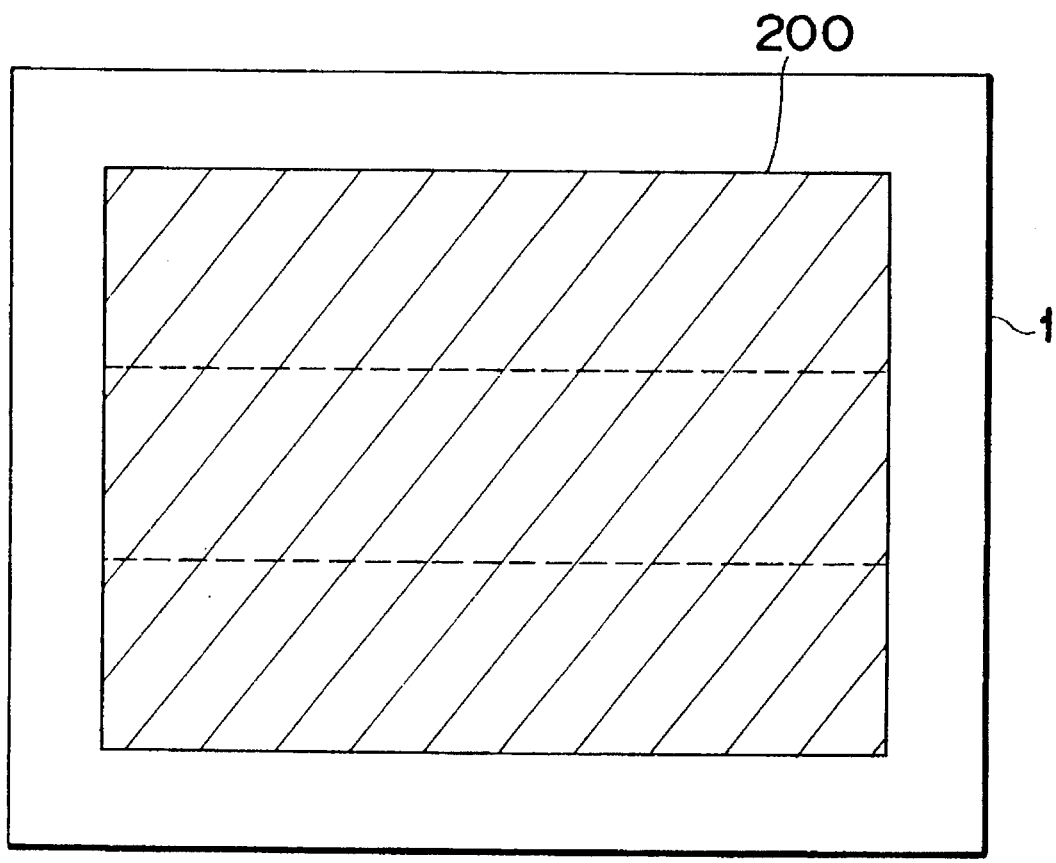
FIG. 40 illustrates a test pattern.

In an ink jet recording process, ink is absorbed while being expanded (running) laterally when ink is absorbed by the paper sheet. Therefore, when a test pattern shown in FIG. 40 is recorded, the recording width of the first line becomes larger, by a certain width, than the width of the 256 nozzles. Therefore, the sub-scanning quantity of the sheet is arranged to be larger than the width of the 256 nozzles by a certain degree so as to cover the joints of the lines.

However, the quantity of the expansion of the recording width varies depending upon the quantity of ink recorded. Therefore, the quantity of the expansion is enlarged when a large quantity of ink is recorded, while the same is reduced when the quantity of it is small.

The test pattern for processing the unevenness correction data is not limited to the 50% printing duty. It is preferable that the printing duty be set to about 80% for processing the unevenness correction data suitable for a dark original image and about 30% for processing that suitable for a light tone original document. The reason for this lies in that the gradation characteristics of the head are not necessarily linear characteristics. Therefore, if a correction is completed for a certain density level, a certain quantity of unevenness will be left at the other density level. Therefore, it is necessary to change the printing duty of the test pattern to meet the requirement of a user.

Then, an eighth embodiment of the present invention will be described, wherein the quantity of scanning in the sub-scanned direction is determined in accordance with the type of the test signal, that of the recording material or the quantity of the material to be recorded on the recording material. As a result, the joints in the test image can be made uniform so that the unevenness correction data can be accurately generated.

Therefore, even images can be obtained while preventing the joints even if the printing duty of the test image or the recording material is changed.

Then, the eighth embodiment will be described with reference to the drawings.

Figure 41:
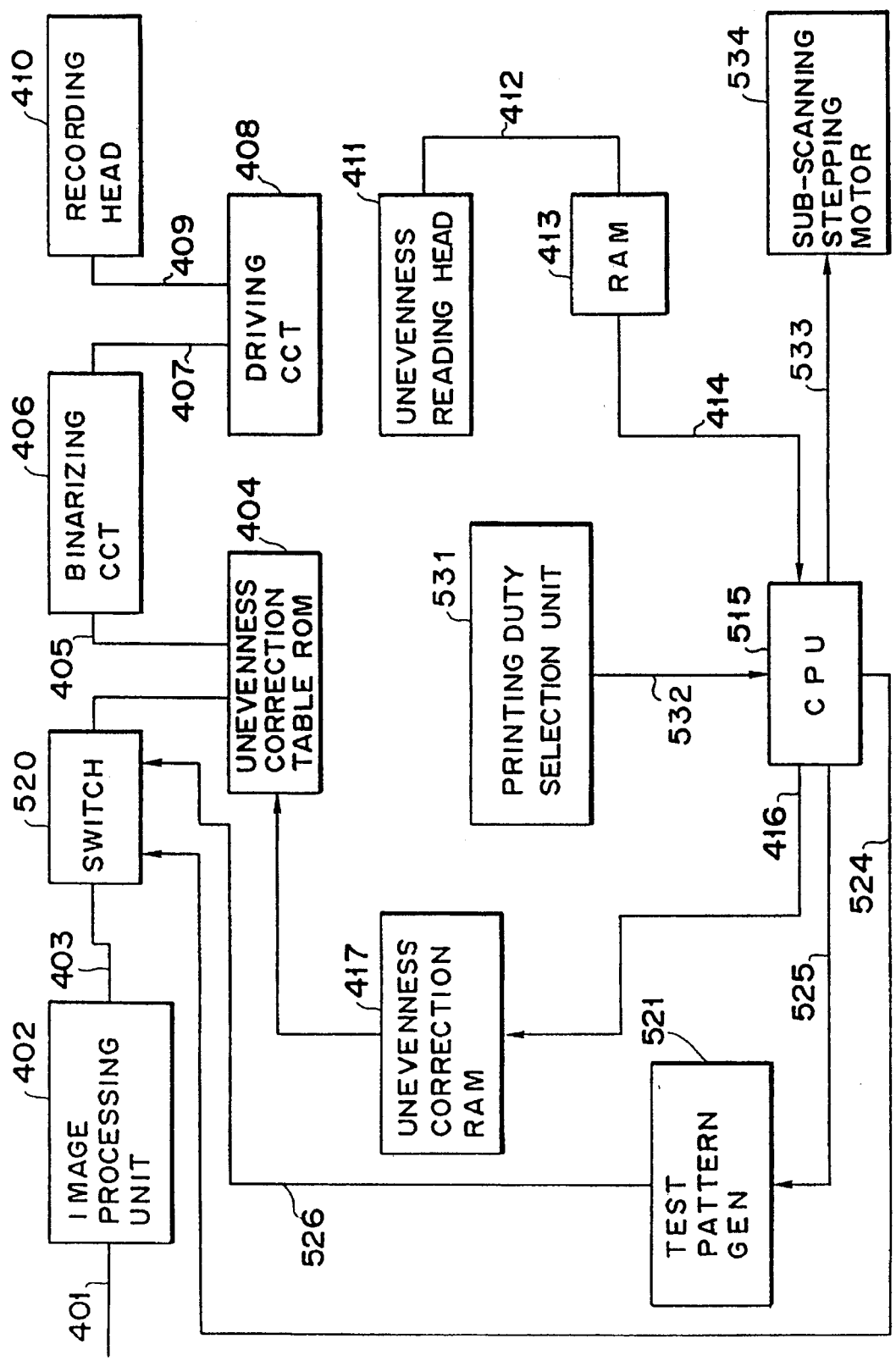
FIG. 41 is a block diagram which illustrates an image processing portion according to an eighth embodiment of the present invent ion.

FIG. 41 is a block diagram which illustrates an eighth embodiment of the present invention. Referring to FIG. 41, the elements having the same functions as those shown in FIG. 36 are given the same reference numerals and their descriptions are omitted here.

Referring to FIG. 41, reference numeral 521 represents a test pattern generating circuit for generating a test pattern signal 526 of a density level which corresponds to a control signal 525 supplied from the CPU 515. Reference numeral 520 represents a switch for selecting a normal image signal 403 or a test pattern signal 526 in response to a selection signal 524 supplied from the CPU 515. Reference numeral 531 represents a printing duty selection portion for selecting the printing duty of the test pattern. Reference numeral 532 represents a printing duty selection signal, 534 represents a sub-scanning pulse motor and 533 represents a driving signal for driving the sub-scanning pulse motor 534.

In the above-described structure, the printing duty of the test pattern is selected by the printing duty selection means 531 in an unevenness correction data reloading mode. In a case where the unevenness in a high density portion is desired to be particularly corrected, the printing duty is made to be about 80%, while it is made to be about 30 % when the low density portion is corrected particularly. The CPU 515 receives the selection signal supplied from the printing duty selecting portion 531 so as to transmit the control signal which corresponds to the selection signal 525 to the test pattern generating circuit 521. The test pattern generating circuit 521 generates the test pattern signal 526 of the printing duty which corresponds to the above-described control signal. The switch 520 selects the image signal 403 in a normal copying mode, while the same selects the test pattern signal 526 in an unevenness correction data reloading mode.

The CPU 515 also drives the sub-scanning pulse motor 534 by the driving signal 533 of the number of pulses which corresponds to the printing duty selection signal 532 so as to perform the sub-scanning operation of the test pattern. If the printing duty is high in this time, the quantity of the feeding in the sub-scanning direction is enlarged in order to prevent the appearance of the joints due to running of ink. On the other hand, if the printing duty is low, it is reduced. As a result of experiments, an excellent effect was obtained in a structure in which a recording head of 400 dpi and 256 nozzles was used when the quantity of feeding was made different by about 15 to 20 µm between the printing duty of 30% and that of 80%.

As described above, when the test pattern obtained with the quantity of sub-scanning feeding motion which corresponds to the printing duty is used, accurate unevenness correction data can be processed. Therefore, an image of an excellent quality without the apparent joints can be obtained at the actual copying operation.

Next, another embodiment of the present invention will now be described. This embodiment is arranged to overcome an undesirable change in the quantity of ink running.

Figure 42:
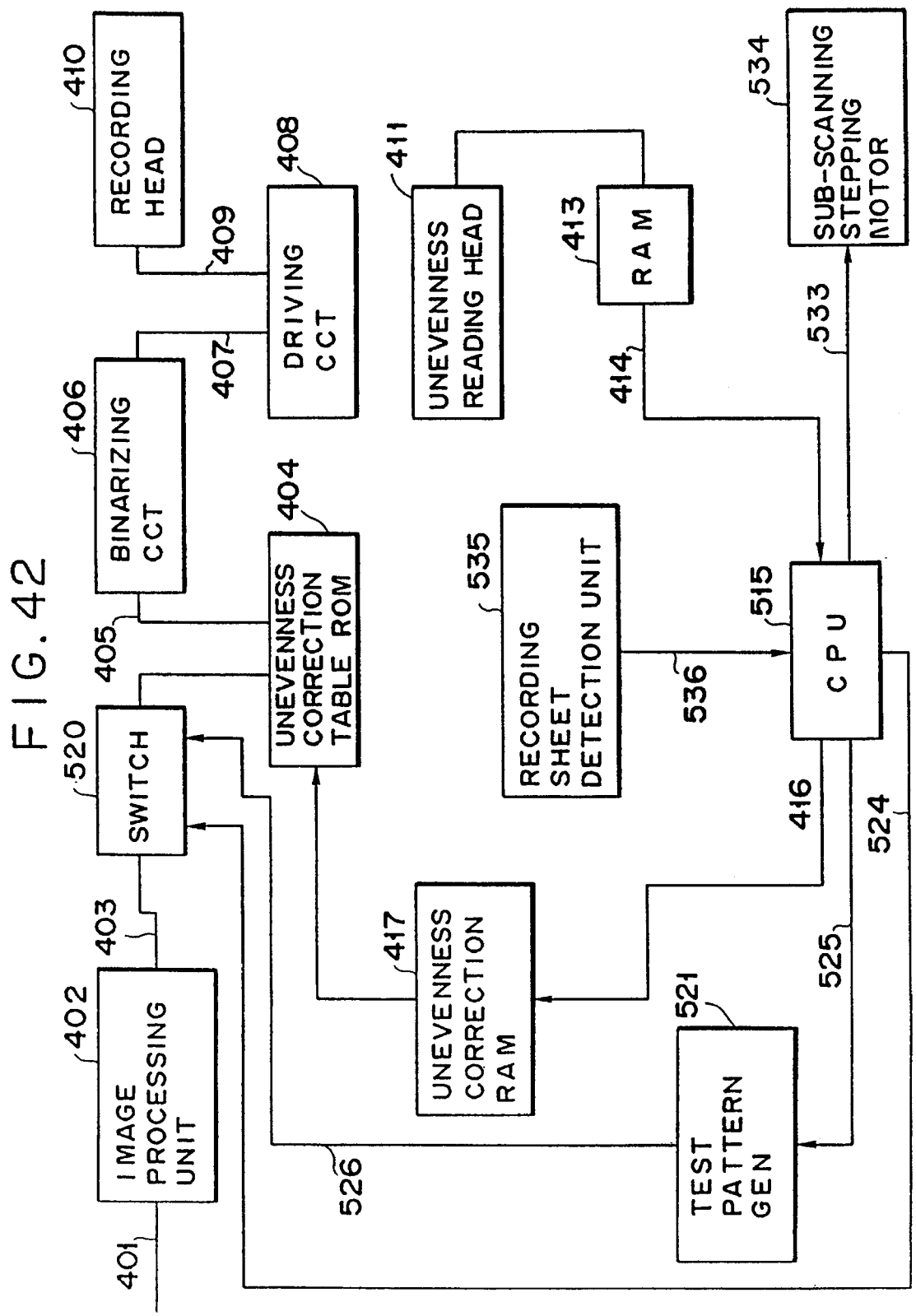
FIGS. 42 and 43 are block diagrams which illustrate a modification to the image processing portion shown in FIG. 41.

FIG. 42 is a block diagram which illustrates this embodiment, where the elements having the same functions as those shown in FIG. 41 are given the same reference numerals and their descriptions are omitted here. Referring to FIG. 42, reference numeral 535 represents a recording paper sheet detecting portion and 536 represents a recording paper sheet signal.

The recording paper sheet detecting portion 535 detects the type of recording paper sheet which is being used in such a manner that a known optical detecting means or the like is used. However, it may be a system selected by a user.

The CPU 515 changes the sub-scanning quantity at the time of printing the test pattern in accordance with the type of the recording paper sheet.

For example, since the quantity of ink running is large in a case where an OHP paper is used, the sub-scanning quantity is enlarged. In another case in which an ink absorbing layer is formed on a transparent substrate so as to absorb ink and the image is observed from the transparent substrate side, the sub-scanning quantity is enlarged due to the same reason.

As a result, unevenness correction data with which an image of an excellent quality can be obtained without joints can be processed even if the recording material is changed.

Next, another embodiment of the present invention will now be described. This embodiment is arranged in such a manner that the sub-scanning quantity is changed in consideration of both the printing duty of the test pattern and the type of the recording material.

Figure 43:
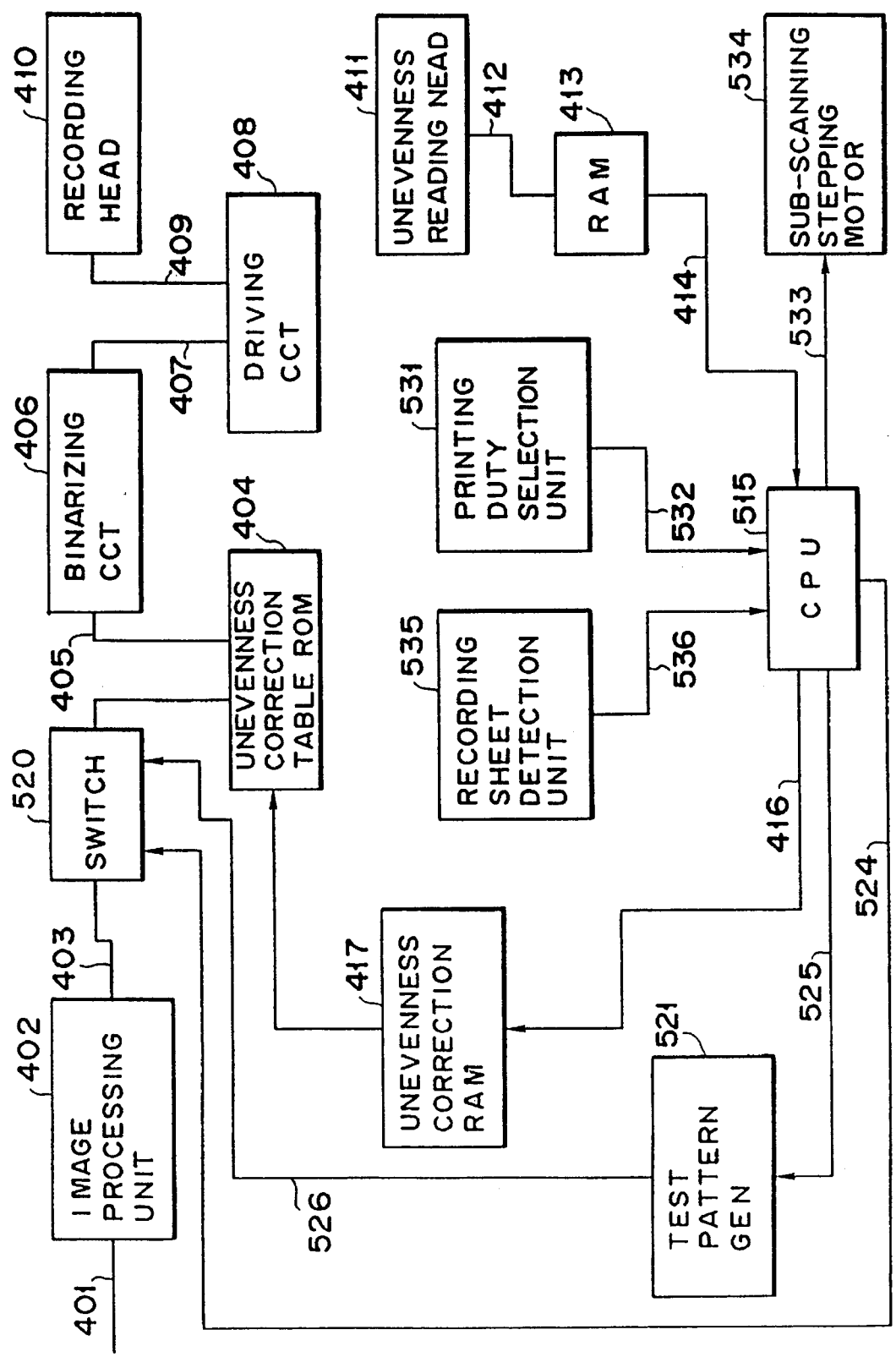
Figure 44A:
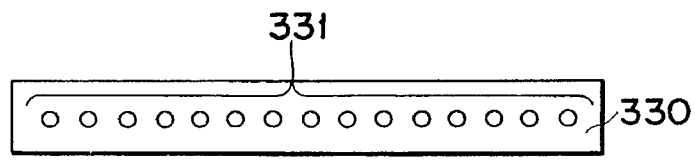
Figure 44B:
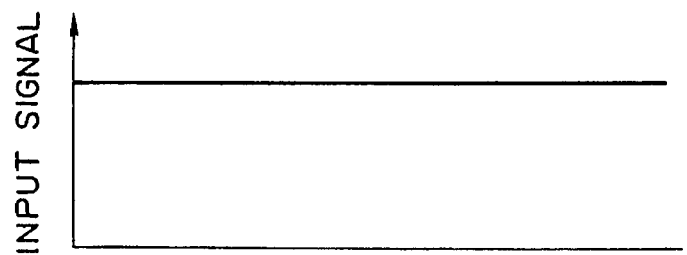
Figure 44C:
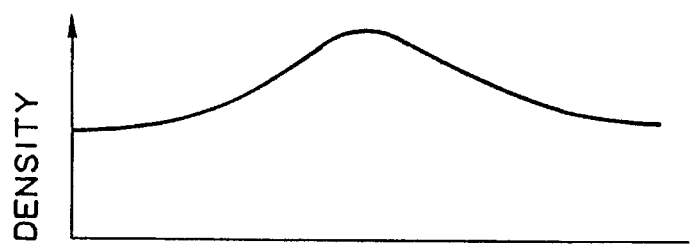
Figure 44D:
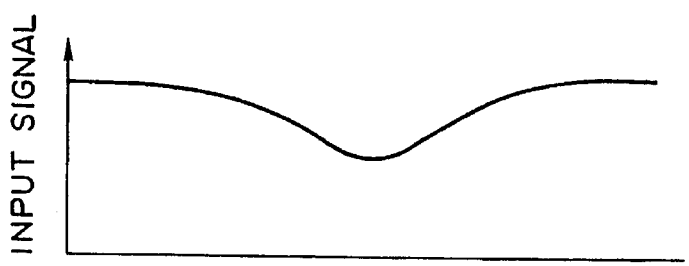
Figure 44E:
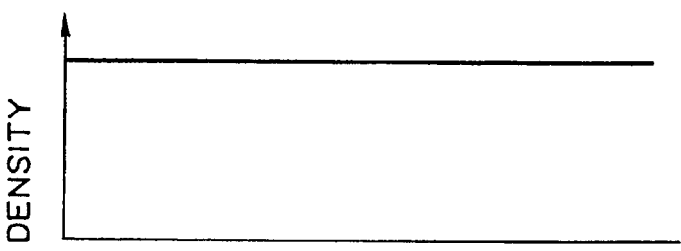

FIG. 43 is a block diagram which illustrates this embodiment, where the elements having the functions as those shown in FIG. 41 are given the same reference numerals and their descriptions are omitted here. Referring to FIG. 43, the CPU 515 stores the relationship between the printing duty and the most suitable quantity of sub-scanning for each of the types of the recording material. The CPU 515 rotates the sub-scanning pulse motor 534 at the most suitable number of the sub-scanning pulses determined in consideration of both the recording material and the printing duty.

According to this embodiment, since the sub-scanning quantity is determined in consideration of both the recording material and the printing duty, more accurate unevenness correction data can be processed than the above-described embodiments.

The present invention is not limited to the ink jet recording method but it can be applied to a fusion type or a sublimation type thermal transfer recording apparatus. The present invention can also be applied to recording methods in which a multi-head having a plurality of recording elements is used.

As a method of correcting the uneven image density, the number of dots is corrected according to the above-described embodiments. However, the diameter of the dot may be corrected by modulating the voltage of the driving pulse of the head or the pulse width.

According to the above-described embodiments, the image recording apparatus comprising the image reading portion and the image forming portion is described. The present invention can also be applied to a printer having no image reading portion and acts to transmits an image by receiving an image signal supplied from a computer or the like.

According to the above-described embodiments, an exclusive head for reading the uneven image density is provided for reading the test pattern. However, it may be arranged to also act as a head for reading the original document.

As described above, accurate unevenness correction data can be generated without joints even if the duty of the test image or the recording material is changed. Therefore, a uniform image can be obtained while preventing generation of remarkable joints.

(13) Others

The present invention can be applied to image forming apparatuses (for example, a thermal printer) of various recording methods which will encounter a problem of uneven image density. An excellent effect can be obtained when it is applied to a bubble jet method suggested by Canon Inc. in a case where it is applied to the ink jet recording method. According to thus arranged structure, since recording can be densely and accurately performed, the generation of the uneven image density can be further effectively prevented.

A typical structure and principle are, for example, disclosed in U.S. Pat. Nos. 4,723,129 or 4,740,796. The above-described systems can be applied to both a so-called on-demand type or a continuous type. In a case of the on-demand type, at least a driving signal, which corresponds to recording information and which rapidly raises the temperature by a degree exceeding nuclear boiling, is applied to an electrothermal conversion body disposed to correspond to a sheet or a liquid passage in which liquid (ink) is held. As a result, the electrothermal conversion body generates thermal energy which causes the heat acting surface of the recording head to be boiled. As a result, bubbles can be formed in liquid (ink) which corresponds to the number of the driving signals, causing a satisfactory effect to be obtained. The enlargement and contraction of the air bubbles causes liquid (ink) to be ejected through an ejecting opening. As a result, at least one droplet is formed. If the driving signal is arranged to be a pulse type signal, the air can be quickly and properly enlarged and contracted. Therefore, liquid (ink) can be ejected while revealing excellent responsibility, causing a significant effect to be obtained. It is preferable that the pulse type driving signal be of a type disclosed in U.S. Pat. Nos. 4,463,359 and 4,345,262. If conditions disclosed in the specification of U.S. Pat. No. 4,313,124 relating the rate of the temperature rise on the heat acting surface are employed, further excellent recording can be performed.

The present invention includes in the scope thereof the structure disclosed as described above and arranged in such a manner that the orifice, the liquid passage and the electrothermal conversion body are combined with each other (a straight liquid passage or a perpendicular liquid passage). Furthermore, a structure arranged in such a manner that the heat acting portion is disposed in a bent region and disclosed in U.S. Pat. Nos. 4,558,333 and 4,459,600 is also included in the scope of the present invention. Furthermore, the present invention is effective when the structure is arranged in accordance with Japanese Patent Appln. Laid-Open No. 59-123670 in which a plurality of electrothermal conversion bodies are arranged in such a manner that a common slit is arranged to be an orifice of an electrothermal conversion bodies. Also an effect can be obtained when the present invention is adapted to a structure disclosed in Japanese Patent Appln. Laid-Open No. 59-138461 and arranged in such a manner that the opening for absorbing pressure wave of thermal energy is made to confront the orifice portion. That is, recording can be effectively performed according to the present invention regardless of the arrangement of the recording head.

Furthermore, a structure may be employed which is arranged in such a manner that a plurality of recording heads are combined in a recorded head of a full line type (full multi-type) having a length which corresponds to the maximum width of the recording medium which can be subjected to recording by the recording apparatus, the recording heads being combined for the purpose of corresponding to the above-described length. In addition, a structure may be employed which is arranged in such a manner that they are integrally formed to be one recording head.

In addition, the present invention is effective in a case where a recording head secured to the apparatus body is used or an interchangeable chip type recording head is mounted on the apparatus body whereby it can be electrically connected or ink supply from the apparatus body is enabled. Furthermore, an effect can also be obtained in a case where the present invention is adapted to a cartridge type recording head arranged in such a manner that an ink tank is integrally provided for the recording head.

It is preferable that the structure of the recording apparatus according to the present invention be arranged in such a manner that a recovery means and an auxiliary means for a recording head be provided since the effect of the present invention can further be stabilized. Specifically, it is effective to employ a capping means, a cleaning means, a pressure applying or sucking means, an electrothermal conversion body or another heating element or an auxiliary heating means constituted by combining them, and to perform an auxiliary ejection mode for ejecting ink independently from the recording operation.

The type and the number of heads recording to be mounted may be arranged to be a plural number which corresponds to a plurality of ink types of different colors and densities in addition to the structure arranged in such a manner that one recording head is provided to correspond to mono-color ink. That is, the present invention is extremely effective not only in a case where it is adapted to a recording mode of the recording apparatus arranged to record a main color, for example, black, but also it is adapted to a case where the recording heads are integrally constituted and a case where a plurality of recording heads are combined. That is, the present invention is extremely effective when it is adapted to an apparatus of a plurality of colors or an apparatus of a full color structure realized by mixing colors.

Furthermore, the above-described embodiments employ ink in the form of liquid. However, ink which is usually solidified at room temperature or lower is used or the temperature of ink is, in an ink jet recording system, controlled in a range of 30° C. and 70° C. so as to adjust the viscosity of ink to be in a stable ejection range. Therefore, the ink must be liquidified when the recording signal is supplied. Furthermore, the present invention can be applied to a case where temperature rise due to thermal energy is prevented by utilizing it as energy of status change from the solid state of ink and the liquid state of the same. In addition, the present invention can be applied to a case where ink which is solidified when it is allowed to stand for the purpose of preventing evaporation of ink. That is, the present invention can be applied to a case where ink which is liquidified by thermal energy is used, the ink being of a type which is liquidified when thermal energy is supplied in response to a recording signal whereby ink is ejected in the form of liquid or a type which is solidified when it reaches the recording medium. Ink in the above-described case may be arranged to be in a position to confront an electrothermal conversion body while being held in a recessed portion of a porous sheet or a through hole in the form of liquid or a solid as disclosed in Japanese Patent Appln. Laid-Open Nos. 54-56847 or 60-71260. The present invention is most suitable when it is adapted to the above-described film boiling method.

Furthermore, the image forming apparatus may be arranged to be used as an image output terminal equipment of an information processing apparatus such as a computer, a copying machine arranged to be combined with a reader, and a facsimile machine having a signal transmitting/receiving function. In particular, a copying machine or a facsimile device having an image reading means (reader) as an original document reading system may employ it as well as a reading means for reading the uneven image density of the recorded image.

The above-described embodiments are arranged variously to improve various technological problems. However, all of the above-described arrangements are not necessary for the present invention. A desired effect can be obtained by selecting one or a plurality of arrangements in accordance with the designed structure of the apparatus or the desired density evenness level.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image recording apparatus comprising:

a recording head having a plurality of recording elements, for recording an image on a recording medium by ejecting ink from outlets using energy generated from said recording elements;

means for causing said recording head to print a predetermined test pattern on the recording medium;

image density reading means for reading a density of the test pattern formed by said recording head;

uneven image density correction means for correcting conditions for driving said plurality of recording elements in accordance with a result of reading by said image density reading means so as to make even a density of the image;

recording stabilizing means operable on said recording head for stabilizing an ink ejection operation by said recording head by means of discharge of the ink from the outlets; and control means for operating said recording stabilizing means before said test pattern printing means causes the test pattern to be printed and operating said test pattern printing means after said recording head has been stabilized by said recording stabilizing means.

2. An image recording apparatus according to claim 1, wherein said recording stabilizing means comprises at least one of means for forcibly discharging ink from said recording head, means for cleaning a surface of said recording head through which the outlet for ejecting the ink is formed, and means for driving said recording head to eject the ink.

3. An image recording apparatus according to claim 1, wherein said recording stabilizing means raises the temperature adjustment conditions when the test pattern is printed more than the temperature adjustment conditions when normal recording is performed.

4. An image recording apparatus according to any one of claims 1 to 3, wherein a plurality of said recording heads are provided to correspond to recording agents of different colors for the purpose of performing multi-color recording and said recording stabilizing means stabilizes the recording operation of each of said plurality of recording heads.

5. An image recording apparatus according to any one of claims 1 to 3, wherein said recording elements comprise electrothermal conversion elements which are utilized to generate film boiling in the ink to eject the ink.

6. An image recording apparatus comprises:

a recording head in which a plurality of recording elements are arranged so as to form an image on a recording medium;

means for causing said recording head to print a predetermined test pattern on the recording medium;

image density reading means for reading a density of the test pattern formed by said recording head;

uneven image density correction means for correcting conditions for driving said plurality of recording elements in accordance with a result of reading by said image density reading means so as to make even a density of the image;

recording stabilizing means operable on said recording head for stabilizing a recording operation performed by said recording head; and control means for operating said recording stabilizing means before said test pattern printing means causes the test pattern to be printed and operating said test pattern printing means after said recording head has been stabilized by said recording stabilizing means, wherein said recording stabilizing means includes a temperature adjustment means storing first and second references of an adjustment of a temperature and said control means causes printing of the test pattern after a stabilizing process has been performed in accordance with first reference of the adjustment of the temperature so that first density data is obtained by said reading means, causes printing of the test pattern after a stabilizing process has been performed in accordance with the second reference of the adjustment of the temperature so that second density data is obtained by said reading means and corrects the driving conditions with said correction means using said first and second density data.

7. An image recording apparatus according to claim 6, wherein the first reference of the adjustment of the temperature is a reference of the temperature set for a normal recording operation and the second reference of the adjustment of the temperature is a reference of the temperature set for a test pattern printing operation.

8. An image recording apparatus according to claim 6 or 7, wherein a plurality of said recording heads are provided to correspond to recording agents of different colors for the purpose of performing multi-color recording and said recording stabilizing means stabilizes the recording operation of each of said plurality of recording heads.

9. An image recording apparatus according to claim 6 or 7, wherein said recording head comprises an ink jet recording head and said ink jet recording head includes electrothermal conversion elements which are utilized to generate film boiling in the ink to eject the ink, said electrothermal conversion elements comprising said recording elements.

10. An image recording apparatus for forming an image on a recording medium by using a recording head having a plurality of recording elements, said recording head for recording an image on the recording medium by ejecting ink from outlets using energy generated from the recording elements, said image recording apparatus comprising:

means for causing said recording head to print a predetermined test pattern on the recording medium;

image density reading means for reading a density of the test pattern formed by said recording head;

uneven image density correction means for correcting conditions for driving said plurality of recording elements in accordance with a result of reading by said image density reading means so as to make even a density of the image;

recording stabilizing means operable on said recording head for stabilizing an ink ejection operation by said recording head by means of discharge of the ink from the outlets; and control means for operating said recording stabilizing means before said test pattern printing means causes the test pattern to be printed and operating said test pattern printing means after said recording head has been stabilized by said recording stabilizing means.

11. An image recording apparatus according to claim 10, wherein said recording stabilizing means comprises at least one of means for forcibly discharging ink from said recording head, means for cleaning a surface of said recording head through which the outlet for ejecting the ink is formed, and means for driving said recording head to eject the ink.

12. An image recording apparatus according to claim 10, wherein said recording stabilizing means raises the temperature adjustment conditions when the test pattern is printed more than the temperature adjustment conditions when normal recording is performed.

13. An image recording apparatus according to claim 10, wherein a plurality of said recording heads are provided to correspond to recording agents of different colors for the purpose of performing multi-color recording and said recording stabilizing means stabilizes the recording operation of each of said plurality of recording heads.

14. An image recording apparatus according to claim 10, wherein said recording elements comprise electrothermal conversion elements which are utilized to generate film boiling in the ink to eject the ink.

15. An image forming apparatus for forming an image on a recording medium by using a recording head in which a plurality of recording elements are arranged, said image forming apparatus comprising:

means for causing said recording head to print a predetermined test pattern on the recording medium;

image density reading means for reading a density of the test pattern formed by said recording head;

uneven image density correction means for correcting conditions for driving said plurality of recording elements in accordance with a result of reading by said image density reading means so as to make even a density of the image;

recording stabilizing means operable on said recording head for stabilizing a recording operation performed by said recording head; and control means for operating said recording stabilizing means before said test pattern printing means causes the test pattern to be printed and operating said test pattern printing means after said recording head has been stabilized by said recording stabilizing means, wherein said recording stabilizing means includes a temperature adjustment means storing first and second references of an adjustment of a temperature and said control means causes printing of the test pattern after a stabilizing process has been performed in accordance with the first reference of the adjustment of the temperature so that first density data is obtained by said reading means, causes printing of the test pattern after a stabilizing process has been performed in accordance with the second reference of the adjustment of the temperature so that second density data is obtained by said reading means and corrects the driving conditions with said correction means using said first and second density data.

16. An image recording apparatus according to claim 10 or 15, wherein said recording head comprises an ink jet recording head and said ink jet recording head includes electrothermal conversion elements which are utilized to generate film boiling in ink to eject the ink, said electrothermal conversion elements comprising said recording elements.

17. An image recording apparatus comprising:

a recording head in which a plurality of recording elements are arranged so as to form a visible image on a recording medium;

signal generating means for causing said recording head to print a predetermined test pattern on the recording medium;

reading means for reading the test pattern formed by said recording head in accordance with said signal generating means;

correction means for correcting conditions for driving said recording head in accordance with a result of reading by said reading means; and fixing stabilizing means for stabilizing a recording density of the test pattern formed on the recording medium before reading by said reading means is performed.

18. An image forming apparatus according to claim 17, wherein said reading means is disposed in a lower stream in a medium conveyance passage from said recording head and said fixing stabilizing means has means for stopping a conveyance of the recording medium on which the test pattern is formed or lowering a conveying speed.

19. An image recording apparatus according to claim 13 or 18, wherein a plurality of said recording heads are provided to correspond to recording agents of different colors for the purpose of performing multi-color recording.

20. An image recording apparatus according to claim 17 or 18, wherein said recording head comprises an ink jet recording head and said ink jet recording head includes electrothermal conversion elements which are utilized to generate film boiling in ink to eject the ink, said electrothermal conversion elements comprising said recording elements.

21. An image recording apparatus for forming a visible image on a recording medium by using a recording head in which a plurality of recording elements are arranged, said image recording apparatus comprising:

signal generating means for causing said recording head to print a predetermined visible test pattern on the recording medium;

reading means for reading the test pattern formed by said recording head in accordance with said signal generating means;

correction means for correcting conditions for driving said recording head in accordance with the result of reading by said reading means; and fixing stabilizing means for stabilizing a recording density of the test pattern formed on the recording medium before reading by said reading means is performed.

22. An image forming apparatus according to claim 21, wherein said recording head comprises an ink jet recording head and said ink jet recording head includes electrothermal conversion elements which are utilized to generate film boiling in ink to eject the ink, said electrothermal conversion elements comprising said recording elements.

23. An image recording apparatus for forming an image on a recording medium by using a recording head in which a plurality of recording elements are arranged, said image recording apparatus comprising:

signal generating means for causing said recording head to print a predetermined test pattern on the recording medium;

reading means for reading the test pattern formed by said recording head in accordance with said signal generating means;

correction means for correcting conditions for driving said recording head in accordance with the result of reading by said reading means; and enabling means for enabling said reading means to read the test pattern after a predetermined time period after the recording of the test pattern by said recording head, said predetermined time period being enough to stabilize a record density of the test pattern recorded on the recording medium.

24. An apparatus according to claim 23, wherein said enabling means comprises feeding means for feeding the recording medium from a recording position adjacent said recording head to a reading position adjacent said reading means and control means for controlling an operation of said feeding means.

25. An apparatus according to claim 23, wherein plural recording heads are provided, the number of which corresponds to a number of recording colors.

26. An apparatus according to claim 23, wherein said recording head records an image by ejecting ink from outlets using energy generated from said recording elements.

27. An apparatus according to claim 26, wherein said recording elements generate thermal energy and eject ink from the outlets by producing film boiling in the ink by means of the thermal energy.

28. An image recording apparatus for forming an image on a recording medium by using a recording head in which a plurality of recording elements are arranged, said image recording apparatus comprising:

signal generating means for causing said recording head to print a predetermined test pattern on the recording medium;

reading means for reading the test pattern formed by said recording head in accordance with said signal generating means;

correction means for correcting conditions for driving said recording head in accordance with the result of reading by said reading means; and enabling means for enabling said reading means to read the test pattern after a predetermined time period after the recording of the test pattern by said recording head, said predetermined time period being enough to stabilize a record density of the test pattern recorded on the recording medium, wherein said enabling means comprises feeding means for feeding the recording medium from a recording position adjacent said recording head to a reading position adjacent said reading means and control means for controlling an operation of said feeding means, wherein said control means suspends an operation of said feeding means for a time period corresponding to the predetermined time period, after the recording of the test pattern by said recording head.

29. An apparatus according to claim 28, wherein plural recording heads are provided, the number of which corresponds to a number of recording colors.

30. An apparatus according to claim 29, wherein said recording head records an image by ejecting ink from outlets using energy generated from said recording elements.

31. An apparatus according to claim 29, wherein said recording elements generate thermal energy and eject ink from the outlets by producing film boiling in the ink by means of the thermal energy.

32. An image recording apparatus for forming an image on a recording medium by using a recording head in which a plurality of recording elements are arranged, said image recording apparatus comprising:

signal generating means for causing said recording head to print a predetermined test pattern on the recording medium;

reading means for reading the test pattern formed by said recording head in accordance with said signal generating means;

correction means for correcting conditions for driving said recording head in accordance with the result of reading by said reading means; and enabling means for enabling said reading means to read the test pattern after a predetermined time period after the recording of the test pattern by said recording head, said predetermined time period being enough to stabilize a record density of the test pattern recorded on the recording medium, wherein said enabling means comprises feeding means for feeding the recording medium from a recording position adjacent said recording head to a reading position adjacent said reading means and control means for controlling an operation of said feeding means, wherein said control means reduces a speed of said feeding means in such a manner that the recording medium may reach the reading position after the predetermined time period after the recording of the test pattern by said recording head.

33. An apparatus according to claim 32, wherein plural recording heads are provided, the number of which corresponds to a number of recording colors.

34. An apparatus according to claim 33, wherein said recording head records an image by ejecting ink from outlets using energy generated from said recording elements.

35. An apparatus according to claim 33, wherein said recording elements generate thermal energy and eject ink from the outlets by producing film boiling in the ink by means of the thermal energy.

36. An image recording apparatus for forming an image on a recording medium by using a recording head having a plurality of recording elements, said recording head for recording an image on the recording medium by ejecting ink from outlets using energy generated from the recording elements, in accordance with image data, said image recording apparatus comprising:

test pattern printing means for causing said recording head to print a predetermined test pattern on the recording medium;

input means for inputting data associated with a density of the predetermined test pattern formed on the recording medium by said recording head;

uneven image density correction means for correcting conditions for driving said plurality of recording elements in accordance with the data inputted by said input means so as to make even a density of the image;

recording stabilizing means operable on said recording head for stabilizing an ink ejection operation by said recording head by means of discharge of the ink from the outlets; and control means for operating said recording stabilizing means before said test pattern printing means causes the test pattern to be printed and operating said test pattern printing means after said recording head has been stabilized by said recording stabilizing means.

37. An image recording apparatus according to claim 36, wherein said recording stabilizing means comprises at least one of means for forcibly discharging ink from said recording head, means for cleaning a surface of said recording head through which the outlet for ejecting the ink is formed, and means for driving said recording head to eject the ink.

38. An image recording apparatus according to claim 36, wherein said recording stabilizing means raises temperature adjustment conditions when the test pattern is printed to be more than when normal recording is performed.

39. An image recording apparatus according to claim 36, wherein a plurality of said recording heads are provided to correspond to recording agents of different colors for the purpose of performing multi-color recording and said recording stabilizing means stabilizes the recording operation of each of said plurality of recording heads.

40. An apparatus according to claim 36, wherein said input means comprises image density reading means for reading a density of the test pattern formed on the recording medium by said recording head.

41. An apparatus according to claim 36, wherein said correction means corrects the driving condition by correcting the image data in accordance with correction data.

42. An apparatus according to claim 41, wherein said correction means corrects image data corresponding to each of the recording elements.

43. An apparatus according to claim 41, wherein said correction means corrects the image data in accordance with a correction line.

44. An apparatus according to claim 43, wherein said correction means comprises memory means for storing therein a plurality of correction lines and selection means for selecting one of the plurality of correction lines stored in said memory means in accordance with the correction data.

45. An apparatus according to claim 44, wherein said correction means causes said selection means to select one of the correction lines for each of the recording elements, and corrects the image data for each recording element in accordance with the selected correction line.

46. An apparatus according to any one of claims 36 to 45, wherein said recording elements comprise electrothermal conversion elements which are utilized to generate film boiling in the ink to eject the ink.

47. An image recording apparatus for forming an image on a recording medium by using a recording head in which a plurality of recording elements are arranged, said image recording apparatus being operable a correction mode for correcting unevenness in density of the plurality of recording elements, in which a driving condition of the recording head is corrected in accordance with data from reading means which reads a density of a predetermined test pattern recorded on the recording medium by the recording head, said image recording apparatus comprising:

signal generating means for causing said recording head to print the test pattern on the recording medium;

correction means for correcting conditions for driving said recording head in accordance with a result of reading by said reading means; and enabling means for enabling said reading means to read the test pattern after a predetermined time period after the recording of the test pattern by said recording head, said predetermined time period being enough to stabilize a record density of the test pattern recorded on the recording medium.

48. An apparatus according to claim 47, wherein said enabling means comprises feeding means for feeding the recording medium from a recording position adjacent said recording head to a reading position adjacent said reading means and control means for controlling an operation of said feeding means.

49. An apparatus according to claim 47, wherein said correction means corrects the driving condition by correcting image data in accordance with the data from the reading means.

50. An apparatus according to claim 49, wherein said correction means corrects the image data corresponding to each of the recording elements.

51. An apparatus according to claim 49, wherein said correction means corrects the image data in accordance with a correction line.

52. An apparatus according to claim 51, wherein said correction means comprises memory means for storing therein a plurality of correction lines and selection means for selecting one of the plurality of correction lines stored in said memory means in accordance with the data from the reading means.

53. An apparatus according to claims 52, wherein said correction means causes said selection means to select one of the correction lines for each of the recording elements, and corrects the image data for each recording element in accordance with the selected correction line.

54. An apparatus according to claim 47, wherein plural recording heads are provided, the number of which corresponds to a number of recording colors.

55. An apparatus according to any one of claims 47 to 54, wherein said recording head records an image by ejecting ink from outlets using energy generated from said recording elements.

56. An apparatus according to claim 55, wherein each of said recording elements comprises an electrothermal conversion element which is utilized to generate film boiling in the ink to eject the ink.

* * * * *

UNITED STATES PATENT AND TRADEMARK OFFICE
CERTIFICATE OF CORRECTION

PATENT NO. : 5,596,353  Page 1 of 10
DATED : January 21, 1997
INVENTOR(S) : Yoshihiro TAKADA, et al.

It is certified that error appears in the above-indentified patent and that said Letters Patent is hereby corrected as shown below:

ON THE COVER PAGE

AT [57] - ABSTRACT:

Line 10, "image formed in accordance with the result of reading," should read --image,--.

IN THE DRAWING SHEETS

SHEET 17 OF 54:

Figure 13, at element 16, "SYSTEN" should read --SYSTEM--.

SHEET 21 OF 54:

Figure 16, at Step S13, "STABLIZING" should read --STABILIZING--.

SHEET 29 OF 54:

Figure 24, at element 14, "UINT" should read --UNIT--.

UNITED STATES PATENT AND TRADEMARK OFFICE
CERTIFICATE OF CORRECTION

PATENT NO. : 5,596,353           Page 2 of 10
DATED      : January 21, 1997
INVENTOR(S): Yoshihiro TAKADA, et al.

It is certified that error appears in the above-indentified patent and that said Letters Patent is hereby corrected as shown below:

SHEET 34 OF 54:

Figure 28, at Step S13, "STABLIZING" should read --STABILIZING--.

SHEET 49 OF 54:

Figure 43, at element 411, "NEAD" should read --HEAD--.

III. IN THE DISCLOSURE

COLUMN 1:

Line 23, "an" should be deleted.

COLUMN 4:

Line 14, "data is used," should read --data,--.

UNITED STATES PATENT AND TRADEMARK OFFICE
CERTIFICATE OF CORRECTION

PATENT NO. : 5,596,353
DATED : January 21, 1997
INVENTOR(S) : Yoshihiro TAKADA, et al.

It is certified that error appears in the above-indentified patent and that said Letters Patent is hereby corrected as shown below:

COLUMN 5:

After Line 1, the following should be inserted:
--FIG. 1 is a schematic view which illustrates the outline of the present invention;
    FIG. 2A is a schematic side elevational view which illustrates an embodiment of a line printer type ink jet recording apparatus of an image forming apparatus according to the present invention;--;
Line 8, "illustrates" should read --illustrate--;
Line 14, "illustrates" should read --illustrate--.

COLUMN 6:

Line 37, "invent ion;" should read --invention;--.

COLUMN 9:

Line 33, "-5" should be deleted.

UNITED STATES PATENT AND TRADEMARK OFFICE
CERTIFICATE OF CORRECTION

PATENT NO. : 5,596,353
DATED : January 21, 1997
INVENTOR(S) : Yoshihiro TAKADA, et al.

It is certified that error appears in the above-indentified patent and that said Letters Patent is hereby corrected as shown below:

COLUMN 10:

Line 1, "satisfactorily" should read --satisfactory--.

COLUMN 11:

Line 17, "is" should read --are--.

COLUMN 13:

Line 4, "FIG. 44." should read --FIG. 45.--;
Line 33, "$\alpha$nis" should read --$\alpha_n$ is--;
Line 50, "the change" should read --change--.

COLUMN 14:

Line 13, "a" should be deleted.

COLUMN 16:

Line 36, "he" should read --the--;
Line 40, "5BL." should read --85BL.--.

UNITED STATES PATENT AND TRADEMARK OFFICE
CERTIFICATE OF CORRECTION

PATENT NO. : 5,596,353
DATED : January 21, 1997
INVENTOR(S) : Yoshihiro TAKADA, et al.

It is certified that error appears in the above-indentified patent and that said Letters Patent is hereby corrected as shown below:

COLUMN 17:

Line 16, "f1except" should read --f1 except--.

COLUMN 18:

Line 34, "122KB." should read --122BK.--;
Line 66, "1Bk" should read --1BK--.

COLUMN 19:

Line 36, " predeterminedsheet" " should read -- predetermined sheet" --.

COLUMN 20:

Line 27, "a" should read --an--;
Line 32, "a" should read --an--;
Line 53, "of" should be deleted;

COLUMN 22:
Line 61, "to taken" should read --by taking--.

COLUMN 23:

Line 16, "operations" should read --operation--.

UNITED STATES PATENT AND TRADEMARK OFFICE
CERTIFICATE OF CORRECTION

PATENT NO. : 5,596,353  Page 6 of 10
DATED : January 21, 1997
INVENTOR(S) : Yoshihiro TAKADA, et al.

It is certified that error appears in the above-indentified patent and that said Letters Patent is hereby corrected as shown below:

COLUMN 24:

Line 57, "$0Dc\text{-}0Dcn=K1(0DBK\text{-}0DBKn)$" should read --$\overline{0Dc}\text{-}0Dcn=K1(\overline{0D_{BK}}\text{-}0D_{BK}n)$--;

Line 59, "K1times" should read --K1 times--.

COLUMN 25:

Line 9, "1/K2and" should read --1/K2 and--;

Line 13, "$1/K1\times(0Dc\text{-}0Dcn)=1/K1\{K1\times(0DBK\text{-}0DBKn)\}=0DBK\text{-}0DBKn$" should read --$1/K1\times(\overline{0Dc}\text{-}0Dcn)=1/K1\{K1\times(\overline{0D_{BK}}\text{-}0D_{BK}n)\}=\overline{0D_{BK}}\text{-}0D_{BK}n$--;

Line 50, "$R0 \leqq Rn; 1 \leqq n \leqq N$" should read --$R_0 \geqq Rn; 1 \leqq n \leqq N$--.

COLUMN 26:

Line 4, "$\Delta Snso$" should read --$\Delta Sn$ so--;
Line 18, "L0" should be deleted.

COLUMN 28:

Line 3, "S11so" should read --S11 so--;
Line 19, "patten." should read --pattern.--.

UNITED STATES PATENT AND TRADEMARK OFFICE
CERTIFICATE OF CORRECTION

PATENT NO. : 5,596,353
DATED : January 21, 1997
INVENTOR(S) : Yoshihiro TAKADA, et al.

It is certified that error appears in the above-indentified patent and that said Letters Patent is hereby corrected as shown below:

COLUMN 29:

Line 8, "closely" should read --close--.

COLUMN 31:

Line 32, "an L" should be deleted.

COLUMN 32:

Line 51, "read" should read --read for--.

COLUMN 35:

Line 66, "△Snis" should read --△Sn is--.

COLUMN 36:

Line 12, "△Snis" should read --△Sn is--;
Line 37, "$\Delta Sn=(\Delta Sn2+\Delta Sn2)/2$" should read --$\Delta Sn=(\Delta Sn_1+\Delta Sn_2)/2$--;
Line 48, "Then, another" should read --Another--.

UNITED STATES PATENT AND TRADEMARK OFFICE
CERTIFICATE OF CORRECTION

PATENT NO. : 5,596,353  Page 8 of 10
DATED : January 21, 1997
INVENTOR(S) : Yoshihiro TAKADA, et al.

It is certified that error appears in the above-indentified patent and that said Letters Patent is hereby corrected as shown below:

COLUMN 37:

Line 5, "particularly," should read --particular,--;
    Line 60, "be arisen" should read --arise--.

COLUMN 38:

Line 32, "Then," should read --Next,--.

COLUMN 40:

Line 14, "transmits" should read --transmit--.

COLUMN 41:

Line 11, "of an" should read --of the--;
    Line 50, "heads recording" should read --recording heads--.

COLUMN 42:

Line 42, "particularly," should read --particularity,--.

UNITED STATES PATENT AND TRADEMARK OFFICE
CERTIFICATE OF CORRECTION

PATENT NO. : 5,596,353
DATED : January 21, 1997
INVENTOR(S) : Yoshihiro TAKADA, et al.

It is certified that error appears in the above-indentified patent and that said Letters Patent is hereby corrected as shown below:

IV. IN THE CLAIMS

COLUMN 43:

Line 55, "with" should read --with the--.

COLUMN 44:

Line 59, "forming" should read --recording--.
   (First Occurrence)

COLUMN 45:

Line 53, "forming" should read --recording--;
   Line 59, "claim 13" should read --claim 17--.

COLUMN 46:

Line 19, "forming" should read --recording--.

COLUMN 47:

Line 24, "claim 29," should read --claim 28,--;
   Line 27, "claim 29," should read --claim 28,--;
   Line 63, "claim 33," should read --claim 32,--;
   Line 66, "claim 33," should read --claim 32,--.

UNITED STATES PATENT AND TRADEMARK OFFICE
CERTIFICATE OF CORRECTION

PATENT NO. : 5,596,353
DATED : January 21, 1997
INVENTOR(S) : Yoshihiro TAKADA, et al.

It is certified that error appears in the above-indentified patent and that said Letters Patent is hereby corrected as shown below:

COLUMN 49:

Line 8, "being operable" should read --being operable in--.

COLUMN 50:

Line 15, "claims 52," should read --claim 52,--.

Signed and Sealed this

Nineteenth Day of August, 1997

Attest:

BRUCE LEHMAN

Attesting Officer

Commissioner of Patents and Trademarks